US012043635B2

(12) United States Patent
Marshall et al.

(10) Patent No.: US 12,043,635 B2
(45) Date of Patent: Jul. 23, 2024

(54) PRODUCTS COMPRISING 1,2,3-TRIAZOLATE METAL-ORGANIC FRAMEWORKS AND METHODS OF MAKING AND USING THE SAME

(71) Applicant: University of Oregon, Eugene, OR (US)

(72) Inventors: Rebecca Marshall, Eugene, OR (US); Carl Brozek, Eugene, OR (US)

(73) Assignee: University of Oregon, Eugene, OR (US)

(*) Notice: Subject to any disclaimer, the term of this patent is extended or adjusted under 35 U.S.C. 154(b) by 0 days.

(21) Appl. No.: 17/973,101

(22) Filed: Oct. 25, 2022

(65) Prior Publication Data

US 2023/0140398 A1     May 4, 2023

Related U.S. Application Data

(60) Provisional application No. 63/263,070, filed on Oct. 26, 2021.

(51) Int. Cl.
    *C07F 15/02*      (2006.01)
    *C25B 11/085*      (2021.01)

(52) U.S. Cl.
    CPC .......... *C07F 15/025* (2013.01); *C25B 11/085* (2021.01)

(58) Field of Classification Search
None
See application file for complete search history.

(56) References Cited

FOREIGN PATENT DOCUMENTS

| | | | |
|---|---|---|---|
| CN | 201837142 A | * | 10/2018 |
| CN | 109695096 A | | 4/2019 |
| CN | 111218006 A | | 6/2020 |
| WO | WO 2018141685 A1 | | 8/2018 |
| WO | WO2019186134 A1 | * | 10/2019 |
| WO | WO 2020/096353 A1 | | 5/2020 |

OTHER PUBLICATIONS

Yaghi et al. Chemistry European Journal, 18, 10595-10601, Supporting information (Year: 2012).*
Stabler et al., TW 201837142 A, and English language translations (Year: 2018).*
Ettlinger et al., "Metal-organic framework nanoparticles for arsenic trioxide drug delivery," *Journal of Materials Chemistry B* 6,(40): 6481-6489, 2018.
Gándara et al., "Porous, conductive metal-triazolates and their structural elucidation by the charge-flipping method," *Chemistry—A European Journal* 18(34): 10595-10601, Aug. 2012.

(Continued)

*Primary Examiner* — Yun Qian
(74) *Attorney, Agent, or Firm* — Klarquist Sparkman, LLP

(57) ABSTRACT

Disclosed herein are embodiments of products comprising 1,2,3-triazolate metal-organic frameworks, including particle, composition, thin film, and device embodiments. Particles made of the 1,2,3-triazolate metal-organic frameworks exhibit unique properties compared to bulk materials, such as reduced polydispersity, increased conductivity, and other properties. Also disclosed herein are embodiments of a method for making particles comprising the 1,2,3-triazolate metal-organic framework and other products comprising the same.

12 Claims, 32 Drawing Sheets

5.5 nm

(56) References Cited

OTHER PUBLICATIONS

Grzywa et al., "Cooperative large-hysteresis spin-crossover transition in the iron (II) triazolate [Fe (ta) 2] metal-organic framework," *Inorganic Chemistry* 59(15): 10501-10511, Jul. 2020.
Kahn et al., "Iron (II)—1, 2, 4,-triazole spin transition molecular materials," *Philosophical Transactions of the Royal Society of London. Series A: Mathematical, Physical and Engineering Sciences* 354(1706): 359-379, Feb. 1996.
Park et al., "Charge delocalization and bulk electronic conductivity in the mixed-valence metal-organic framework Fe (1, 2, 3-triazolate) 2 (BF4) x," *Journal of the American Chemical Society* 140(27): 8526-8534, Jun. 2018.
Siddiqui et al., "Synthesis and size-dependent spin crossover of coordination polymer [Fe (Htrz) 2 (trz)](BF 4)," *Journal of Materials Chemistry* C 9(3): 1077-1084, Dec. 2020.
Wang et al., "Opening catalytic sites in the copper-triazoles framework via defect chemistry for switching on the proton reduction," *Applied Catalysis B: Environmental* 288: 119941, Jul. 2021.

\* cited by examiner

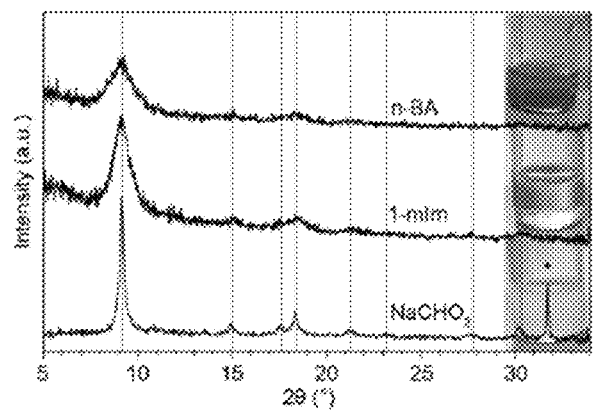 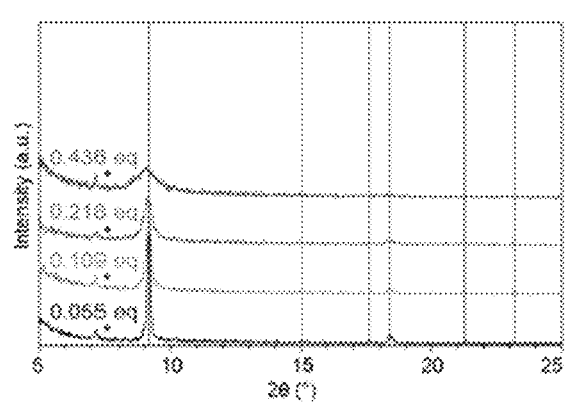
FIG. 16A  FIG. 16B
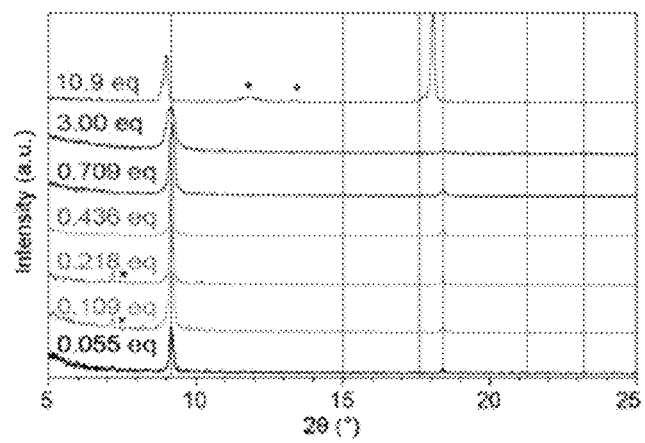
FIG. 16C
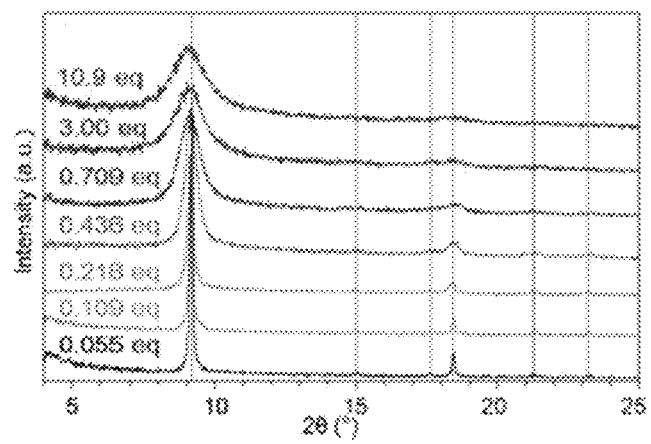
FIG. 16D

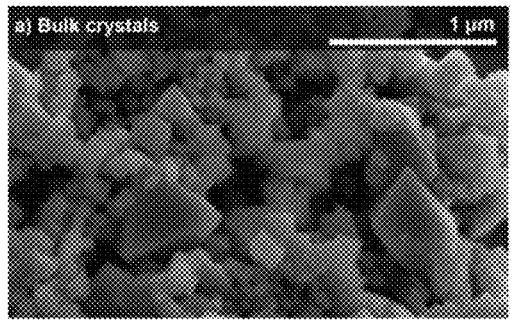 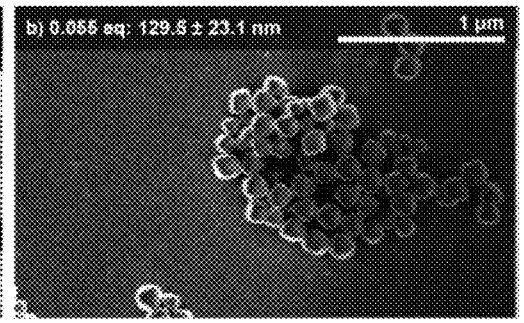
FIG. 19A                FIG. 19B
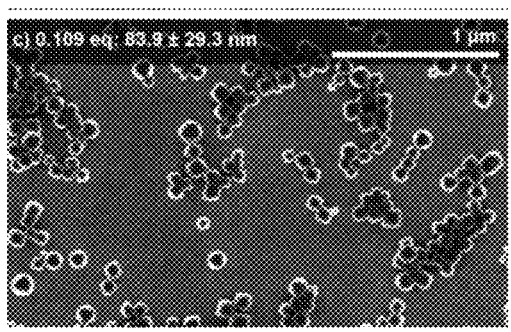 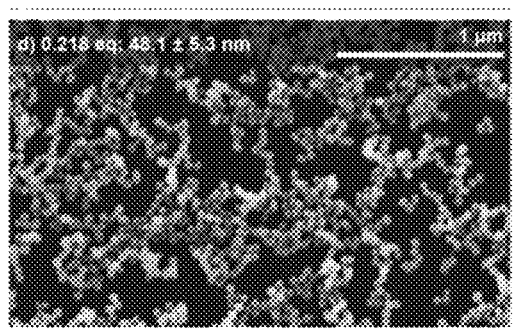
FIG. 19C                FIG. 19D
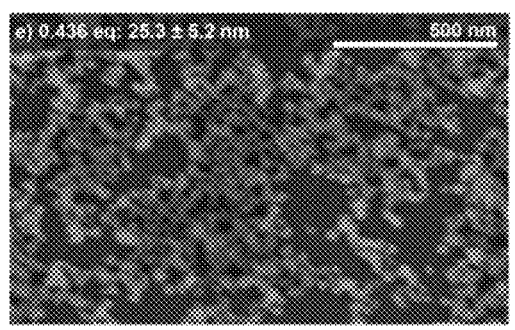 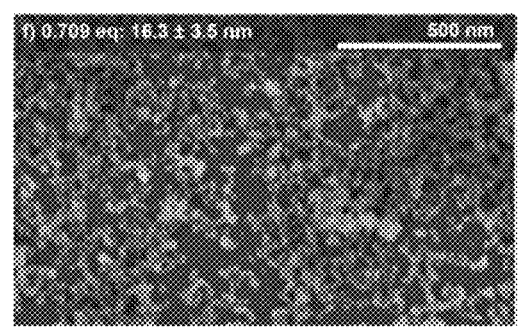
FIG. 19E                FIG. 19F

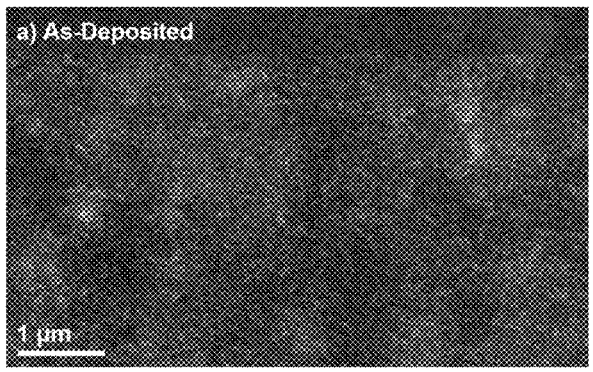
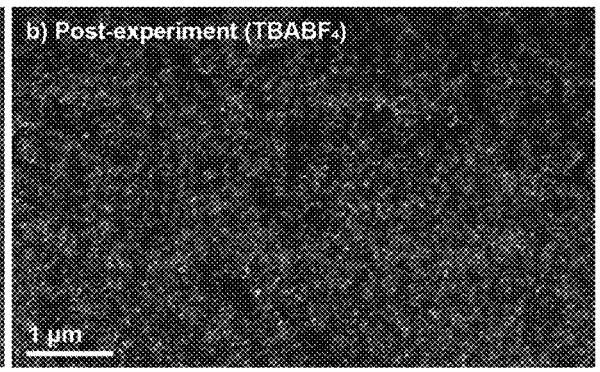
FIG. 23A  FIG. 23B
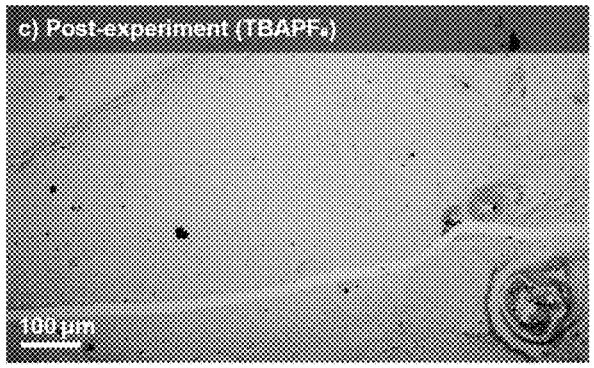
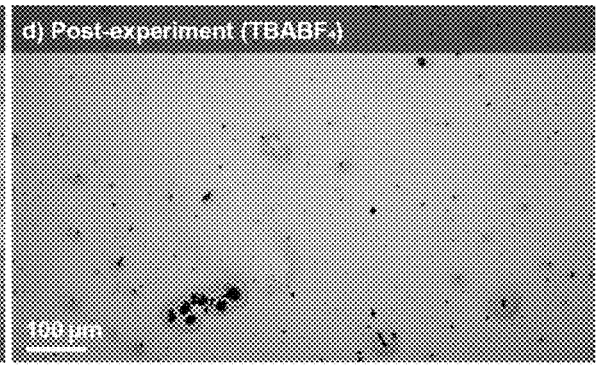
FIG. 23C  FIG. 23D

PRODUCTS COMPRISING 1,2,3-TRIAZOLATE METAL-ORGANIC FRAMEWORKS AND METHODS OF MAKING AND USING THE SAME

CROSS REFERENCE TO RELATED APPLICATION

This application claims the benefit of and priority to the earlier filing date of U.S. Provisional Application No. 63/263,070, filed Oct. 26, 2021, which is incorporated herein by reference in its entirety.

ACKNOWLEDGMENT OF GOVERNMENT SUPPORT

This invention was made with government support under 2114430 awarded by the National Science Foundation through the Division of Materials Research. The government has certain rights in the invention.

FIELD

The present disclosure concerns products comprising metal-organic-framework (MOF) nanoparticle embodiments and methods of making and using the same.

BACKGROUND

Redox-active nanoparticles, specifically, classic organic semiconductor nanoparticles and organic redox-active colloids (RACs) have been of interest for applications in energy storage and electrocatalysis. The structure and compositions of classic inorganic semiconductor nanoparticles, however, are limited to few classic crystal systems and elements and are vulnerable to oxidizing conditions, and thus dissociate into solution as the surface metals atoms oxidize. And, RACs, which are typically amorphous materials, are challenging to characterize or tune structurally and further rely on incorporating molecular additives because the polymers used in such materials are not redox-active.

Recently, metal organic frameworks (MOFs) have been of interest as molecularly defined platforms in energy storage and electrocatalysis because of their microporosity and high surface areas; however, they are limited in application because the synthetic protocols yield polycrystalline amorphous bulk powders and lack control over the size and polydispersity of the crystallites. Accordingly, there is a need in the art for new methods for making nanosized MOF materials having controlled polydispersity, along with new materials made with such a method.

SUMMARY

Disclosed herein are embodiments of a composition, comprising a plurality of metal-organic framework (MOF) nanoparticles comprising at least one coordination complex formed between a metal component and a 1,2,3-triazolate ligand. In some embodiments, the plurality of metal-organic framework nanoparticles has a polydispersity index value ranging from a value greater than 0 to a value less than 0.4.

Also disclosed are embodiments of a method, comprising combining a metal precursor compound, a 1,2,3-triazole, a modulator component, and a solvent to provide a reaction mixture; heating the reaction mixture; and stirring the reaction mixture at a vortex speed sufficient to provide a plurality of metal-organic framework (MOF) nanoparticles made of an MOF material comprising (i) a transition metal provided by the transition metal precursor and (ii) a 1,2,3-triazolate ligand provided by the ligand precursor.

Also disclosed herein are embodiments of a conductive thin film, comprising a plurality of nanoparticles made of a metal-organic framework material comprising at least one coordination complex formed between a metal component and a 1,2,3-triazolate ligand, wherein thin film exhibits a conductivity of at least $1.0 \times 10^{-10}$ S/cm.

Also disclosed herein are embodiments of a device, comprising: a substrate and a conductive thin film as described herein that is deposited on the substrate.

The foregoing and other objects, and features of the present disclosure will become more apparent from the following detailed description, which proceeds with reference to the accompanying figures.

BRIEF DESCRIPTION OF THE DRAWINGS

FIGS. 3A-3F shows results obtained from charge transport measurements of iron-1,2,3-triazolate nanoparticle thin films, wherein FIG. 3A shows photographs and optical microscope image of a thin film prepared by doctor-blading 84 nm MOF nanoparticles; FIG. 3B shows I-V curves and the corresponding four-contact DC conductivity values of four iron-1,2,3-triazolate thin films; FIG. 3C shows an FIB-SEM image of a cross-section (CS) of the 84 nm MOF nanoparticle film; FIG. 3D shows an FIB-SEM image of a cross-section of a film formed with a bulk material; FIG. 3E shows an FIB-SEM image of a cross-section of 85 nm MOF nanoparticles; and FIG. 3F shows a bar graph displaying the conductivity values (conductivity $\times 10^{-7}$ S/cm) in nitrogen and air (conductivity $\times 10^{-5}$ S/cm) for films made using (i) the bulk material of FIG. 3D, (ii) the 84 nm MOF nanoparticles, and (iii) 25 nm MOF nanoparticles.

FIGS. 5A-5H are SEM images of iron-triazole thin films comprising MOF nanoparticles of various sizes and a bulk material for comparison, wherein FIG. 5A shows a cross section of the bulk material; FIG. 5B shows the surface of the bulk material film; FIG. 5C shows a cross section of 129.5 nm sized nanoparticles; FIG. 5D shows a close-up image of the 129.5 nm sized nanoparticle film cross section; FIG. 5E shows a cross section of the 83.9 nm sized nanoparticle thin film; FIG. 5F shows a close-up of the 83.9 nm sized nanoparticle film cross section; FIG. 5G shows a cross section of a composite film with 83.9 nm sized nanoparticles comprising 5% carbon black and 5% PVDF; and FIG. 5H shows an image of the surface of the composite film.

FIGS. 6A-6D show nitrogen isotherms of a bulk iron-1,2,3-triazolate material compared to 48.1 nm MOF nanoparticles, wherein FIG. 6A shows $N_2$ adsorption (circles) and desorption (triangles) isotherms for bulk and iron-1,2,3-triazolate nanoparticles; FIG. 6B shows a BET plot for the bulk iron-1,2,3-triazolate material; FIG. 6C shows the PXRD of iron-1,2,3-triazolate nanoparticles before and after measurement; and FIG. 6D shows the BET plot for iron-1,2,3-triazolate nanoparticles.

FIGS. 9A-9G show data obtained for iron- and cobalt-1,2,3-triazolate MOF nanoparticles, wherein FIGS. 9A and 9B show nanoparticle sizes (as determined using Scherrer analysis) obtained using 1-methylimidazole as a modulator component, with FIG. 9A comparing particle size trends between the two types of MOF nanoparticles (Co represented by filled squares; and Fe represented by open squares) and FIG. 9B showing the morphology of the cobalt-triazole nanoparticles obtained using 0.219 equivalents of 1-methylimidazole; FIG. 9C depicts a graph of particle sizes as determined using both SEM and Scherrer analysis; FIG. 9D is an SEM image of a cobalt bulk material; and FIGS. 9E-9G show SEM images of cobalt-1,2,3-triazolate MOF nanoparticles synthesized with varying equivalents (with respect to Co used in the reaction) of 1-methylimidazole ("1-mlm"), including 0.05 equivalents (FIG. 9E), 0.3 equivalents (FIG. 9F), and 0.5 equivalents (FIG. 9G), wherein the insets show histograms of particle size distributions from >200 particles fitted to weighted gaussian distributions.

FIG. 10A shows results for the three different modulators and FIG. 10B shows a zoomed view showing the results at low equivalents for the three modulators.

FIGS. 13A and 13B show dynamic light scattering ("DLS") data obtained from analyzing iron-1,2,3-triazolate nanoparticles made with 1-methylimidazole as a modulator, wherein FIG. 13A shows the solvated radius as measured in DMF and FIG. 13B shows representative correlation functions from different measurements, illustrating a reproducible curve.

FIGS. 14A-14E show results from solution-state UV-Vis absorption spectra of iron-1,2,3-triazolate nanoparticles, wherein FIG. 14A shows the normalized spectra of colloidal iron-1,2,3-triazolate nanoparticles of varying sizes suspended in DMF (colored traces) compared with the bulk MOF material (filled grey area) as reported by diffuse reflectance, wherein the smallest and largest particles traces are emphasized in bold; FIG. 14B shows the normalized CT2 band; FIG. 14C shows the corresponding peak maxima versus particles sizes; FIG. 14D shows the normalized CT1 band; and FIG. 14E show the corresponding peak maxima versus particles sizes, wherein peak maxima are reported for syntheses modulated by 1-methylimidazole except for data labeled for n-butylamine (nBA) and 1-benzyl-2-methylimidazole (Benzyl).

FIGS. 15A-15D shows results obtained from analyzing the absorption intensity of solution-state UV-Vis spectra of iron-1,2,3-triazolate nanoparticles, wherein FIG. 15A shows UV-Vis traces for all particle sizes plotted as extinction coefficient e per particle; FIG. 15B shows CT1 (blue) and CT2 (black) peak maxima plotted as & per particle as a function of particle diameter, wherein solid curves are fits of ε to cubic functions of diameter, pre-factors for CT1 and CT2 fits are 23810 and 26160, respectively; and FIGS. 15C and 15D show oscillator strengths per iron-1,2,3-triazolate formula unit per particle (FIG. 15C) and derived from peak maxima of CT1, CT2, and CT2 shoulder versus particle diameter (FIG. 15D).

FIGS. 16A-16D show PXRD patterns of iron-1,2,3-triazolate nanoparticles synthesized with n-butylamine, sodium formate, and 1-methylimidazole modulators, wherein FIG. 16A shows the patterns obtained from syntheses using 1.0 equivalents of n-butylamine, sodium formate, and 1-methylimidazole and also provides photos of the reaction solutions prior to heating; FIG. 16B shows the patterns obtained from nanoparticles made using varying equivalents of 1-benzyl-2-methlimidazole; FIG. 16C shows the patterns obtained from nanoparticles made using varying amounts of 5-bromo-1-methylimidazole; and FIG. 16D shows pattern obtained from nanoparticles made using with varying amounts of 1-methylimidazole.

FIG. 18A shows images of nanoparticles using 3.763 equivalents 1-methylimidazole and allowing the reaction to take place overnight; FIG. 18B shows that particles increase only slightly in polydispersity for 0.218 equivalents when allowed to react for 5 hours instead of 1.5 hours; FIG. 18C shows results for iron-1,2,3-triazolate nanoparticles made using 0.055 equivalents 1-methylimidazole and a 5-hour reaction time; and FIG. 18D shows results for iron-1,2,3-triazolate nanoparticles treated with 0.055 equivalents 1-methylimidazole reaction and allowed to react overnight.

FIGS. 19A-19F show SEM images of iron-1,2,3-triazolate nanoparticles, wherein FIG. 19A shows the morphology resulting from conventional synthesis of bulk iron-1,2,3-triazolate material; FIGS. 19B-19F shows iron-1,2,3-triazolate nanoparticles made using a method embodiment disclosed herein with 0.055 equivalents of 1-methylimidazole (FIG. 19B); 0.109 equivalents of 1-methylimidazole (FIG. 19C); 0.218 equivalents of 1-methylimidazole (FIG. 19D);

0.436 equivalents of 1-methylimidazole (FIG. 19E); and 0.709 equivalents of 1-methylimidazole (FIG. 19F).

Figure 20A:
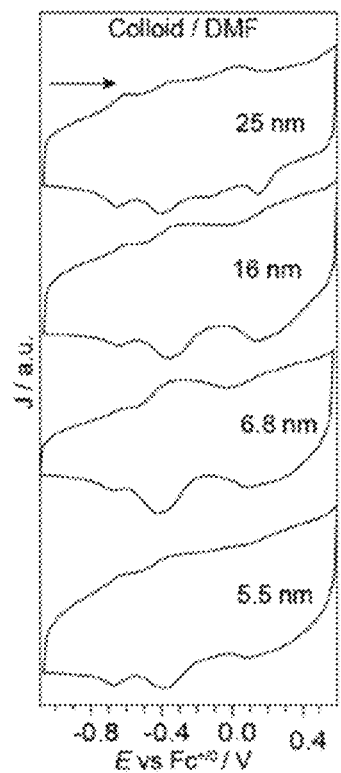
Figure 20B:
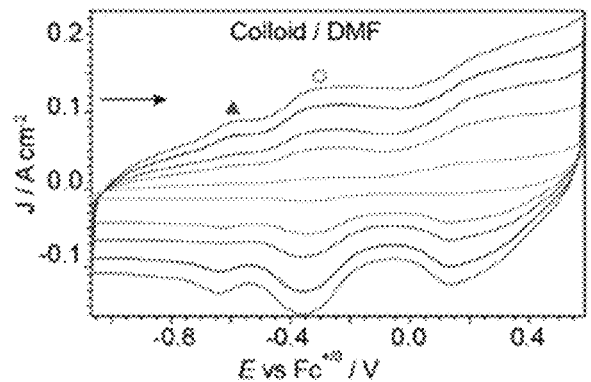
Figure 20C:
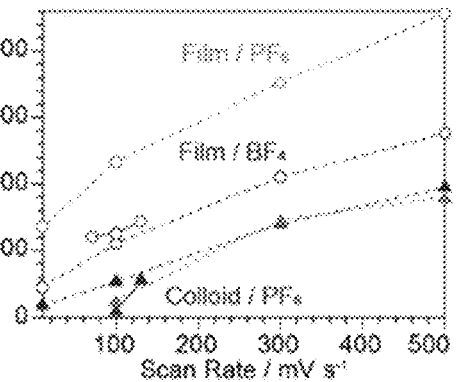
Figure 20D:
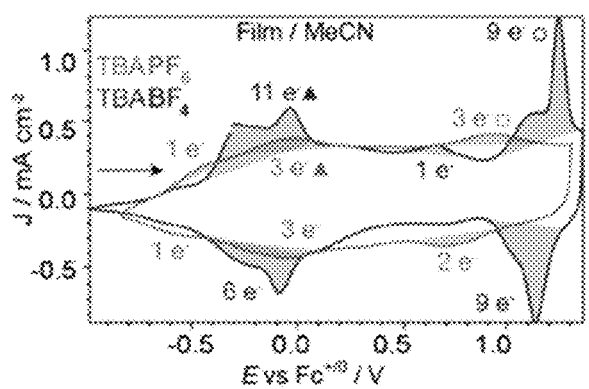
Figure 20E:
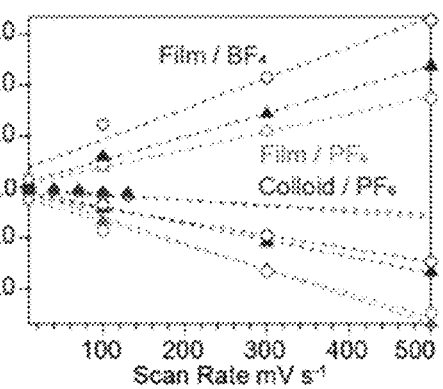

FIGS. 20A-20E shows results from cyclic voltammetry analysis of iron-1,2,3-triazolate nanoparticles analyzed as colloids or thin films, wherein initial scan directions are indicated by arrows; FIG. 20A shows CV traces collected at a 130 mV/s scan rate for four particle sizes prepared as colloids in 0.1-M $TBAPF_6$/DMF, wherein current density is normalized to the second faradaic event; FIG. 20B shows the scan rate dependence of 16.3 nm colloidal particles in 0.1 M $TBAPF_6$/DMF, wherein light to dark traces correspond to 10 mV/s-130 mV/s; FIG. 20C shows peak-to-peak separation for two peaks in each of 16.3 nm particle CVs, wherein the relevant peaks are marked with filled triangles (first peak analyzed) or open circles (second peak analyzed) in all panels; FIG. 20D shows CV traces of 16.3 nm thin films with $TBAPF_6$ or $TBABF_4$ electrolyte collected at 100 mV/s, wherein the filled peak areas were integrated to determine the charged passed per particle; and FIG. 20E shows the peak current with respect to scan rate for two peaks in each of the 16.3 nm particle CVs, wherein the relevant peaks are marked in all panels with filled triangles and open circles and the dashed lines correspond to linear fits.

Figure 21A:
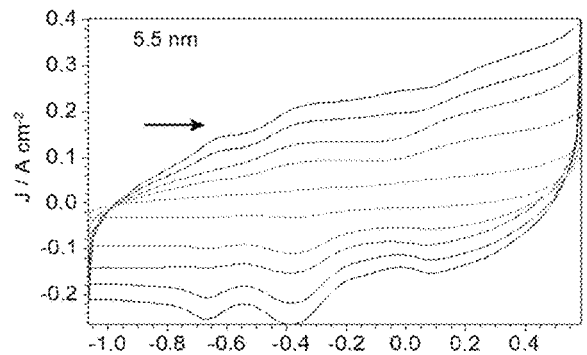
Figure 21B:
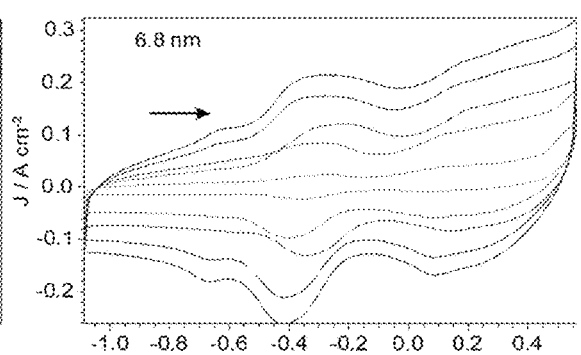
Figure 21C:
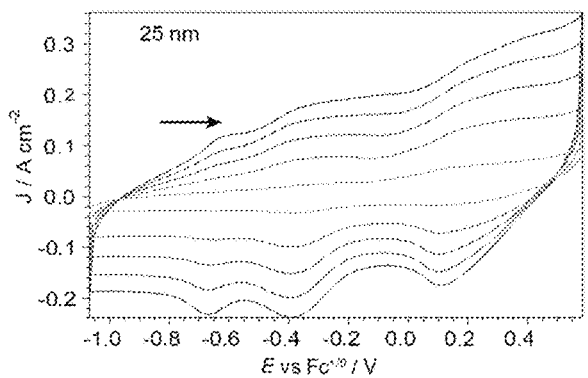
Figure 21D:
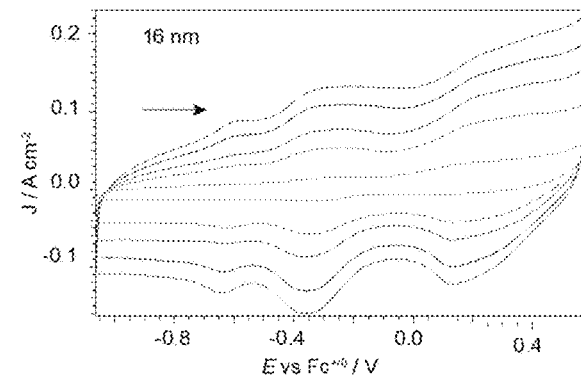
Figure 21E:
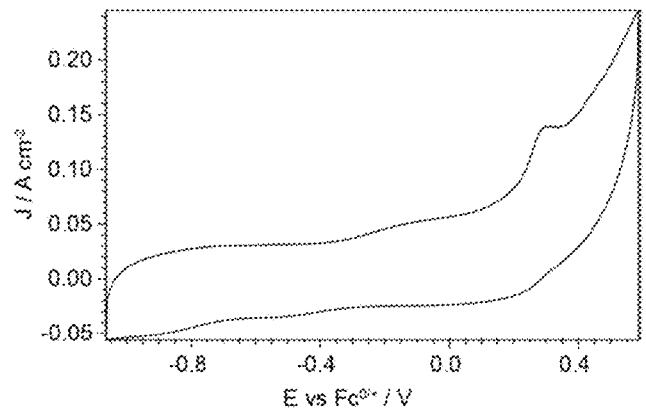

FIGS. 21A-21E show cyclic voltammetry ("CV") scans obtained from iron-1,2,3-triazolate nanoparticles (FIGS. 21A-21D) and a control (FIG. 21E) with varying sizes as colloids in 0.1 M $TBAPF_6$/DMF, wherein FIG. 21A shows results for 5.5 nm sized nanoparticles, FIG. 21B shows results for 6.8 nm sized nanoparticles, FIG. 21C shows results for 25.5 nm sized nanoparticles; FIG. 21D shows that over the course of 4 hours, the faradaic features shifted to lower potential for 16.3 nm sized particles; and FIG. 21E shows results for the control, which was a triazole ligand in 0.1 M $TBAPF_6$/DMF.

Figure 22A:
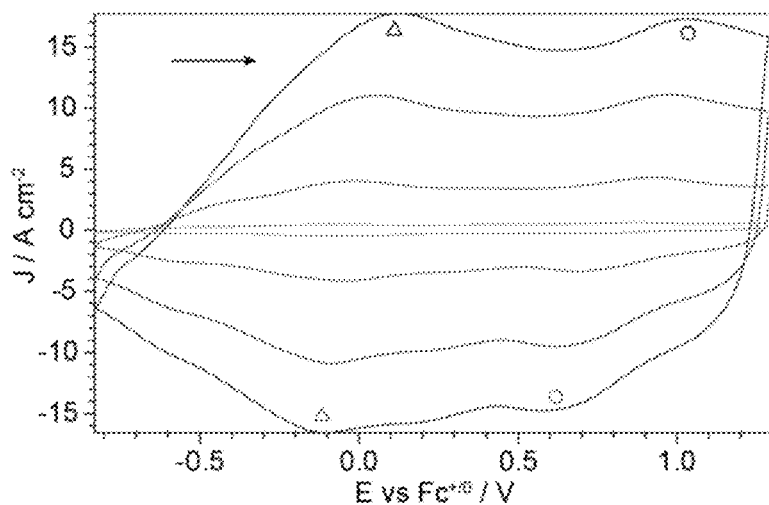
Figure 22B:
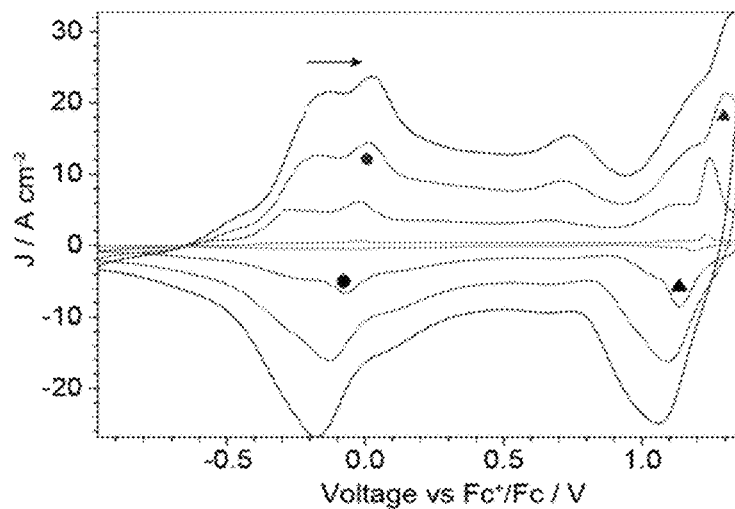
Figure 22C:
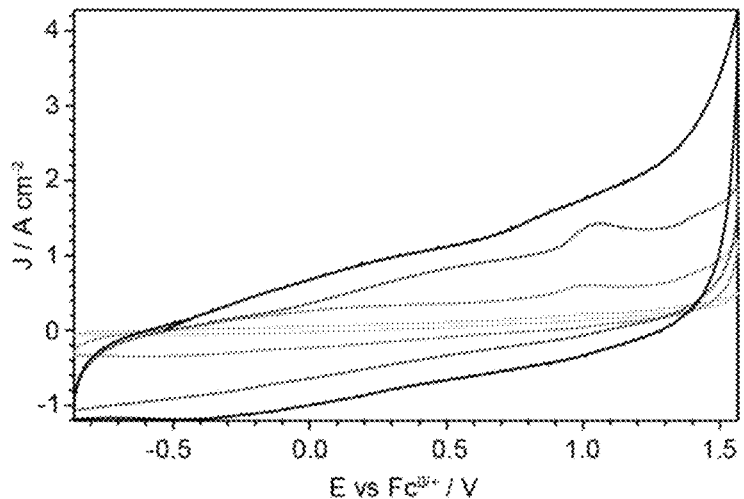

FIGS. 22A-22C show results obtained from analyzing various materials, wherein FIG. 22A shows CV scans for 16 nm iron-1,2,3-triazolate nanoparticles in the form of a film on the working electrode in 0.1 M $TBAPF_6$/MeCN, wherein scans were collected with rates of 10 mV/s (lightest green), 100 mV/s, 300 mV/s, and 500 mV/s (darkest green); FIG. 22B shows CV scans for 16 nm iron triazolate nanoparticles in 0.1 M $TBABF_4$/MeCN; and FIG. 22C shows CV scans of the bulk iron-1,2,3-triazolate material in the form of a film a glassy carbon electrode.

FIGS. 23A-23D are microscope images of MOF nanoparticle films used in quartz crystal microbalance ("QCM") evaluations, wherein FIG. 23A is an SEM image of a film as-deposited; FIG. 23B is an SEM image of a film used for CV scans in $TBABF_4$; FIG. 23C is an optical microscope image of a film after running CVs in $TBAPF_6$; and FIG. 23D is an optical microscope image of a film used to run CVs in $TBABF_4$.

Figure 24A:
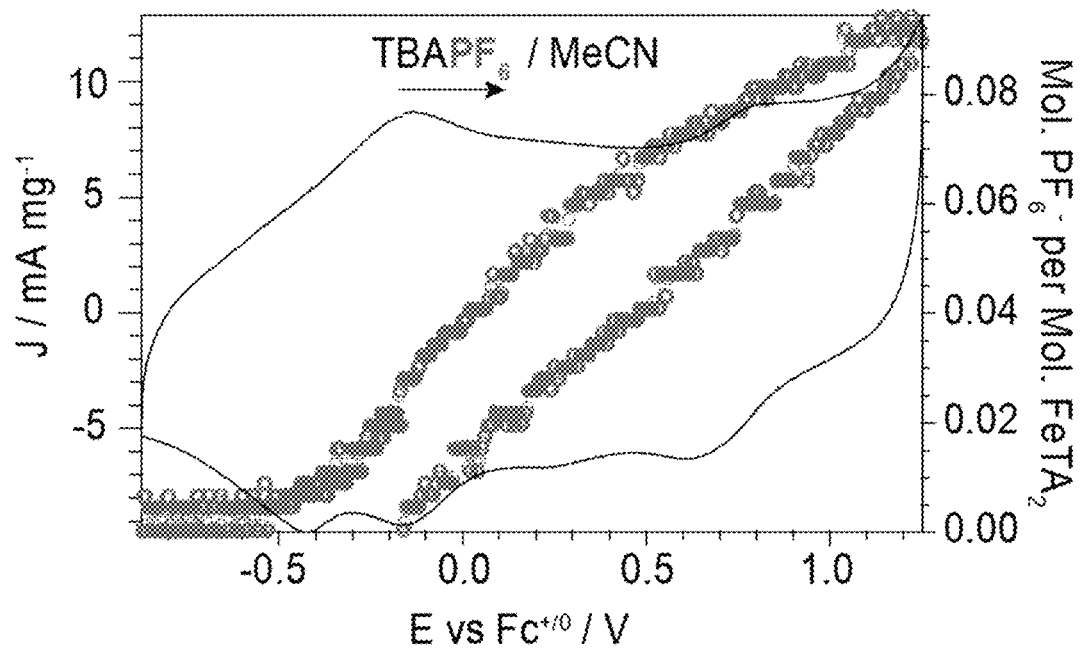
Figure 24B:
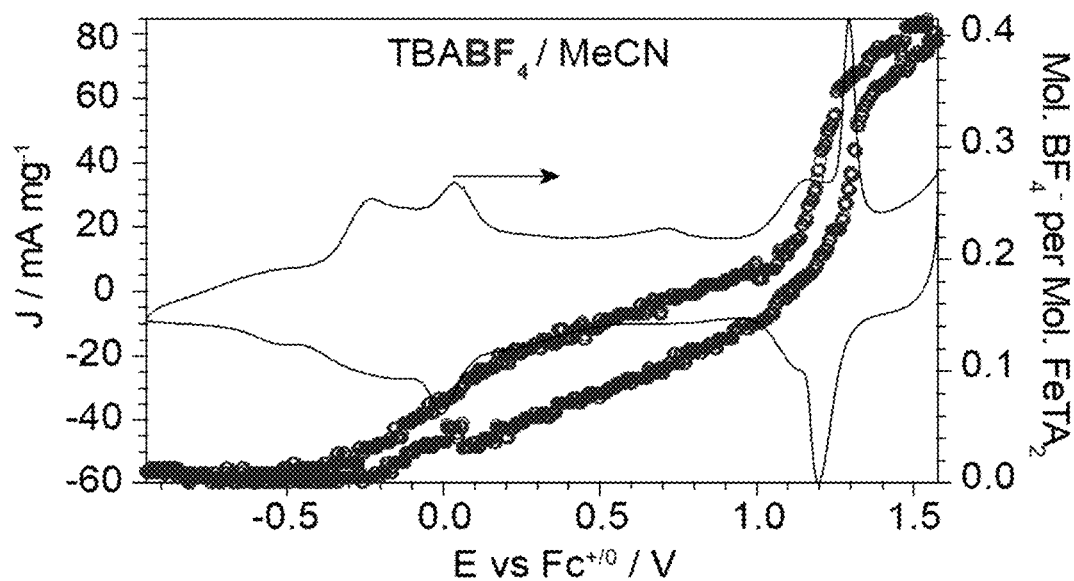

FIGS. 24A and 24B show CV traces collected at 100 mV/s with a Pt QCM electrode for 16 nm sized MOF nanoparticles in $TBAPF_6$/MeCN (FIG. 24A) and $TBABF_4$ (FIG. 24B), wherein colored open circles refer to the right axis, moles of anions with respect to moles $FeTA_2$ on the QCMs.

Figure 25A:
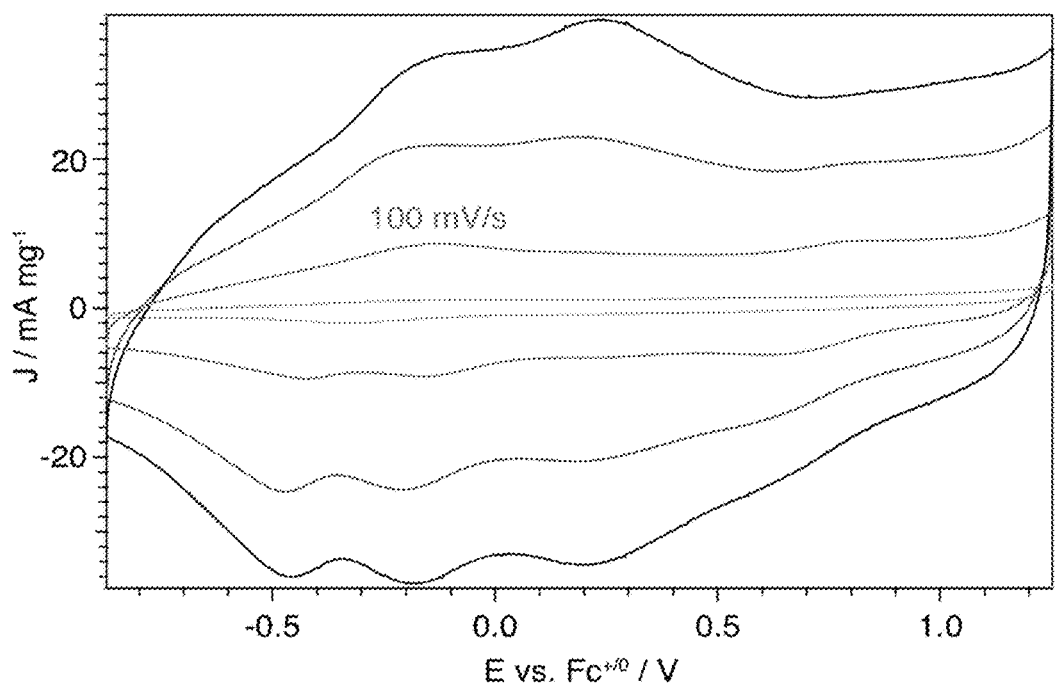
Figure 25B:
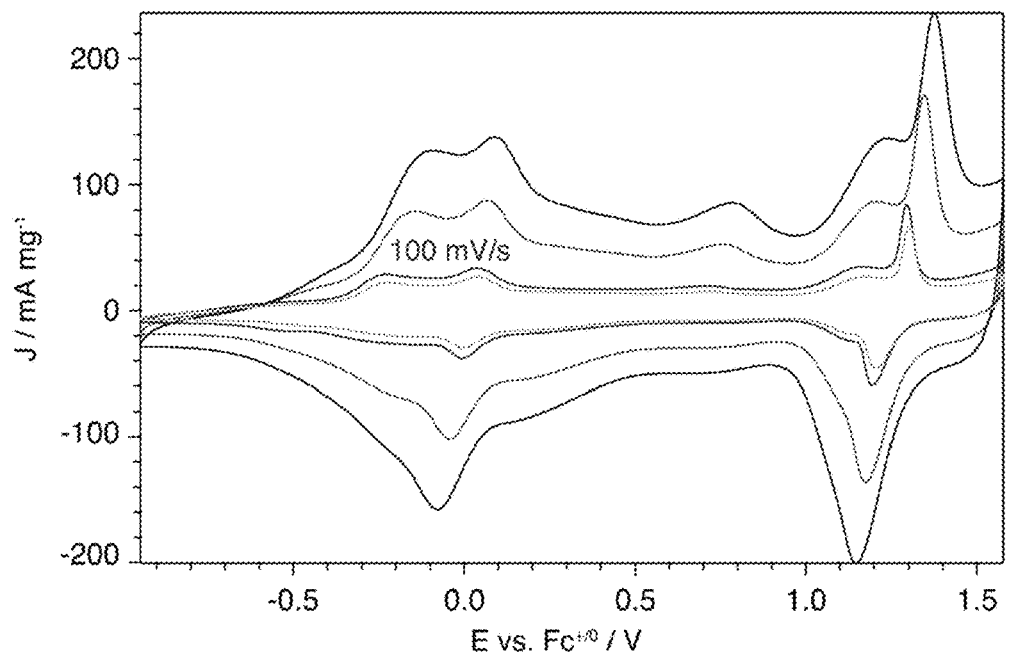
Figure 26A:
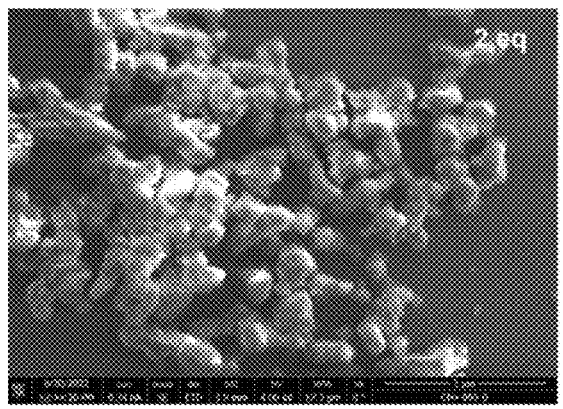
Figure 26B:
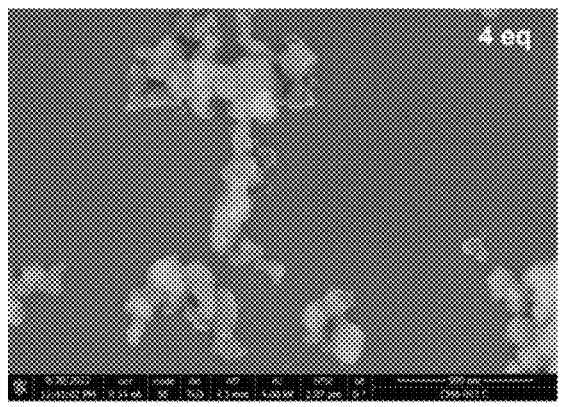
Figure 26C:
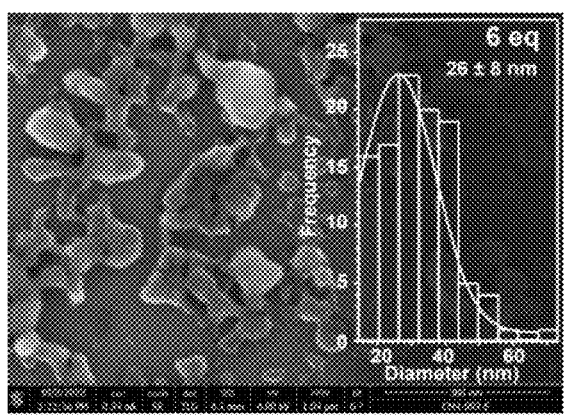
Figure 26D:
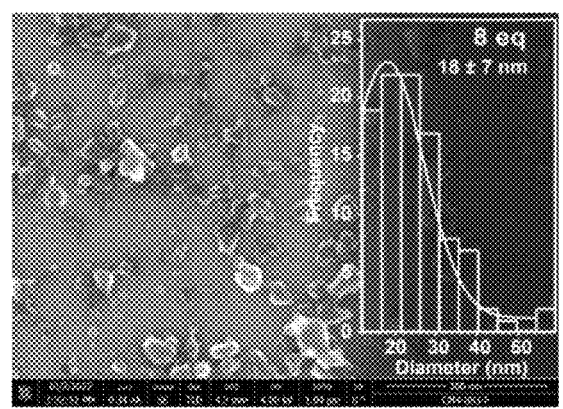

FIGS. 25A and 25B show CV scans with varying scan rate on QCM electrodes in $TBAPF_6$ (FIG. 25A) and $TBABF_4$ (FIG. 25B), wherein the lightest grey corresponds to 10 mV/s, followed by 100 mV/s, 300 mV/s, and finally 500 mV/s.

FIGS. 26A-26D show data obtained for manganese-1,2,3-triazolate MOF nanoparticles synthesized with varying equivalents (with respect to Mn source in the reaction) of 1-methylimidazole ("1-mlm"), including 2 equivalents (FIG. 26A), 4 equivalents (FIG. 26B), 6 equivalents (FIG. 26C), and 8 equivalents (FIG. 26D), wherein the insets show histograms of particle size distributions from >100 particles fitted to weighted gaussian distributions.

Figure 27A:
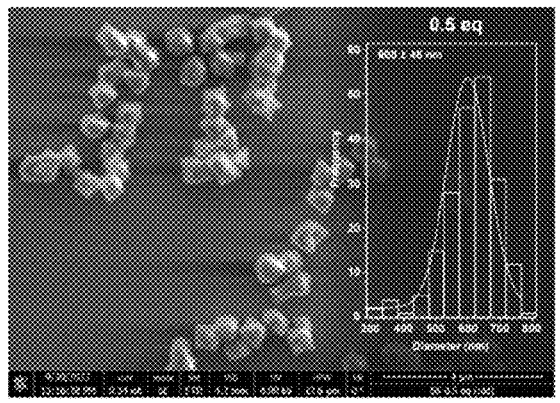
Figure 27B:
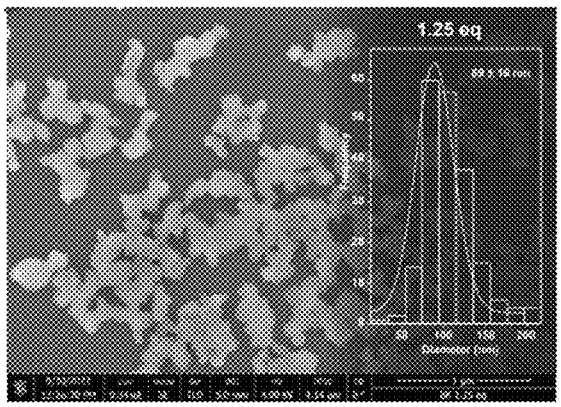
Figure 27C:
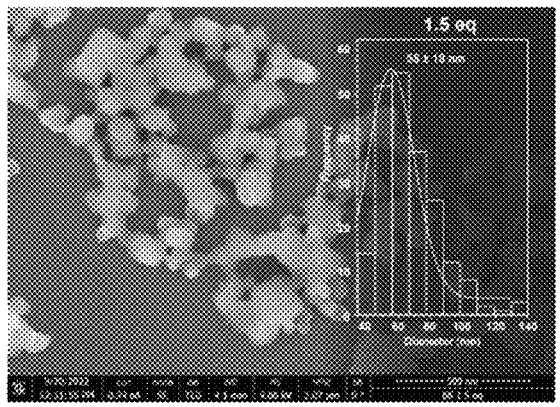
Figure 27D:
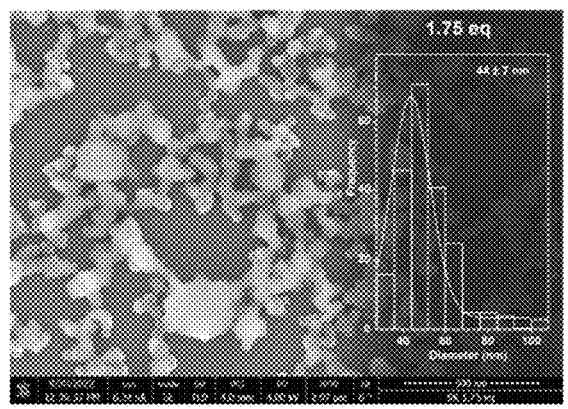
Figure 27E:
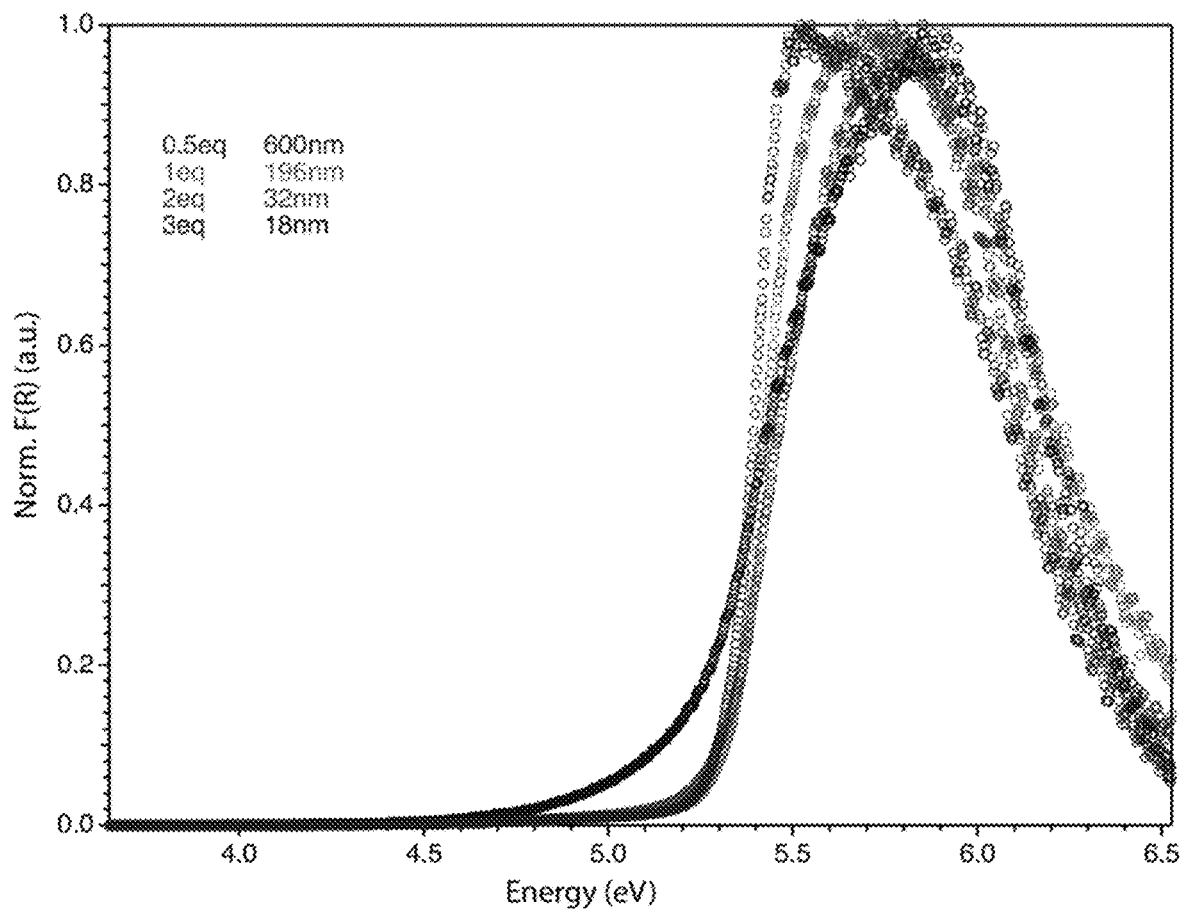

FIGS. 27A-27E include SEM images and other data obtained for cadmium-containing MOF nanoparticles, wherein FIGS. 27A-27D are SEM images for cadmium-1,2,3-triazolate MOF nanoparticles synthesized with varying equivalents (with respect to Cd used in the reaction) of 1-methylimidazole ("1-mlm"), including 0.5 equivalents (FIG. 27A), 1.25 equivalents (FIG. 27B), 1.5 equivalents (FIG. 27C), and 1.75 equivalents (FIG. 27D), wherein the insets show histograms of particle size distributions from >200 particles fitted to weighted gaussian distributions; and FIG. 27E shows the ultraviolet-visible spectroscopy (UV-VIS) size dependence and energy (eV) of the cadmium-1,2,3-triazolate MOF nanoparticles of FIGS. 27A-27D.

Figure 28A:
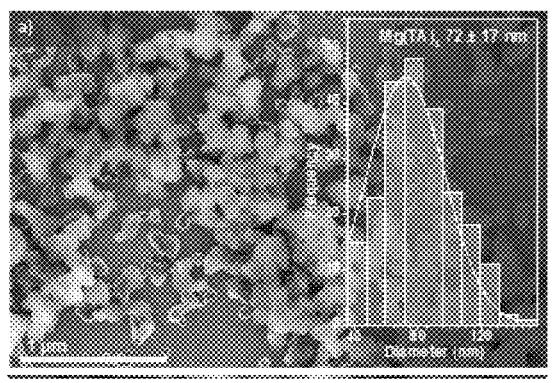
Figure 28B:
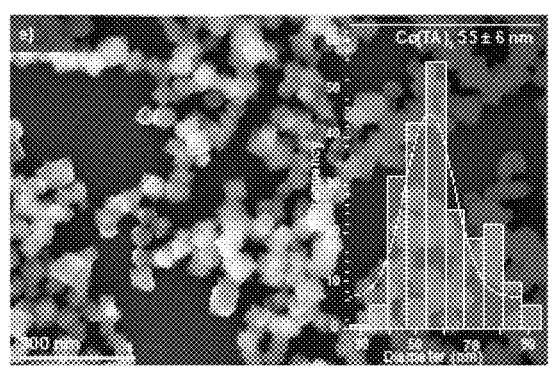
Figure 28C:
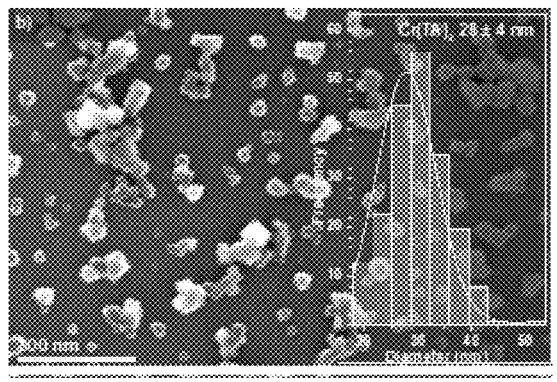
Figure 28D:
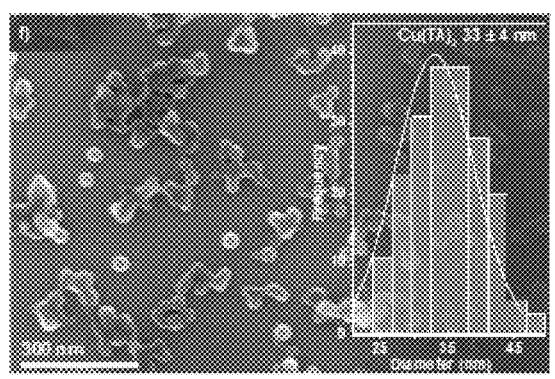
Figure 28E:
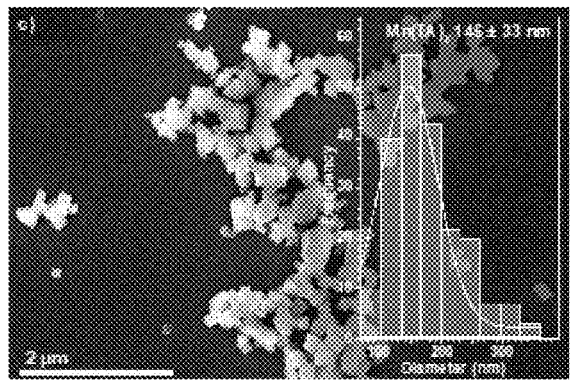
Figure 28F:
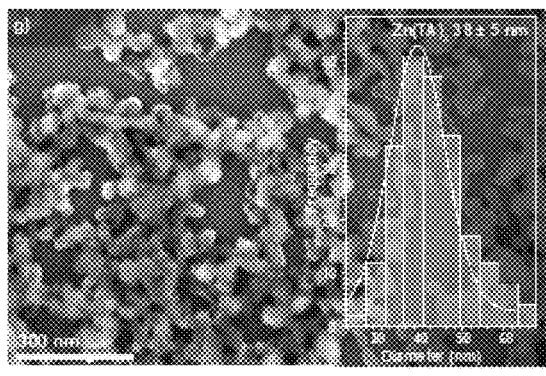
Figure 28G:
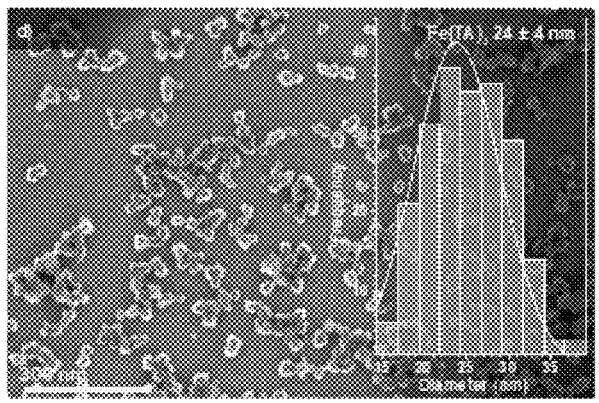
Figure 28H:
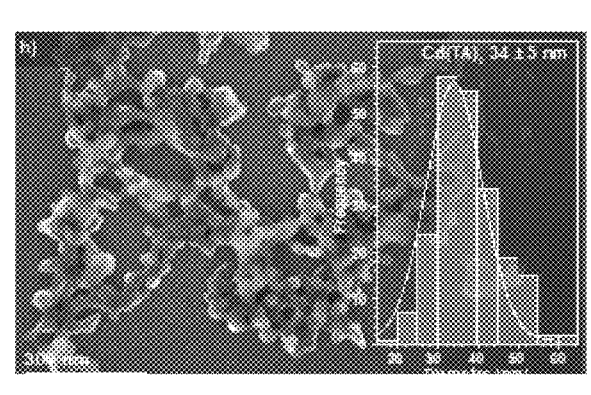

FIGS. 28A-28H include SEM images of various metal-containing-1,2,3-triazolate nanoparticles, including (i) magnesium-1,2,3-triazolate nanoparticles (FIG. 28A); (ii) cobalt-1,2,3-triazolate nanoparticles (FIG. 28B); (iii) chromium-1,2,3-triazolate nanoparticles (FIG. 28C); (iv) copper-1,2,3-triazolate (FIG. 28D); (v) magnesium-1,2,3-triazolate (FIG. 28E); (vi) zinc-1,2,3-triazolate (FIG. 28F); (vii) iron-1,2,3-triazolate (FIG. 28G); and (viii) cadmium-1,2,3-triazolate (FIG. 28H).

DETAILED DESCRIPTION

I. Overview of Terms

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

The devices and methods described herein should not be construed as limiting in any way. Instead, the present disclosure is directed toward all novel and non-obvious features and aspects of the various disclosed embodiments, alone and in various combinations and sub-combinations with one another. The disclosed devices and methods are not limited to any specific aspect or feature or combinations thereof, nor do the disclosed devices and methods require that any one or more specific advantages be present or problems be solved. Any theories of operation are to facilitate explanation, but the disclosed devices and methods are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed devices and methods can be used in conjunction with other devices and methods. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or devices are referred to as "lowest," "best," "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms are provided. Any functional group disclosed herein and/or defined below can be substituted or unsubstituted, unless otherwise indicated herein.

Aliphatic: A hydrocarbon group having at least one carbon atom to 50 carbon atoms ($C_{1-50}$), such as one to 25 carbon atoms ($C_{1-25}$), or one to ten carbon atoms ($C_{1-10}$), and which includes alkanes (or alkyl), alkenes (or alkenyl), alkynes (or alkynyl), including cyclic versions thereof, and further including straight- and branched-chain arrangements, and all stereo and position isomers as well.

Alkenyl: An unsaturated monovalent hydrocarbon having at least two carbon atoms to 50 carbon atoms ($C_{2-50}$), such as two to 25 carbon atoms ($C_{2-25}$), or two to ten carbon atoms ($C_{2-10}$), and at least one carbon-carbon double bond, wherein the unsaturated monovalent hydrocarbon can be derived from removing one hydrogen atom from one carbon atom of a parent alkene. An alkenyl group can be branched, straight-chain, cyclic (e.g., cycloalkenyl), cis, or trans (e.g., E or Z).

Alkoxy: —O-aliphatic, such as —O-alkyl, —O-alkenyl, —O-alkynyl; with exemplary embodiments including, but not limited to, methoxy, ethoxy, n-propoxy, isopropoxy, n-butoxy, t-butoxy, sec-butoxy, n-pentoxy (wherein any of the aliphatic components of such groups can comprise no double or triple bonds, or can comprise one or more double and/or triple bonds).

Alkyl: A saturated monovalent hydrocarbon having at least one carbon atom to 50 carbon atoms ($C_{1-50}$), such as one to 25 carbon atoms ($C_{1-25}$), or one to ten carbon atoms ($C_{1-10}$), wherein the saturated monovalent hydrocarbon can be derived from removing one hydrogen atom from one carbon atom of a parent compound (e.g., alkane). An alkyl group can be branched, straight-chain, or cyclic (e.g., cycloalkyl).

Alkynyl: An unsaturated monovalent hydrocarbon having at least two carbon atoms to 50 carbon atoms ($C_{2-50}$), such as two to 25 carbon atoms ($C_{2-25}$), or two to ten carbon atoms ($C_{2-10}$), and at least one carbon-carbon triple bond, wherein the unsaturated monovalent hydrocarbon can be derived from removing one hydrogen atom from one carbon atom of a parent alkyne. An alkynyl group can be branched, straight-chain, or cyclic (e.g., cycloalkynyl).

Amide: —C(O)NR$^a$R$^b$ or —NR$^a$C(O)R$^b$ wherein each of R$^a$ and R$^b$ independently is selected from hydrogen, aliphatic, heteroaliphatic, haloaliphatic, haloheteroaliphatic, aromatic, or an organic functional group.

Amino: —NR$^a$R$^b$, wherein each of R$^a$ and R$^b$ independently is selected from hydrogen, aliphatic, heteroaliphatic, haloaliphatic, haloheteroaliphatic, aromatic, or an organic functional group.

Aromatic: A cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Hückel rule (4n+2). The point of attachment to the parent structure typically is through an aromatic portion of the condensed ring system. For example,

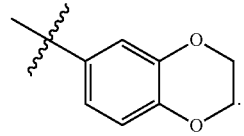 [SMILES: *c1ccc2c(c1)OCCO2]

However, in certain examples, context or express disclosure may indicate that the point of attachment is through a non-aromatic portion of the condensed ring system. For example,

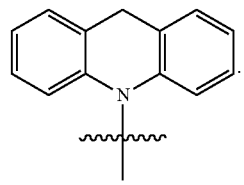 [SMILES: *N1c2ccccc2Cc2ccccc21]

An aromatic group or moiety may comprise only carbon atoms in the ring, such as in an aryl group or moiety, or it may comprise one or more ring carbon atoms and one or more ring heteroatoms comprising a lone pair of electrons (e.g., S, O, N, P, or Si), such as in a heteroaryl group or moiety. Aromatic groups may be substituted with one or more groups other than hydrogen, such as aliphatic, heteroaliphatic, haloaliphatic, haloheteroaliphatic, aromatic, or an organic functional group.

Aryl: An aromatic carbocyclic group comprising at least five carbon atoms to 15 carbon atoms ($C_5$-$C_{15}$), such as five to ten carbon atoms ($C_5$-$C_{10}$), having a single ring or multiple condensed rings, which condensed rings can or may not be aromatic provided that the point of attachment to a remaining position of the compounds disclosed herein is through an atom of the aromatic carbocyclic group. Aryl groups may be substituted with one or more groups other than hydrogen, such as aliphatic, heteroaliphatic, haloaliphatic, haloheteroaliphatic, aromatic, or an organic functional group.

Aroxy: —O-aromatic.

Azo: —N═N$R^a$ wherein $R^a$ is hydrogen, aliphatic, heteroaliphatic, haloaliphatic, haloheteroaliphatic, aromatic, or an organic functional group.

Bulk Material: A material comprising a plurality of particles, wherein a majority of the particles have an average size above 300 nm in all dimensions. Bulk materials have different chemical and physical properties compared to the MOF nanoparticles disclosed herein. A bulk material typically comprises a majority of particles that are visible to the naked eye and bulk materials typically exhibit particle sizes in a very large range, often exhibiting polydispersity index values above 0.3.

Carbamate: —OC(O)N$R^a R^b$, wherein each of $R^a$ and $R^b$ independently is selected from hydrogen, aliphatic, heteroaliphatic, haloaliphatic, haloheteroaliphatic, aromatic, or an organic functional group.

Carboxyl: —C(O)OH.

Carboxylate: —C(O)O— or salts thereof, wherein the negative charge of the carboxylate group may be balanced with an $M^+$ counterion, wherein $M^+$ may be an alkali ion, such as $K^+$, $Na^+$, $Li^+$; an ammonium ion, such as $^+N(R^b)_4$ where $R^b$ is H, aliphatic, heteroaliphatic, haloaliphatic, haloheteroaliphatic, or aromatic; or an alkaline earth ion, such as $[Ca^{2+}]_{0.5}$, $[Mg^{2+}]_{0.5}$, or $[Ba^{2+}]_{0.5}$.

Coordination Complex: A structure comprising a central atom (or ion), typically a metal component (or ion thereof) as described herein, and one or more surrounding ligand components, such as a 1,2,3-triazolate ligand as described herein, that are coordinated with the central atom (or ion). In particular embodiments, the ligand component and the central atom or ion can be coordinated through a coordinate covalent bond, wherein the ligand component binds the central atom or ion through one or more lone pairs; or the ligand component and the central atom or ion can be coordinated through a covalent bond, wherein the ligand component and central atom or ion bind one another by each providing a single electron to the other component.

Cyano: —CN.

Disulfide: —SSRa, wherein $R^a$ is selected from hydrogen, aliphatic, heteroaliphatic, haloaliphatic, haloheteroaliphatic, aromatic, or an organic functional group.

Dithiocarboxylic: —C(S)S$R^a$ wherein $R^a$ is selected from hydrogen, aliphatic, heteroaliphatic, haloaliphatic, haloheteroaliphatic, aromatic, or an organic functional group.

Ester: —C(O)O$R^a$ or —OC(O)$R^a$, wherein $R^a$ is selected from aliphatic, heteroaliphatic, haloaliphatic, haloheteroaliphatic, aromatic, or an organic functional group.

Ether: -aliphatic-O-aliphatic, -aliphatic-O-aromatic, -aromatic-O-aliphatic, or -aromatic-O-aromatic.

Halo (or halide or halogen): Fluoro, chloro, bromo, or iodo.

Haloaliphatic: An aliphatic group wherein one or more hydrogen atoms, such as one to 10 hydrogen atoms, independently is replaced with a halogen atom, such as fluoro, bromo, chloro, or iodo.

Haloheteroaliphatic: A heteroaliphatic group wherein one or more hydrogen atoms, such as one to 10 hydrogen atoms, independently is replaced with a halogen atom, such as fluoro, bromo, chloro, or iodo.

Heteroaliphatic: An aliphatic group comprising at least one heteroatom to 20 heteroatoms, such as one to 15 heteroatoms, or one to 5 heteroatoms, which can be selected from, but not limited to oxygen, nitrogen, sulfur, silicon, boron, selenium, phosphorous, and oxidized forms thereof within the group. Alkoxy, ether, amino, disulfide, peroxy, and thioether groups are exemplary (but non-limiting) examples of heteroaliphatic. In some embodiments, a fluorophore can also be described herein as a heteroaliphatic group, such as when the heteroaliphatic group is a heterocyclic group.

Heteroaryl: An aryl group comprising at least one heteroatom to six heteroatoms, such as one to four heteroatoms, which can be selected from, but not limited to oxygen, nitrogen, sulfur, silicon, boron, selenium, phosphorous, and oxidized forms thereof within the ring. Such heteroaryl groups can have a single ring or multiple condensed rings, wherein the condensed rings may or may not be aromatic and/or contain a heteroatom, provided that the point of attachment is through an atom of the aromatic heteroaryl group. Heteroaryl groups may be substituted with one or more groups other than hydrogen, such as aliphatic, heteroaliphatic, haloaliphatic, haloheteroaliphatic, aromatic, or an organic functional group. In some embodiments, a fluorophore can also be described herein as a heteroaryl group.

Heteroatom: An atom other than carbon or hydrogen, such as (but not limited to) oxygen, nitrogen, sulfur, silicon, boron, selenium, or phosphorous. In particular disclosed embodiments, such as when valency constraints do not permit, a heteroatom does not include a halogen atom.

Ketone: —C(O)$R^a$, wherein $R^a$ is selected from aliphatic, heteroaliphatic, haloaliphatic, haloheteroaliphatic, aromatic, or an organic functional group.

Metal-Organic Framework: A material comprising at least one metal component (or ion thereof) coordinated to a 1,2,3-triazolate ligand according to the present disclosure to provide a three-dimensional structure.

Nanoparticle: A nano-sized particle having an average size ranging from 1 nm to 200 nm in all directions. Nanoparticles of the present disclosure are not visible to the naked eye.

Nitrogen-Containing Compound: A compound or functional group comprising at least one nitrogen atom that is capable of competing with a ligand component to bind a metal component. In some embodiments, the nitrogen-containing compound is a nitrogen-containing heteroaryl compound, which is an aryl ring comprising at least one nitrogen atom capable of forming a coordinate covalent or a covalent bond with a metal component. In some embodiments, the nitrogen-containing compound is an aliphatic amine compound comprising at least one nitrogen atom capable of forming a coordinate covalent or a covalent bond with a metal component.

Organic Functional Group: A functional group that may be provided by any combination of aliphatic, heteroaliphatic, aromatic, haloaliphatic, and/or haloheteroaliphatic groups, or that may be selected from, but not limited to, aldehyde; aroxy; acyl halide; halogen; nitro; cyano; azide; carboxyl (or carboxylate); amide; ketone; carbonate; imine; azo; carbamate; hydroxyl; thiol; sulfonyl (or sulfonate); oxime; ester; thiocyanate; thioketone; thiocarboxylic acid; thioester; dithiocarboxylic acid or ester; phosphonate; phosphate; silyl ether; sulfinyl; thial; or combinations thereof.

Oxime: —$CR^a$=NOH, wherein $R^a$ is hydrogen, aliphatic, heteroaliphatic, haloaliphatic, haloheteroaliphatic, aromatic, or an organic functional group.

Peroxy: —O—$OR^a$ wherein $R^a$ is hydrogen, aliphatic, heteroaliphatic, haloaliphatic, haloheteroaliphatic, aromatic, or an organic functional group.

Phosphate: —O—$P(O)(OR^a)_2$, wherein each $R^a$ independently is hydrogen, aliphatic, heteroaliphatic, haloaliphatic, haloheteroaliphatic, aromatic, or an organic functional group; or wherein one or more $R^a$ groups are not present and the phosphate group therefore has at least one negative charge, which can be balanced by a counterion, $M^+$, wherein each $M^+$ independently can be an alkali ion, such as $K^+$, $Na^+$, $Li^+$; an ammonium ion, such as $^+N(R^b)_4$ where $R^b$ is H, aliphatic, heteroaliphatic, haloaliphatic, haloheteroaliphatic, or aromatic; or an alkaline earth ion, such as $[Ca^{2+}]_{0.5}$, $[Mg^{2+}]_{0.5}$, or $[Ba^{2+}]_{0.5}$.

Phosphonate: —$P(O)(OR^a)_2$, wherein each $R^a$ independently is hydrogen, aliphatic, heteroaliphatic, haloaliphatic, haloheteroaliphatic, aromatic, or an organic functional group; or wherein one or more $R^a$ groups are not present and the phosphate group therefore has at least one negative charge, which can be balanced by a counterion, $M^+$, wherein each $M^+$ independently can be an alkali ion, such as $K^+$, $Na^+$, $Li^+$; an ammonium ion, such as $^+N(R^b)_4$ where $R^b$ is H, aliphatic, heteroaliphatic, haloaliphatic, haloheteroaliphatic, or aromatic; or an alkaline earth ion, such as $[Ca^{2+}]_{0.5}$, $[Mg^{2+}]_{0.5}$, or $[Ba^{2+}]_{0.5}$.

Silyl Ether: —$OSiR^aR^b$, wherein each of $R^a$ and $R^b$ independently is selected from hydrogen, aliphatic, heteroaliphatic, haloaliphatic, haloheteroaliphatic, aromatic, or an organic functional group.

Substrate: A physical object having a surface upon which a thin film of the present disclosure can be placed. In some embodiments, the substrate can be made of any suitable material and can have any shape. The substrate can be porous or non-porous.

Sulfinyl: —S(O) $R^a$, wherein $R^a$ is selected from hydrogen, aliphatic, heteroaliphatic, haloaliphatic, haloheteroaliphatic, aromatic, or an organic functional group.

Sulfonyl: —$SO_2R^a$, wherein $R^a$ is selected from hydrogen, aliphatic, heteroaliphatic, haloaliphatic, haloheteroaliphatic, aromatic, or an organic functional group.

Sulfonamide: —$SO_2NR^aR^b$ or —$N(R^a)SO_2R^b$, wherein each of $R^a$ and $R^b$ independently is selected from hydrogen, aliphatic, heteroaliphatic, haloaliphatic, haloheteroaliphatic, aromatic, or an organic functional group.

Sulfonate: —$SO_3$, wherein the negative charge of the sulfonate group may be balanced with an $M^+$ counter ion, wherein $M^+$ may be an alkali ion, such as $K^+$, $Na^+$, $Li^+$; an ammonium ion, such as $^+N(R^b)_4$ where $R^b$ is H, aliphatic, heteroaliphatic, haloaliphatic, haloheteroaliphatic, or aromatic; or an alkaline earth ion, such as $[Ca^{2+}]_{0.5}$, $[Mg^{2+}]_{0.5}$, or $[Ba^{2+}]_{0.5}$.

Thial: —C(S)H.

Thiocarboxylic acid: —C(O)SH, or —C(S)OH.

Thiocyanate: —S—CN or —N=C=S.

Thioester: —$C(O)SR^a$ or —$C(S)OR^a$ wherein $R^a$ is selected from hydrogen, aliphatic, heteroaliphatic, haloaliphatic, haloheteroaliphatic, aromatic, or an organic functional group.

Thioether: —S-aliphatic or —S-aromatic, such as —S-alkyl, —S-alkenyl, —S-alkynyl, —S-aryl, or —S— heteroaryl; or -aliphatic-S-aliphatic, -aliphatic-S-aromatic, -aromatic-S-aliphatic, or -aromatic-S-aromatic.

Thioketone: —$C(S)R^a$ wherein $R^a$ is selected from hydrogen, aliphatic, heteroaliphatic, haloaliphatic, haloheteroaliphatic, aromatic, or an organic functional group.

Thin Film: A monolayer, or a combination of multiple layers, formed of a plurality of MOF nanoparticle embodiments of the present disclosure. In particular embodiments, the thin film has a thickness ranging from 10 nm to 20 mm.

II. Introduction

Nanocrystal synthesis of metals, inorganic semiconductors, and hybrid perovskites have revolutionized materials science due to their intriguing and useful size-dependent properties as well as their facile solution processibility. Colloidal stability also enables physical characterization strategies, such as solution-state optical spectroscopy and electrochemistry, which serve as the foundation for understanding size-dependent behavior. Despite the intense research attention from wide-ranging fields into the class of materials known as metal-organic frameworks (MOFs), their preparation as stable, monodisperse nanoparticles remains an open frontier. The drive to develop these diverse materials as nanocrystals stems from the benefit of shorter diffusion pathlengths, which gives them enhanced properties compared to their bulk counterparts, such as higher catalytic activity, improved permeability in separation membranes, and finally the entirely new option of using nanoMOFs as drug delivery agents. Because nearly all MOFs are electrical insulators, it is currently believed that size-dependent MOF behavior arises from mass transport rates and a higher ratio of exposed surface area, whereas particles derived from the small subset of conductive MOFs are more likely to exhibit size-dependent electronic, optical, and magnetic behavior owing to their delocalized bonding. Recently, conductive metal-organic frameworks have attracted intense interest as molecularly defined platforms for studying energy storage, electrocatalysis, chemiresistive sensing, and other electronic technologies that would benefit from microporosity and high surface areas. However, conductive MOFs are limited in application due to their morphology: the vast majority of current synthetic protocols yield polycrystalline powder. Even though methods have been developed that generate thin films grown on surfaces and at interfaces, these approaches lack control over the size of the individual crystallites. Post-synthetic top-down methods, such as sonication, can create solution-processable colloids of 2D conductive MOFs, but once again the crystal sizes are uncontrolled. While single crystalline conductive MOFs offer an attractive alternative by minimizing resistive grain boundaries, their preparation is limited to small scale. A synthetic method to yield solution-processable conductive MOFs with controlled particle size is greatly needed.

Disclosed herein are MOF syntheses that have never been performed on the nanoscale and corresponding MOF nanoparticles obtained therefrom that exhibit superior colloidal stability, conductivity, and/or other properties (e.g., size-dependent optical properties and redox chemistry sensitive to guest-host interactions) as compared to bulk materials. Precise control over conductive MOF nanoparticle sizes, as can be achieved using the disclosed method embodiments, facilitates their application in myriad applications, while enabling solution-state analysis to reveal size-dependent physical properties. Also, the solution processability of the monodisperse colloid embodiments disclosed herein enables their fabrication into thin films for conductivity measurements that also exhibit a strong size-dependence. Further, the colloidal stability obtained using particle and method embodiments disclosed herein enables characterization by solution-state UV-vis spectroscopy and electrochemistry.

III. Product Embodiments

Disclosed herein are product embodiments that comprise unique conductive MOF nanoparticles, including the nanoparticles themselves, compositions comprising the nanoparticles, and other products comprising the nanoparticles and/or compositions thereof. The MOF nanoparticle embodiments of the present disclosure exhibit a number of properties that are superior to the bulk material counterpart and/or MOF nanoparticles currently known in the art. In some embodiments, the MOF nanoparticles exhibit good colloidal stability (e.g., decreased polydispersity), increased conductivity, and/or solution processability.

The MOF nanoparticles of the present disclosure comprise a coordination complex formed between a metal component and a ligand component. In some embodiments, the coordination complex can comprise, consist essentially of, or consist of the metal and ligand components. In particular embodiments, the metal component is a first-row transition metal or the metal component can be selected from other transition metals. In some embodiments, the first-row transition metal may comprise any of the first-row elements of Groups 4-11 of the Periodic Table. In yet additional embodiments, other transition metals, such as cadmium and others, can be used. In an independent embodiment, the metal is not or is other than copper. In some embodiments, the metal component may be in ion form, such as an ion of iron, cobalt, cadmium, nickel, magnesium, zinc, titanium, vanadium, chromium, manganese, and copper. In exemplary embodiments, the first-row transition metal ions are selected from $Mg^{+2}$, $Sc^{+3}$, $Ti^{+4}$, $V^{+3}$, $V^{+4}$, $V^{+5}$, $Cr^{+2}$, $Cr^{+3}$, $Cr^{+6}$, $Mn^{+5}$, $Mn^{+3}$, $Mn^{+2}$, $Fe^{+2}$, $Fe^{+3}$, $Co^{+3}$, $Co^{+2}$, $Ni^{+2}$, $Ni^{+3}$, $Zn^{2+}$, $Cd^{2+}$, $Cu^+$, and $Cu^{+2}$.

Figure 1:
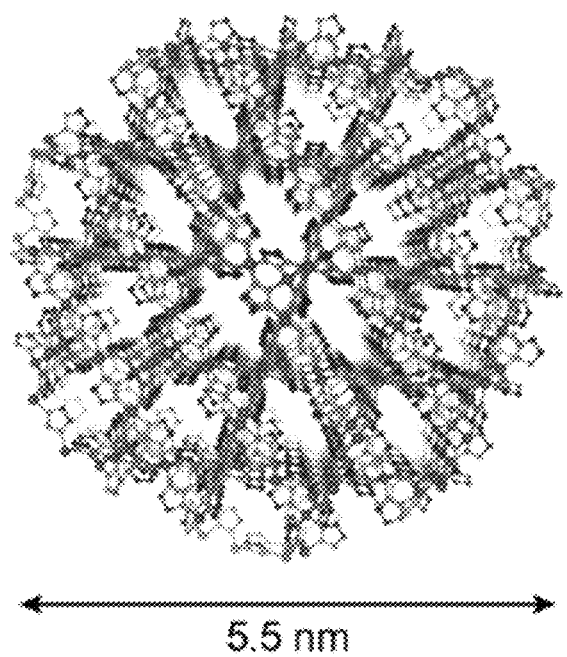
FIG. 1 illustrates a schematic representation of an MOF nanoparticle comprising an iron-1,2,3-triazolate MOF.
Figure 2:
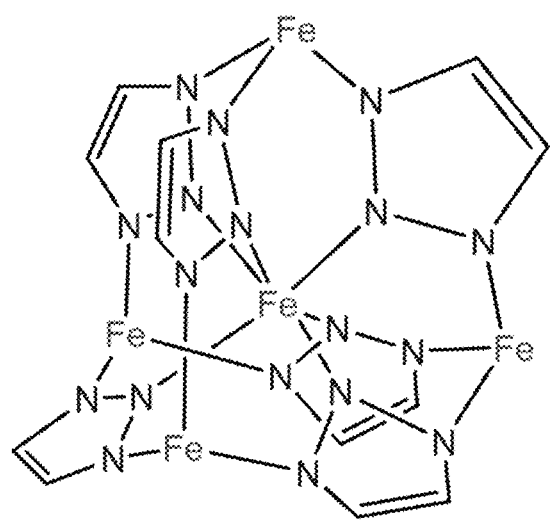
FIG. 2 illustrates the structure of a representative MOF comprising coordination complexes between 1,2,3-triazolate ligands and iron ions.

The ligand component of the MOF nanoparticles comprises a 1,2,3-triazolate ring. In some embodiments, the 1,2,3-triazolate ring can be substituted on one or both carbon atoms of the ring. In some such embodiments, the substituent on the carbon atom(s) can be selected from an aliphatic group, an aromatic group, a heteroaliphatic group, a haloaliphatic group, a haloheteroaliphatic group, or an organic functional group. In representative embodiments, the MOF nanoparticles comprise an MOF network comprising a plurality of iron-1,2,3-triazolate coordination complexes, cobalt-1,2-3-triazolate coordination complexes, or combinations thereof. A schematic illustration of a representative iron-triazolate particle is provided by FIG. 1. The metal-ligand coordination complexes typically comprise at least one chemical bond (e.g., at least one covalent or coordinate covalent) formed between the metal component and the ligand component. In some embodiments, the metal-ligand coordination complexes comprise a plurality of metal components that are chemically bound to two or more ligand components, such as three ligand components, four ligand components, five ligand components, or six ligand components. An illustration of a representative iron-1,2,3-triazolate coordination complex is illustrated in FIG. 2.

MOF nanoparticles of the present disclosure can have average sizes ranging from 4 nm to 150 nm, such as 4.5 nm to 150 nm, or 5 nm to 130 nm, or 5.5 nm to 130 nm. In particular embodiments, the MOF nanoparticles can have average sizes ranging from 5 nm to 50 nm, such as 5 nm to 48 nm, or 5 nm to 25 nm, or 5 nm to 16 nm. In some other particular embodiments, the MOF nanoparticles can have sizes ranging from greater than 50 nm to 130 nm, such as 75 nm to 100 nm, or 75 nm to 90 nm, or 75 nm to 85 nm. Particular embodiments exhibit sizes of 5.5 nm, 6.8 nm, 16 nm, 17 nm, 18 nm, 21 nm, 22 nm, 24 nm, 25 nm, 26 nm, 28 nm, 32 nm, 33 nm, 34 nm, 38 nm, 42 nm, 44 nm, 47 nm, 48 nm, 55 nm, 72 nm, 78 nm, 84 nm, 89 nm, 112 nm, 130 nm, and 146 nm. In particular disclosed embodiments, the MOF nanoparticle size is determined as a crystallite size using Scherrer analysis, such as by using Equation 1.

$$\tau = \frac{K\lambda}{\beta\cos\theta} \qquad \text{Equation 1}$$

With reference to Equation 1, t is the crystallite size, K is the shape factor (set at 1 for embodiments calculated herein), $\Delta$ is the source X-ray wavelength (Cu Ka, 0.154 nm), $\beta$ is the full width at half max in radians, and $\theta$ is the half of the peak position in radians. For particles larger than 10 nm, size is additionally determined by scanning electron microscopy, a measurement that will typically give a larger value than that determined by Scherrer analysis from the same particle batch.

As discussed above, embodiments of the MOF nanoparticles disclosed herein typically comprise a crystal structure. The crystalline MOF nanoparticle embodiments comprise crystals with any suitable morphology, such as spherical crystals, rod-like crystals, octahedral crystals, triangular crystals, and other shapes. In representative embodiments, the MOF nanoparticles have a spherical, octahedral, or truncated octahedral shape. In independent embodiments, the MOF nanoparticles are not amorphous or are not in powder form and thus are distinct from bulk materials. The MOF nanoparticles comprise pores that can have controlled sizes. In particular embodiments, the pores can have sizes ranging from 3 Å to 8 Å, such as 3 Å to 6 Å, or 3.5 Å to 5 Å, or 3.5 Å to 4.5 Å. In particular embodiments, the MOF nanoparticles are iron-triazolate nanoparticle embodiments having a pore size of 4.5 Å.

Compositions comprising the MOF nanoparticles, such as a plurality of MOF nanoparticles, exhibit decreased polydispersity as compared to bulk materials comprising a similar MOF and/or other MOF-like particles (e.g., MOF particles that are larger than the MOF nanoparticles disclosed herein and/or that are in amorphous/powder form and/or other MOF materials comprising ligands other than 1,2,3-triazolate). The MOF nanoparticle-containing compositions of the present disclosure also exhibit the ability to avoid aggregation. In particular embodiments, compositions comprising a plurality of the MOF nanoparticles exhibit polydispersity values (expressed as the polydispersity index value, or "PDI") ranging from between a value of 0 to a value of less than 0.4, such as greater than 0 to less than 0.3, or 0.05 to 0.25 (or less), or 0.06 to 0.21 (or less), or 0.06 to 0.18 (or less). In particular embodiments, MOF nanoparticles of small size (e.g., 4 nm to 50 nm) provided PDI values below 0.21, such as 0.06, 0.09, 0.1, 0.11, and 0.18. In particular embodiments, MOF nanoparticles of larger size (e.g., greater than 50 nm to 150 nm) provide PDI values that can be higher than 0.21. Regardless of higher PDI values, such embodiments still exhibit improved PDI values relative to other MOF materials in the art and particularly bulk materials.

In some embodiments, the MOF nanoparticle-containing composition may comprise, consist essentially of, or consist of the MOF nanoparticles or a combination of the MOF nanoparticles and a modulator component, a binder material, and/or a conductive material. The modulator component can be a nitrogen-containing compound capable of competitively binding with the metal component of the MOF nanoparticle relative to the ligand component. The modulator component, however, does not become part of the MOF coordination complex comprising the metal component and the ligand component. In particular embodiments, the modulator component is a nitrogen-containing heteroaryl compound, such as an imidazole-based compound. Exemplary imidazole-based compounds can include, but are not limited to, 1-methylimidazole, 5-bromo-1-methylimidazole, 1-benzyl-2-methylimidazole, and combinations thereof. In some other embodiments, the modulator can be an aliphatic amine compound, such as n-butylamine or other aliphatic amines. In representative embodiments, 1-methylimidazole is used as the modulator component. Composition embodiments comprising the modulator component typically comprise the MOF nanoparticles with the modulator component present at an amount relative to the amount of metal component present in the composition. In some embodiments, the modulator component is present at an amount equal to or lower than 11 equivalents relative to the metal component, such as 10 equivalents or less, or 8 equivalents or less, or 6 equivalents or less, or 4 equivalents or less. In some embodiments, the composition is free of the modulator component. In yet additional embodiments, the composition comprises the MOF nanoparticles, a binder (e.g., polyvinylidene fluoride, or other binder or polymer material known in the art with the benefit of the present disclosure), and a conductive material, such as a carbon black or other carbonaceous material. Such compositions can be used to provide conductive composite materials.

In exemplary non-limiting embodiments, the MOF nanoparticle may comprise $Mg(TA)_2$ (e.g., see FIG. 28A); $Co(TA)_2$ (e.g., see FIG. 28B); $Cr(TA)_2$ (e.g., see FIG. 28C); $Cu(TA)_2$ (e.g., see FIG. 28D); $Mn(TA)_2$ (e.g., see FIG. 28E); $Zn(TA)_2$ (e.g., see FIG. 28F); $Fe(TA)_2$ (e.g., see FIG. 28G); and $Cd(TA)_2$ (e.g., see FIG. 28H).

Figure 3A:
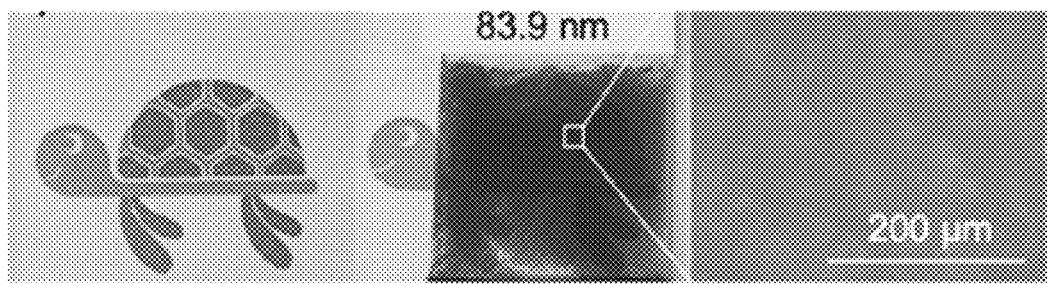
Figure 3B:
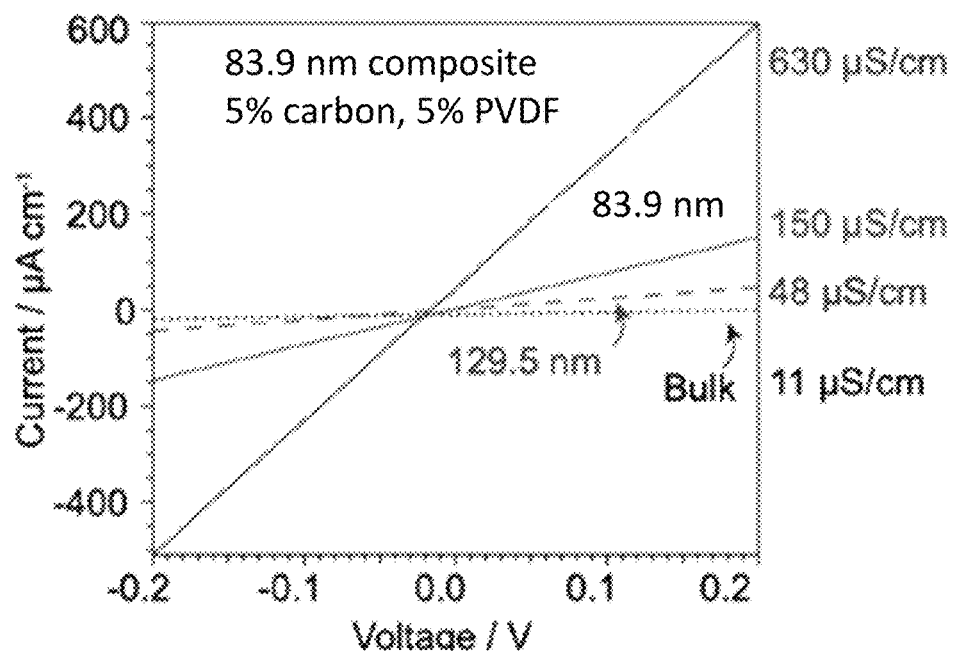
Figure 3C:
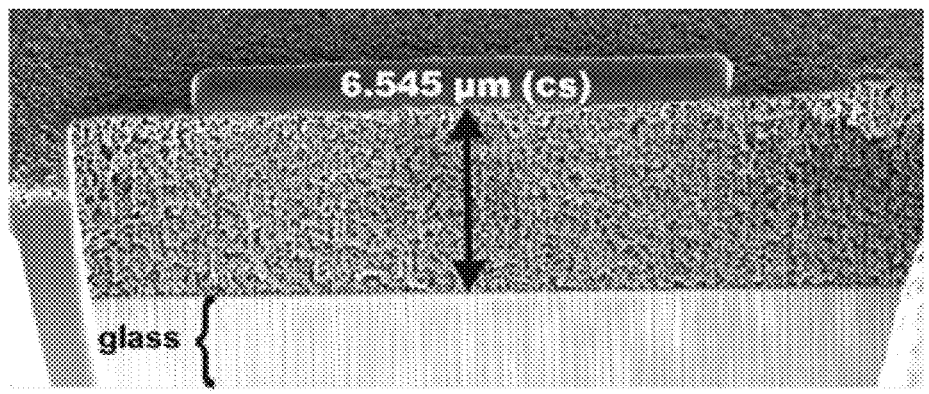
Figure 3D:
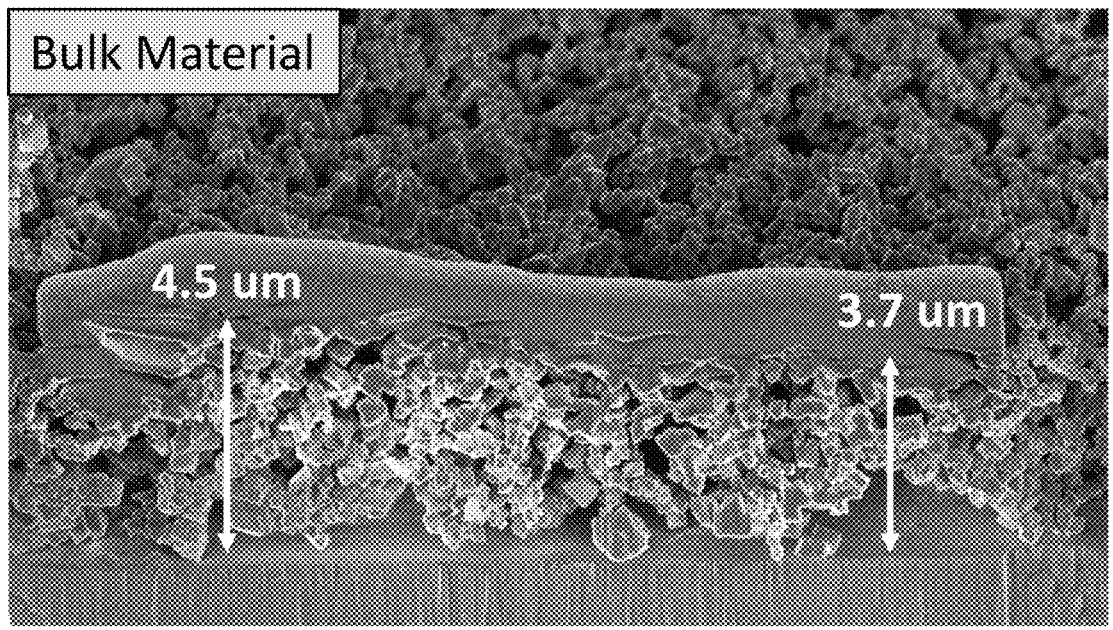
Figure 3E:
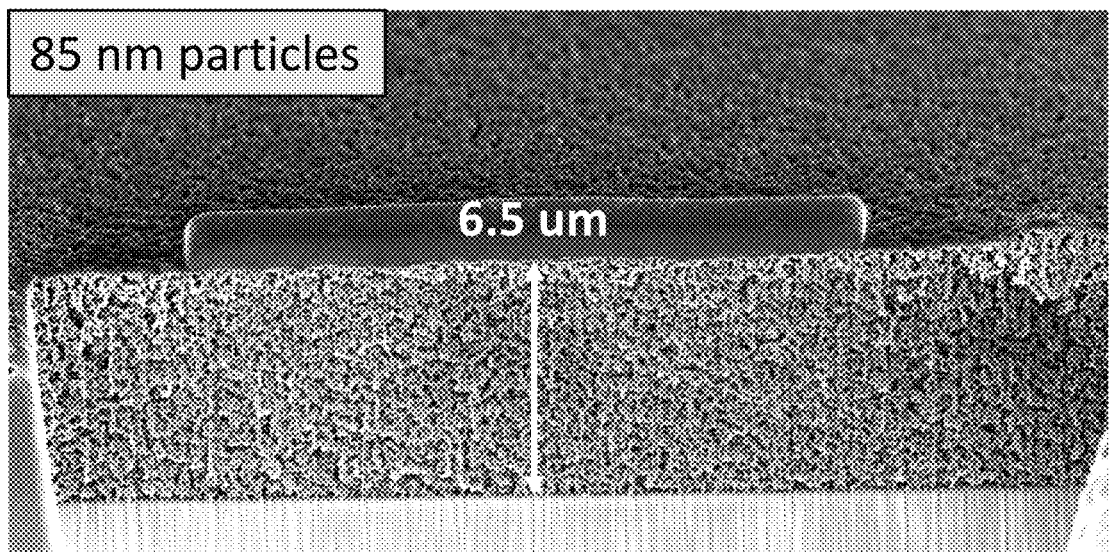
Figure 3F:
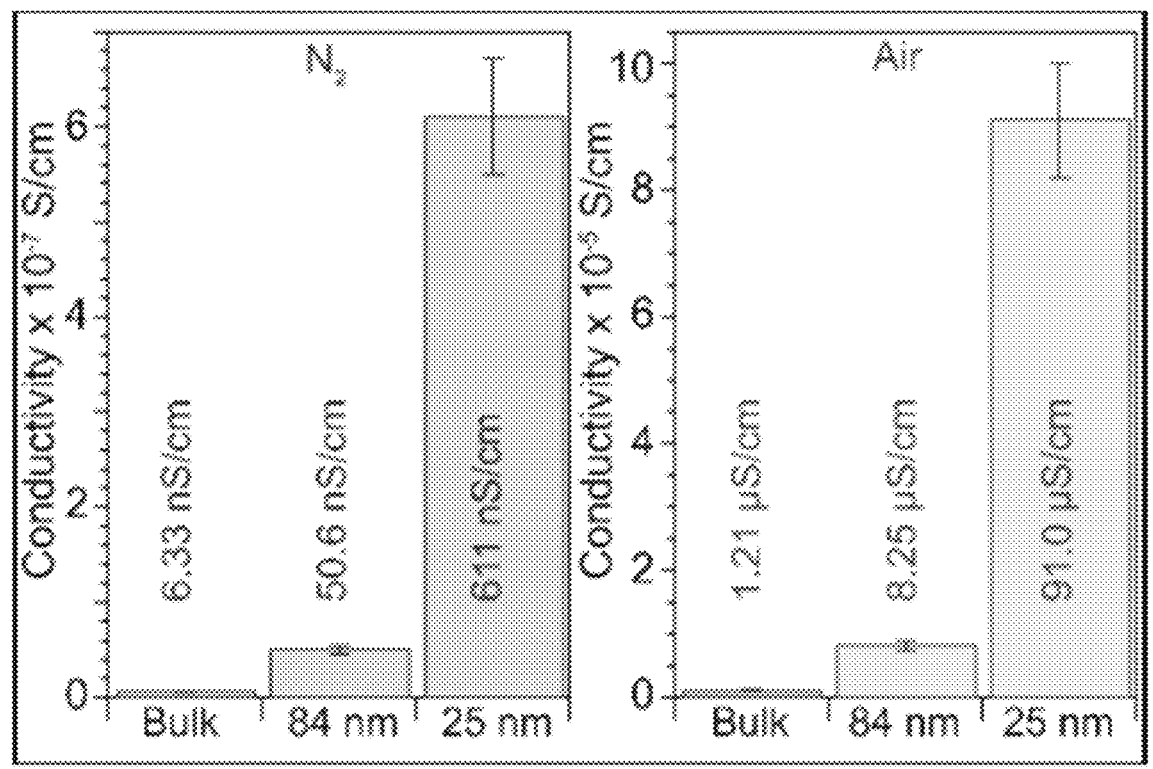
Figure 4:
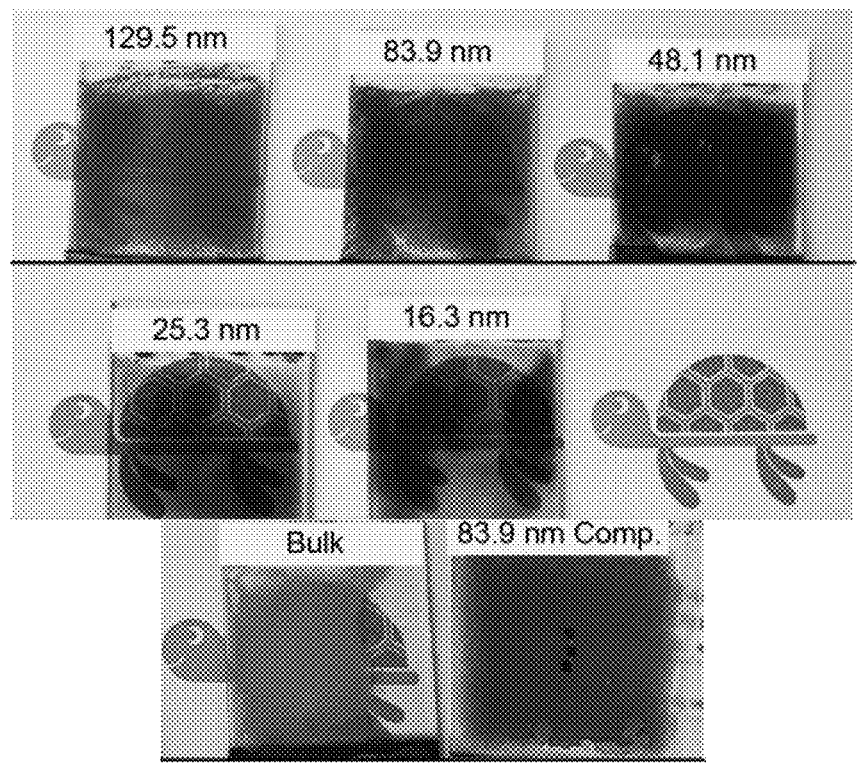
FIG. 4 provides photographic images of additional iron-1,2,3-triazolate thin films fabricated with a doctor blade method from DMF suspensions using 20 mg/mL dispersions of larger nanoparticle embodiments (top row), ~10 mg/mL dispersions of smaller nanoparticle embodiments (middle row), and the bulk material (bottom row, left image), as well as a composite composition (bottom row, right image).
Figure 5A:
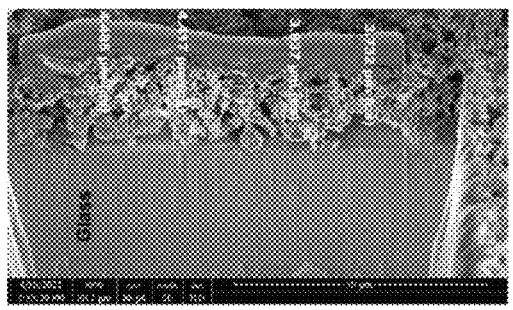
Figure 5B:
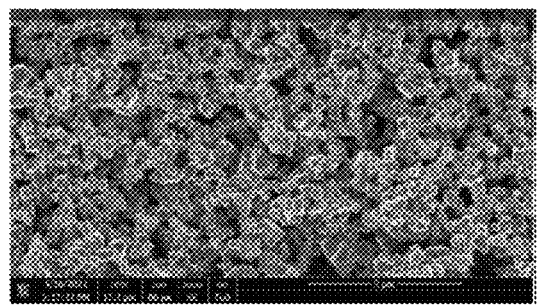
Figure 5C:
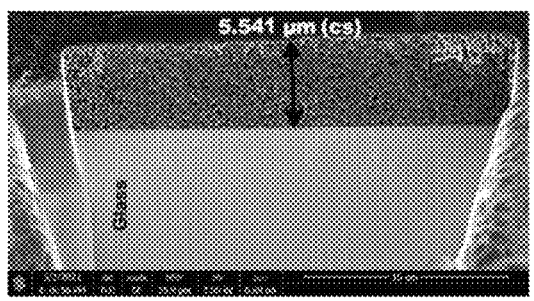
Figure 5D:
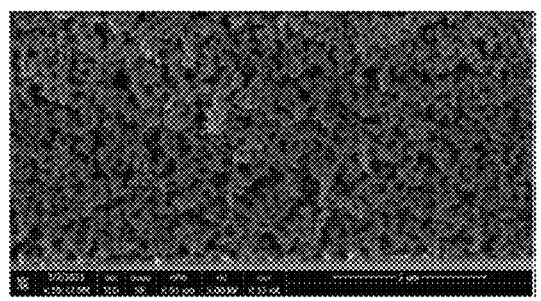
Figure 5E:
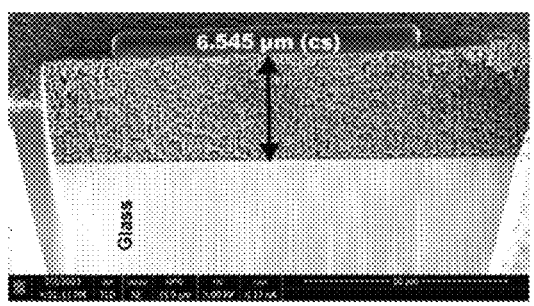
Figure 5F:
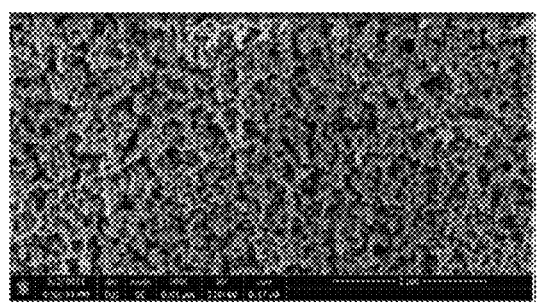
Figure 5G:
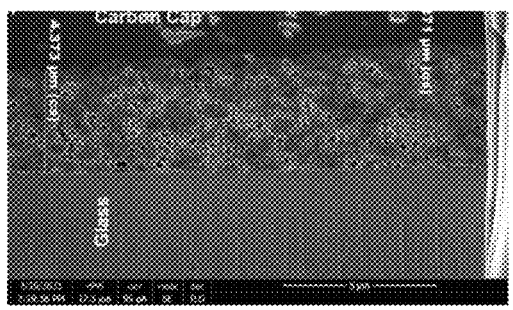
Figure 5H:
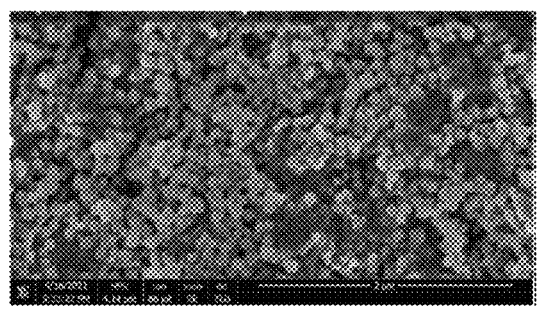
Figure 6A:
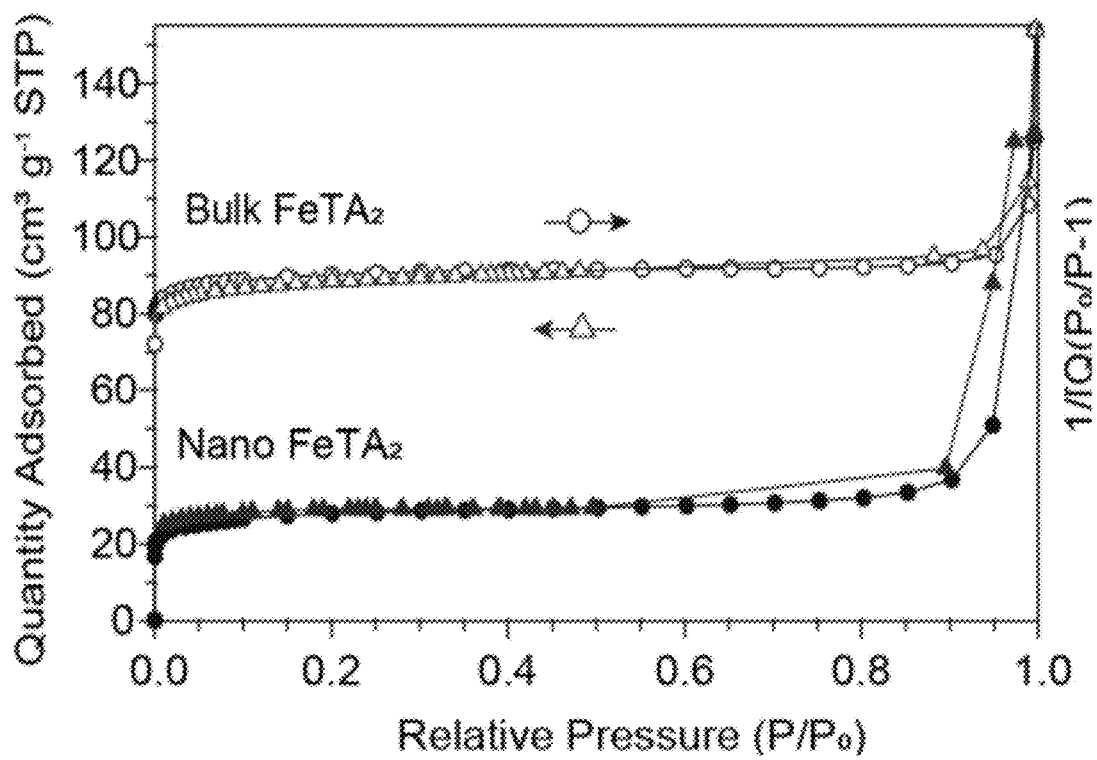
Figure 6B:
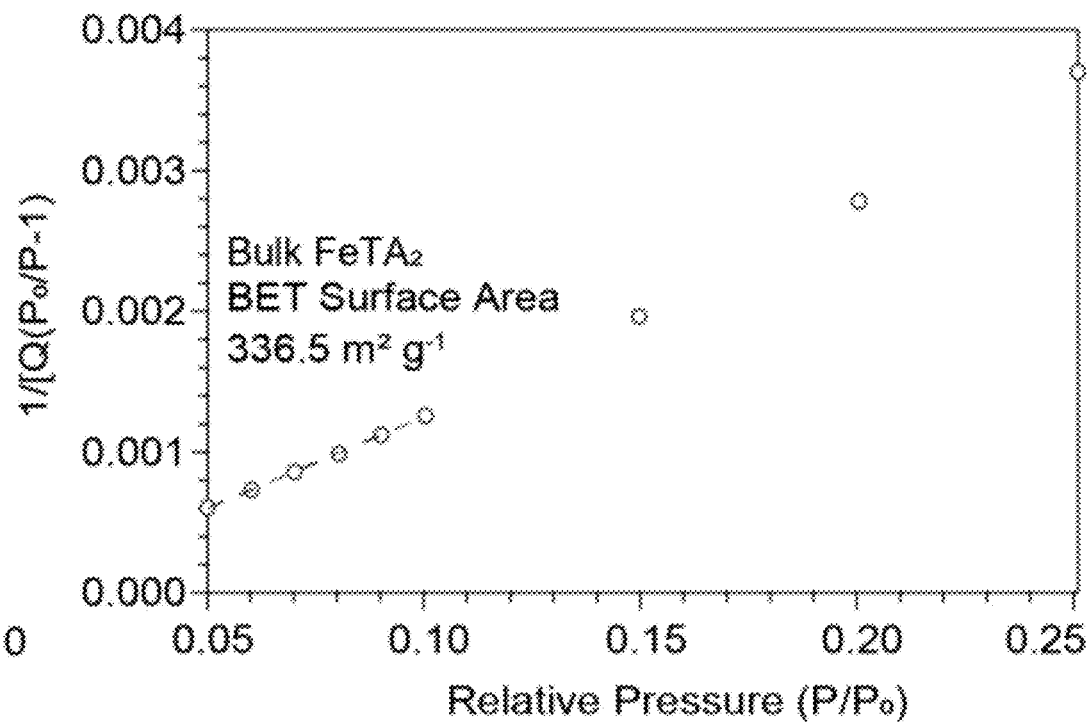
Figure 6C:
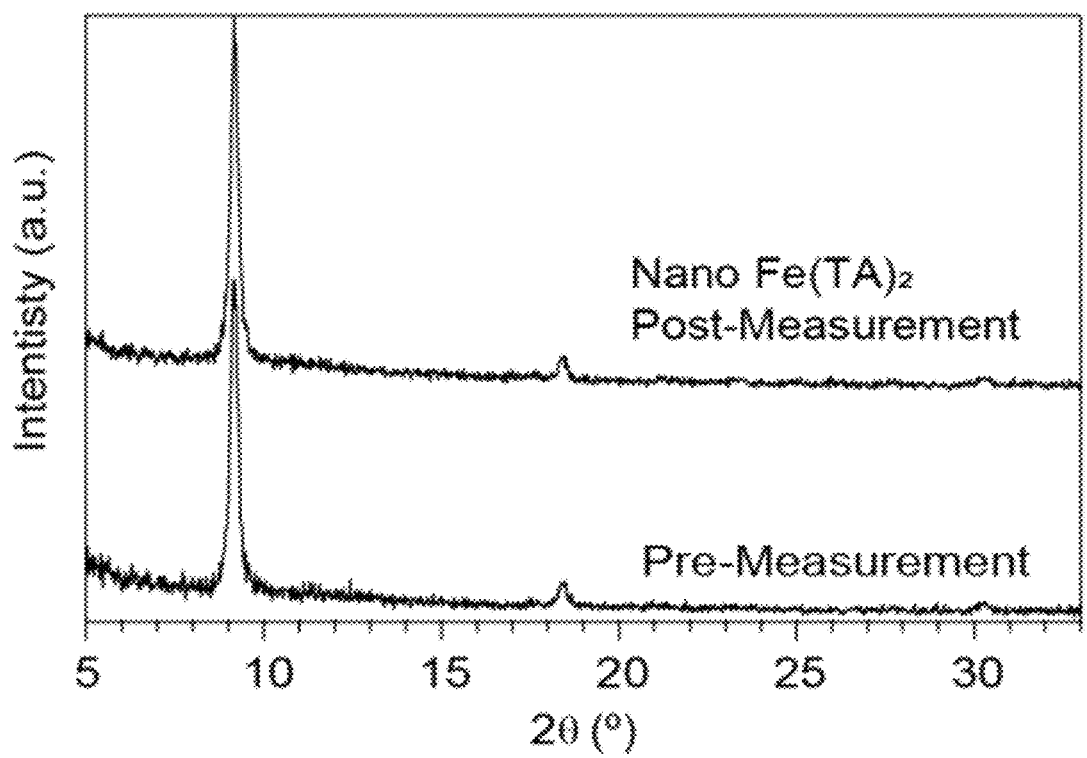
Figure 6D:
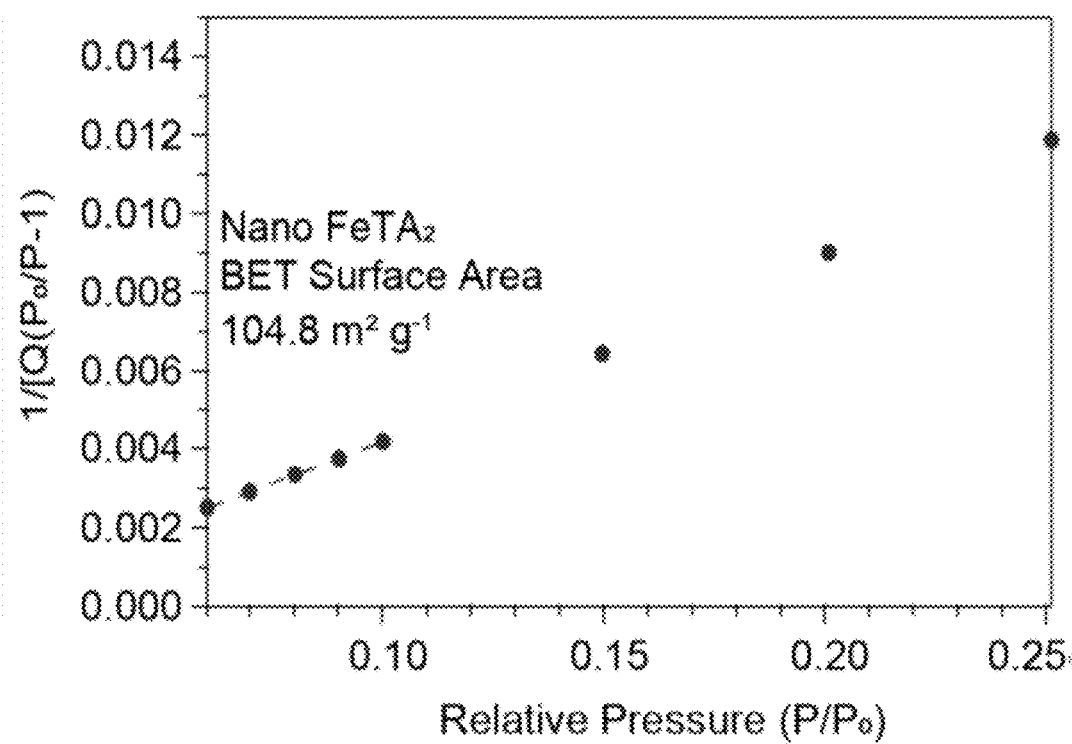

Also disclosed herein are embodiments of a thin film made with the compositions comprising MOF nanoparticles of the present disclosure. The thin film can be a free-standing thin film, or it can be coupled with a substrate. The thin film can be uniform and have a smooth surface and/or can be conductive. Such thin film embodiments can be used to make devices, such as MOF-based electrochemical devices, composite-based devices, and the like. In particular embodiments, the thin film embodiments are made using any suitable technique, such as drop-casting, spin-coating deposition, printing, dipping, doctor blading, and the like. In particular embodiments, the thin film is a free-standing film formed by dispersing a suspension comprising the MOF nanoparticles at a liquid-air interface and allowing any solvent of the suspension to evaporate or another drying technique. In other embodiments, the thin film can be deposited onto a substrate, such as an electrode, a wafer, or other type of substrate. In some embodiments, a suspension of the MOF nanoparticles is provided onto a substrate using a doctor blading technique. In particular disclosed embodiments, the thin film can have a thickness ranging from 10 nm to 20 mm, such as 100 nm to 6 mm, 3.6 mm to 5.6 mm. A representative thin film embodiment is shown by the optical microscope image provided by FIG. 3A and the cross-sectional FIB-SEM image in FIG. 3C and FIG. 3E. Additional photographs and SEM images showing thin film embodiments, along with a comparison with the bulk material (see FIG. 3D), are provided by FIG. 4 and FIGS. 5A-5H, respectively. The thin films exhibit good conductivity, with particular embodiments providing conductivity values that are more than three times higher than conductivity values observed for a film formed from the corresponding bulk material. In particular embodiments, the MOF nanoparticles can be used to provide thin films exhibiting conductivity values ranging from $1.0 \times 10^{-10}$ S/cm to 1.0 S/cm, such as $1.0 \times 10^{-7}$ S/cm to $1.0 \times 10^{-3}$ S/cm, or $1.0 \times 10^{-6}$ S/cm to $9.0 \times 10^{-5}$ S/cm. In representative embodiments, DC conductivities of 48 µS/cm and 150 µS/cm were observed for iron-triazolate MOF nanoparticle embodiments having particle sizes of 130 nm and 84 nm, respectively (see FIG. 3B). FIG. 3F shows a bar graph displaying the conductivity values (conductivity×$10^{-7}$ S/cm) in nitrogen and air for the bulk material, 84 nm MOF nanoparticles, and 25 nm MOF nanoparticles. Such results were unexpected because, prior to the present disclosure, it would have been expected that the smaller MOF nanoparticles (that is, the iron-triazolate MOF nanoparticles) would introduce more grain boundaries and thereby increase electron scattering and reduce conductivity; however, this was not observed in particular working embodiments. In contrast to the MOF nanoparticles of this particular example, a bulk iron-triazolate material exhibits a conductivity of only 11 µS/cm.

IV. Method Embodiments

Disclosed herein are method embodiments for making MOF nanoparticles. In some embodiments, the method comprises, consists essentially of, or consists of combining a metal precursor, a ligand precursor, a modulator component, and a solvent to provide a reaction mixture; stirring the reaction mixture at a suitable vortex speed for a period of time (e.g., at least 1 hour); and heating the reaction mixture at a temperature ranging from 80° C. to 140° C., such as 100° C. to 130° C., or 110° C. to 120° C. In some embodiments, the method can further comprise cooling the reaction mixture to ambient temperature, centrifugating the reaction mixture, and washing the resulting MOF nanoparticles using a washing and filtering process. In particular embodiments, washing can comprise filtering the MOF nanoparticles and using additional amounts of the solvent to wash away impurities. In independent embodiments, the method does not require multiphase synthesis or dropwise reagent addition techniques typically used in the field of nanoparticle synthesis. In some embodiments, the method can be carried out in a flow reactor, which can be a batch-wise flow reactor or a continuous flow reactor. In some embodiments, the flow reactor can be a microfluidic flow reactor, a mesofluidic flow reactor, or a microfluidic or mesofluidic reactor in parallel and/or under continuous flow to produce large-scale amounts of the nanoparticles (e.g., up to a ton scale size).

The metal precursor used in method embodiments of the present disclosure can include metal halides, such as metal chlorides; metal nitrates; metal triflates; metal tetrafluoroborates; metal oxides; or combinations thereof. In particular embodiments, the metal precursor is a first row transition metal salt, such as iron(II) chloride, iron(II) tetrafluoroborate, cobalt(II) chloride, nickel(II) chloride, zinc(II) chloride, zinc oxide, zinc(II) nitrate, zinc(II) triflate, cadmium (II) nitrate tetrahydrate, cadmium(II) chloride, magnesium nitrate hydrate, magnesium chloride, manganese(II) nitrate hydrate, manganese(II) chloride, chromium(II) trifluoromethanesulfonate, and the like. The ligand precursor typically is a triazole compound, such as a 1,2,3-triazole. In some embodiments, the 1,2,3-triazole can be substituted on one or both carbon atoms of the ring. In some such embodiments, the substituent on the carbon atom(s) can be selected from an aliphatic group, an aromatic group, a heteroaliphatic group, a haloaliphatic group, a haloheteroaliphatic group, or an organic functional group. In an independent embodiment, the 1,2,3-triazole is not bis(1H-1,2,3-triazolo[4,5-b],[4',5'-i])dibenzo[1,4]dioxin. In particular embodiments, the ligand precursor is 1,2,3-triazole with no substituents on the carbon atoms of the triazole ring. The modulator component can be as described herein.

In particular embodiments, the method comprises, consists essentially of, or consists of combining iron(II) chloride, 1,2,3-triazole, 1-methylimidazole, and dimethylformamide to provide a reaction mixture; stirring the reaction mixture at a suitable vortex speed for a period of time (e.g., at least 1 hour); and heating the reaction mixture at a temperature ranging from 80° C. to 140° C., such as 100° C. to 130° C., or 110° ° C. to 120° C. In yet additional embodiments, the method comprises, consists essentially of, or consists of combining cobalt(II) chloride, 1,2,3-triazole, 1-methylimidazole, and dimethylformamide to provide a reaction mixture; stirring the reaction mixture at a suitable vortex speed for a period of time (e.g., at least 1 hour); and heating the reaction mixture at a temperature ranging from 80° C. to 140° C., such as 100° C. to 130° C., or 110° C. to 120° C. Suitable vortex speeds can range from 100 rpm to 1,500 rpm, such as 500 rpm to 1,000 rpm, or 700 rpm to 900 rpm.

In particular embodiments, the modulator component is used in an amount ranging from 0.05 equivalents to 11 equivalents (relative to the amount of metal component used), such as 0.055 equivalents to 10 equivalents, or 0.1 equivalents to 8 equivalents, or 1 equivalent to 5 equivalents. In particular embodiments, the amount of the modulator component can be selected from 0.055 equivalents, 0.109 equivalents, 0.218 equivalents, 0.436 equivalents, 0.709 equivalents, 3 equivalents, and 10.9 equivalents. The amount of the modulator component can be adjusted according to the desired size of the MOF nanoparticles. In particular embodiments, higher equivalents of the modulator component, relative to the metal component, can facilitate obtaining smaller-sized MOF nanoparticles. In other embodiments, lower equivalents of the modulator component, relative to the metal component, can facilitate obtaining larger-sized MOF nanoparticles. In yet other embodiments, selecting a particular modulator component can be another way to tune MOF nanoparticle size. In some such embodiments, modulator components that act as weak ligands (e.g., 5-bromo-1-methylimidazole) with respect to the metal component, can provide larger MOF nanoparticles.

In some embodiments, the method can further comprise characterizing an isolated MOF nanoparticle to quantify the isolated MOF's nanoparticle's core diameter, determine how the MOF's nanoparticle's size is influenced by reaction conditions (such as the pH of the MOF nanoparticle precursor composition), or to determine the shape of the MOF nanoparticle. Techniques for characterizing the MOF nanoparticle can include, but are not limited to, SEM, Acid digestion $^1$H NMR spectra, Scherrer analysis. Beer's Law plots can be used to determine nanoparticle/formula unit extinction coefficients, which can then be used to back-calculate nanoparticle concentration. Electrochemical data of MOF nanoparticle can be performed by CV scans. In some embodiments, Scherrer analysis can be performed to determine the size of the MOF nanoparticles. Analysis can be conducted on a solution of MOF nanoparticles and/or an isolated MOF nanoparticle and can provide the ability to analyze and characterize nanoparticle size immediately, or substantially immediately, after the MOF nanoparticles are made. In some embodiments, SEM images can also be used to determine polydispersity of the MOF nanoparticles.

MOF nanoparticles and compositions, devices, and/or products comprising the MOF nanoparticles (or compositions thereof) are useful in analytical and/or biomedical applications, catalysis, gas sensing, gas adsorption, and gas separation using MOF nanoparticles in membranes, as well as other fields.

V. Overview of Several Embodiments

Disclosed herein are embodiments of a composition, comprising a plurality of metal-organic framework (MOF) nanoparticles comprising at least one coordination complex formed between a metal component and a 1,2,3-triazolate ligand, wherein the plurality of metal-organic framework nanoparticles has a polydispersity index value ranging from a value greater than 0 to a value less than 0.4.

In some embodiments, the plurality of metal-organic framework nanoparticles has a polydispersity index value ranging from 0.05 to 0.3.

In any or all of the above embodiments, the plurality of metal-organic framework nanoparticles has a polydispersity index value ranging from 0.05 to less than 0.25.

In any or all of the above embodiments, the plurality of metal-organic framework nanoparticles has a polydispersity index value ranging from 0.06 to 0.21.

In any or all of the above embodiments, the MOF nanoparticles are conductive.

In any or all of the above embodiments, the metal component is an ion of iron, cobalt, nickel, magnesium, zinc, titanium, vanadium, chromium, cadmium, manganese, or copper.

In any or all of the above embodiments, the metal component is an ion of iron or cobalt.

In any or all of the above embodiments, the composition further comprises a binder, a conductive material, or a combination thereof.

In any or all of the above embodiments, the composition comprises both the binder and the conductive material and wherein the binder is polyvinylidene fluoride and the conductive material is carbon black.

In any or all of the above embodiments, the composition further comprises a modulator component that is a nitrogen-containing heteroaryl compound or an aliphatic amine compound.

In any or all of the above embodiments, the modulator component a nitrogen-containing heteroaryl compound selected from 1-methylimidazole, 5-bromo-1-methylimidazole, 1-benzyl-2-methylimidazole, or a combination thereof.

In any or all of the above embodiments, the metal-organic framework nanoparticles have an average particle size ranging from 4 nm to 150 nm.

In any or all of the above embodiments, the metal-organic framework nanoparticles have an average particles size ranging from 4 nm to 50 nm or from greater than 50 nm to 150 nm.

In any or all of the above embodiments, the MOF nanoparticles are iron-1,2,3-triazolate nanoparticles, cobalt 1,2,3-triazolate nanoparticles, cadmium-1,2,3-triazolate nanoparticles, manganese-1,2,3-triazolate nanoparticles, chromium-1,2,3-triazolate nanoparticles, magnesium-1,2,3-triazolate nanoparticles, zinc-1,2,3-triazolate nanoparticles, or a mixture thereof.

Also disclosed are embodiments of a method, comprising combining a metal precursor compound, a 1,2,3-triazole, a modulator component, and a solvent to provide a reaction mixture; heating the reaction mixture; and stirring the reaction mixture at a vortex speed sufficient to provide a plurality of metal-organic framework (MOF) nanoparticles made of an MOF material comprising (i) a transition metal provided by the transition metal precursor and (ii) a 1,2,3 triazolate ligand provided by the ligand precursor.

In some embodiments, the MOF nanoparticles have an average particle size ranging from 4 nm to 150 nm.

In any or all of the above embodiments, the MOF nanoparticles have an average particles size ranging from 4 nm to 50 nm or from greater than 50 nm to 150 nm.

In any or all of the above embodiments, the vortex speed ranging from 100 rpm to 1,500 rpm.

In any or all of the above embodiments, heating the reaction mixture comprises heating the reaction mixture at a temperature ranging from 80° C. to 140° C.

In any or all of the above embodiments, the metal precursor is iron(II) chloride, cobalt(II) chloride, nickel(II) chloride, zinc(II) chloride, cadmium(II) nitrate tetrahydrate, manganese nitrate hydrate, or chromium(II) trifluoromethanesulfonate.

Also disclosed herein are embodiments of a conductive thin film, comprising a plurality of nanoparticles made of a metal-organic framework material comprising at least one coordination complex formed between a metal component and a 1,2,3-triazolate ligand, wherein thin film exhibits a conductivity of at least $1.0 \times 10^{-10}$ S/cm.

In some embodiments, the conductive thin film has a thickness ranging from 10 nm to 20 mm.

In any or all of the above embodiments, nanoparticles of the plurality of nanoparticles have an average particle size ranging from greater than 50 nm to 150 nm.

Also disclosed herein are embodiments of a device, comprising: a substrate; and a conductive thin film according to any or all of the above embodiments that is deposited on the substrate.

VI. Examples

Materials—All commercial chemicals were used as received and handled in inert conditions unless stated otherwise. All solvents were collected from a solvent purification system and stored over 4 Å molecular sieves, and all liquid reagents were freeze-pump-thawed four cycles prior to use. N,N-dimethylformamide (DMF, ACS grade, Fisher Scientific), acetonitrile (MeCN, HPLC grade, Fisher Scientific), dichloromethane (DCM, ACS grade, Fisher Scientific), iron (II) chloride (98%, anhydrous, Strem), 1-methylimidazole (99%, Sigma-Aldrich), 1,2,3-triazole (≥98%, TCI), tetrabutylammonium hexafluorophosphate (98%, TCI, recrystallized 3 times from ethanol), tetrabutylammonium tetrafluoroborate (98%, ACROS, recrystallized once from ethanol and once from ethyl acetate).

All manipulations were performed under $N_2$ unless stated otherwise. Solution-state UV-Vis spectra were collected using either a Shimazdu Biospec-1601 for visible range measurements, and a Perkin Elmer Lambda-1050 UV/Vis/NIR spectrophotometer for extended range measurements. For acid-digestion $^1$H-NMR, samples were dried under vacuum, digested in 10% $DCl/D_2O$ in DMSO-$D_6$ in air, then filtered through cotton plugs prior to analysis with a Bruker Advance III-HD 600 NMR Spectrometer. IR spectra were recorded on a Bruker Alpha II compact IR with an ATR attachment in a $N_2$-filled glovebox. SEM imaging was performed using a FEI Helios 600i instrument. SEM samples were prepared by dropcasting particle dispersions in DMF onto silicon substrates and drying under $N_2$ pressure.

PXRD measurements and analysis—PXRD data were collected in air in the range 3.5-35° 2θ with a Bruker D2 Phaser. Patterns were matched to the low spin iron-1,2,3-triazolate cif file. Gaussian fitting was performed using the Multipeak 2.0 package in Igor 6.3. Scherrer analysis was performed to determine crystallite size, with K=1 using Equation 1 described herein.

UV-Vis Data Collection—All UV-Vis data were collected using custom-made air-free quartz cuvettes with a pathlength of 1 cm. Long-range scans (1350-265 nm, 1.0 nm resolution) were used for gaussian fitting, performed with the Multipeak Fitting 2.0 package in Igor 6.3. For Beer's Law experiments, measurements were collected only from 900-265 nm with 0.5 nm resolution. The particles were diluted until the maximum absorbance was less than 1, then further diluted four times. A linear relationship between absorbance and concentration, determined either in formula unit molarity or particle molarity, gave the extinction coefficient. Peak maxima reported in the main text were the absolute maximum of the trace determined without a gaussian fit.

The extinction coefficient per particle trend was fitted to a cubic equation in Igor 6.3. The last data point, at 130 nm, was excluded to maintain a good fit. The y intercept was set to zero. For CT1, the pre-factor is 23810 and for CT2, the pre-factor is 26160. To determine the oscillator strength, the gaussian fits for CT1, CT2, and the shoulder of CT2 were used. The following relation gives the oscillator strength as a unitless quantity, where εmax is the extinction at the peak of the band, and $v_{1/2}$ is the full-width at the peak's half-max.

$$f = 4.61 \times 10^{-9} \varepsilon_{max} v_{1/2}$$

Conductivity Measurements—The conductivity of the thin films was determined using a four-point probe method in aerobic ambient conditions. The four probes (distance=1 mm) were placed on the film close to the center of the 1-inch square surface. Two separate resistivity measurements were collected, with either forward or reverse bias. Film thickness was measured using FIB-SEM within a few millimeters of where the probes were set for conductivity measurements. To calculate the resistivity of the films, the following relation was used.

$$\rho = \frac{\pi t}{\ln(2)}\left(\frac{V}{I}\right) = 4.532 t \frac{V}{I}$$

In the expression, V/I is the slope of the IV curve and t is the film thickness. Thin films were of sufficient length and thin enough such that further geometric corrections were not needed.

Cyclic voltammetry measurements—For solution state experiments, cyclic voltammetry was collected in DMF with 0.1 M TBAPF$_6$ or TBABF$_4$ as the supporting electrolyte in a standard three electrode cell with a glassy carbon working electrode, a silver wire pseudo-reference electrode, and a platinum wire counter electrode. Electrodes were polished immediately before use. The blank CV scans showed no faradaic events within the electrochemical window scanned. Particles were added in aliquots until sufficient peaks appeared at 70 mV/s. The total concentration of particles in these experiments is not known and is estimated to be between 0.01 and 0.05 mg/mL. Data was collected from −0.325 V to 1.325 V against Ag/Ag+, then ferrocene was added to act as a reference. Scans were collected at rates of 10, 40, 70, 100, and 130 mV/s.

For experiments with iron-triazolate on the working electrode, experiments were conducted in ACN with either TBAPF$_6$ or TBABF$_4$ as the electrolyte. A standard three electrode cell was used, with the particle-coated glassy carbon (GC) was the working electrode, silver wire as a pseudo-reference electrode, and carbon cloth as a counter electrode. To prepare the working electrode, particles (0.709 equivalents 1-methylimidazole, 16 nm) were suspended in DMF at a concentration 7.7 mg/mL, then drop-casted (7 uL) onto the polished GC surface. For the bulk material, it was necessary to dilute the dispersion to a concentration of 0.6975 mg/mL. The dispersion was allowed to dry under ambient conditions for a few hours, then placed under vacuum to dry completely. Scans were collected at rates of 10, 100, 300, and 500 mV/s. The bare GC electrode was replaced in the cell and a blank scan was collected to show that no significant particle delamination occurred. Finally, ferrocene was added as a reference and a scan was collected using the particle-coated electrode. Current density data is normalized to the area of the bare GC working electrode, as the particle dispersion runs off the edges of the electrode and as such the exact amount of material on the electrode is less than the amount drop-casted.

QCM Experiments—The PT/Ti-coated 5 MHz AT-cut quartz crystal microbalance (QCM) working electrodes were first soaked in acidic piranha solution for ~5 minutes, then rinsed copiously with 18.2 MΩ nanopure water, followed by isopropyl alcohol, and lastly dried under N$_2$ pressure. Suspensions of 16-nm particles in DMF were spin-coated onto the QCM electrodes until a minimum of 4 μg was obtained on the surface. An electrochemical cell was set up with 0.1-M TBAPF$_6$ or TBABF$_4$ in MeCN (80 mL), the QCM as the working electrode, glassy carbon as the counter electrode, and a bare silver wire as a pseudo-reference electrode. Frequency data was collected simultaneously with CV scans using a SRS QCM200 apparatus. The frequency was converted to mass using the Sauerbrey equation below, in which Δf is the experimental change in frequency, $C_f$ is the sensitivity factor (56.6 Hz cm$^2$ μg$^{-1}$ for 5 MHz AT-cut crystals), and Δm is the change in mass.

$$\Delta f = -C_f * \Delta m$$

Once the mass change is obtained, the value is converted to moles of anions (PF$_6^-$ or BF$_4^-$); potential solvation of the anions was not taken into account. These values are then compared to the total number of moles of iron-triazolate deposited onto the microbalance.

Dynamic Light Scattering (DLS) experiments—DLS data was collected using a Wyatt Mobius instrument with a custom-made airfree quartz cuvette with a pathlength of 1 mm. Samples suspended in DMF were filtered through 0.45 μm PTFE filters, and the solvent itself was prepared by filtration through a 0.10 μm PTFE filter. A normal 50 mW laser mode was used, and the samples were diluted such that the measured counts were between 1 and 8 million, and the correlation function was reproducible over the course of 6 measurements 1 minute apart.

N$_2$ sorption measurements—For gas sorption measurements, the samples were further washed with MeCN twice, and DCM five times. A typical washing process proceeded over the course of 1 week. Samples were dried under vacuum in tared ASAP tubes. Samples were degassed under high vacuum and 120° C. heat on an ASAP 2020 instrument; degassing was considered complete when the pressure in the closed manifold rose less than 2.5 μtorr/min. BET analysis was based on a linear fit in the BET plot to N$_2$ isotherm data at relative pressures between $10^{-5}$-$10^{-1}$ P/PO. Data for these embodiments can be found in FIGS. 6A-6D.

Example 1

Figure 7A:
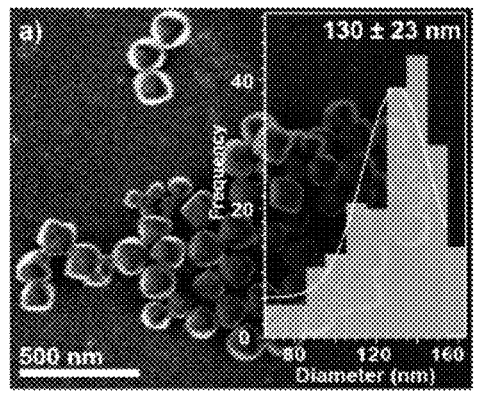
FIGS. 7A-7F include SEM images (FIGS. 7A-7E) of iron-1,2,3-triazolate nanoparticles synthesized with 1-methylimidazole ("1-mlm") in varying equivalents (with respect to Fe used in the reaction), including 0.055 equivalents (FIG. 7A), 0.109 equivalents (FIG. 7B), 0.218 equivalents (FIG. 7C), 0.436 equivalents (FIG. 7D), and 0.709 equivalents (FIG. 7E), wherein the insets show histograms of particle size distributions from >200 particles fitted to weighted gaussian distributions; and a graph (FIG. 7F) of particle sizes using 1-mlm) (square symbols), 1-benzyl-2-methylimidazole ("Benzyl" triangle symbols) 5-bromo-1-methylimidazole ("Bromo" triangle symbols), and n-butylamine ("nBA" triangle symbols), as determined using SEM (closed data symbols) and Scherrer analysis (open data symbols).
Figure 7B:
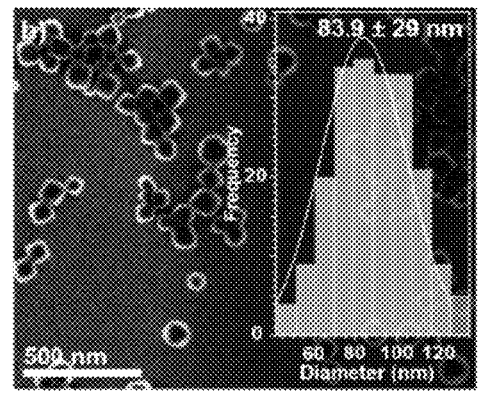
Figure 7C:
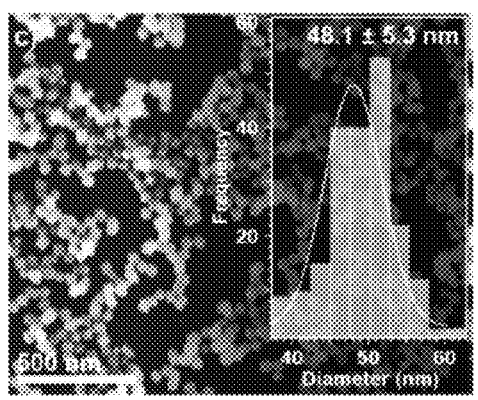
Figure 7D:
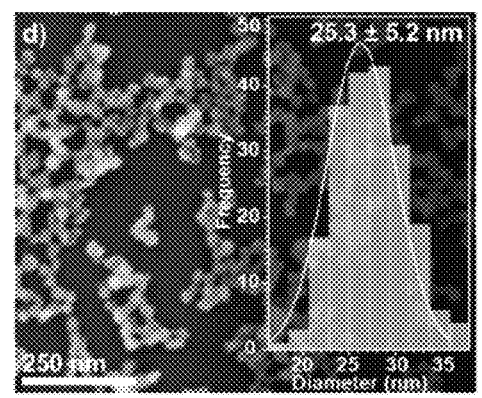
Figure 7E:
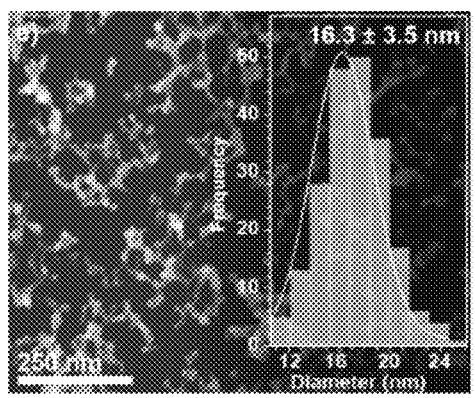
Figure 7F:
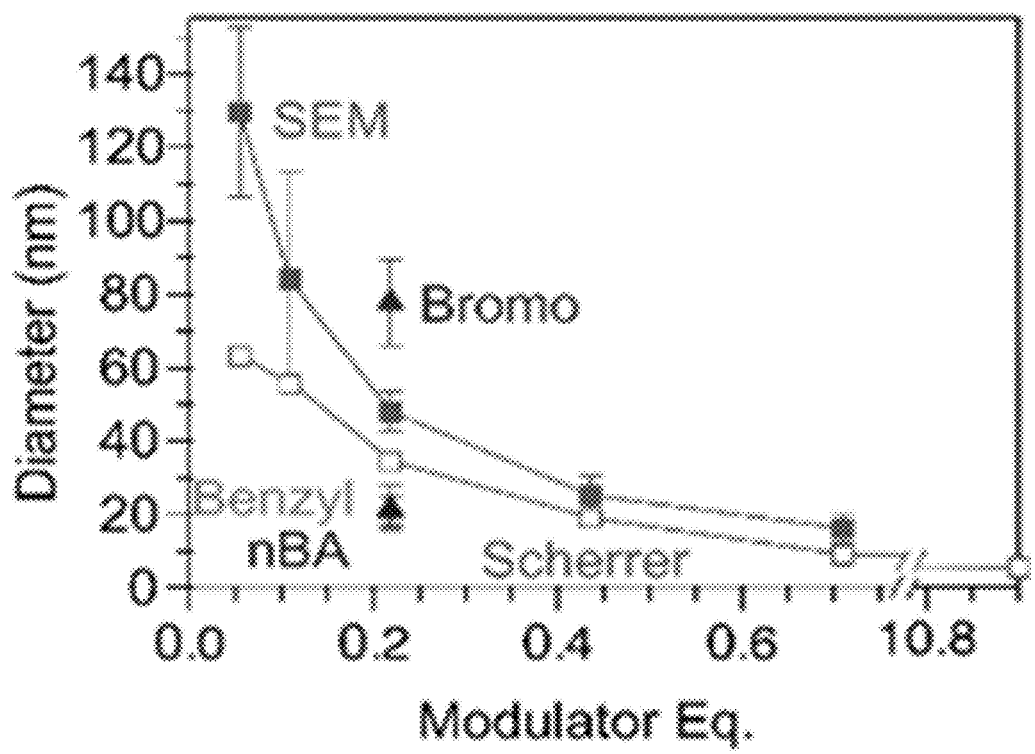
Figure 8:
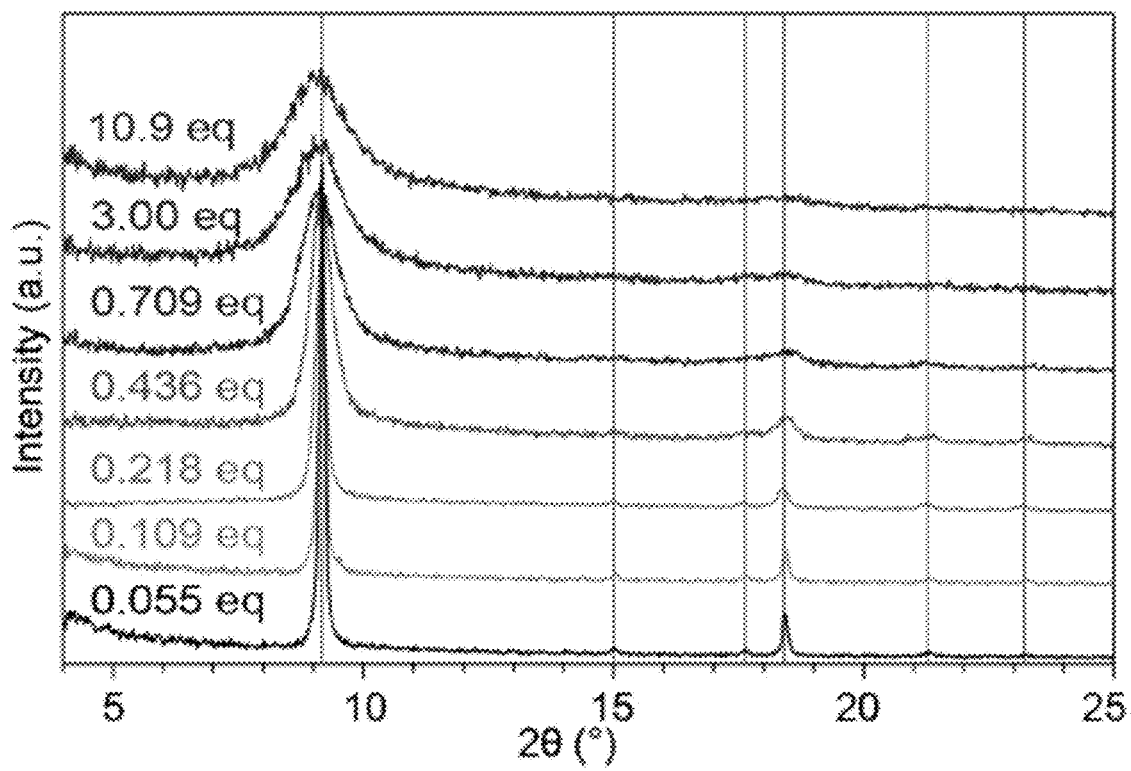
FIG. 8 shows the PXRD patterns of the iron-1,2,3-triazolate MOF nanoparticles synthesized with varying amounts of 1-methylimidazole as a modulator; the grey lines indicate expected reflections.
Figure 9A:
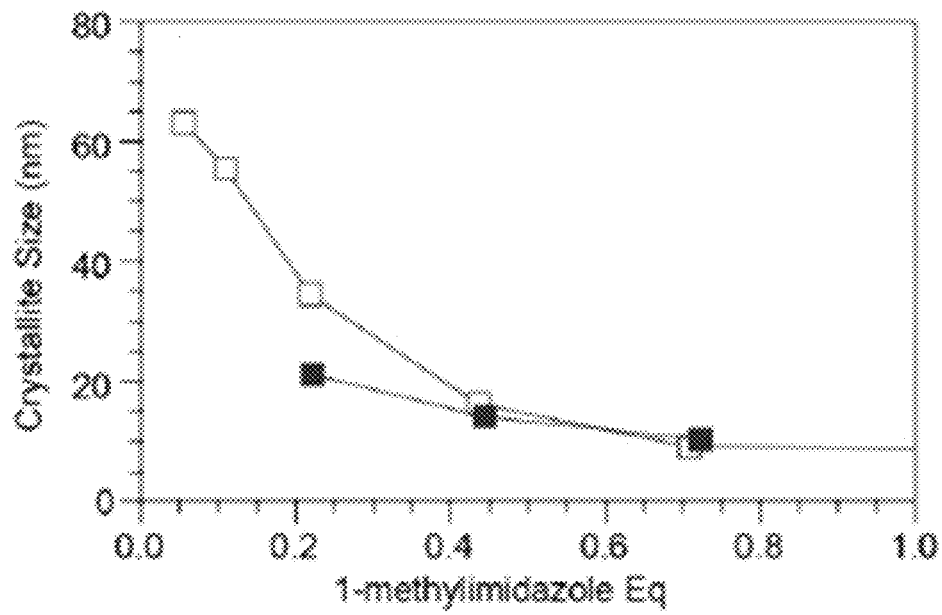
Figure 9B:
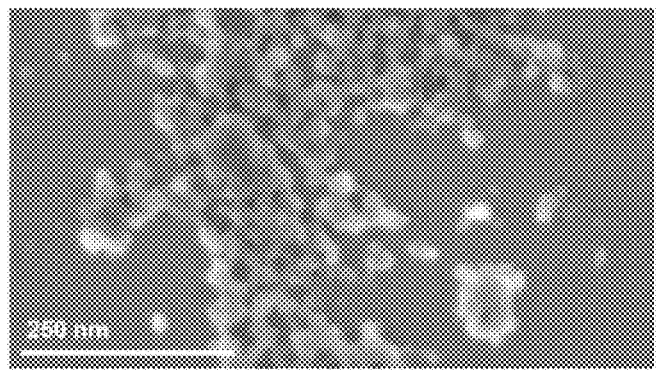
Figure 9C:
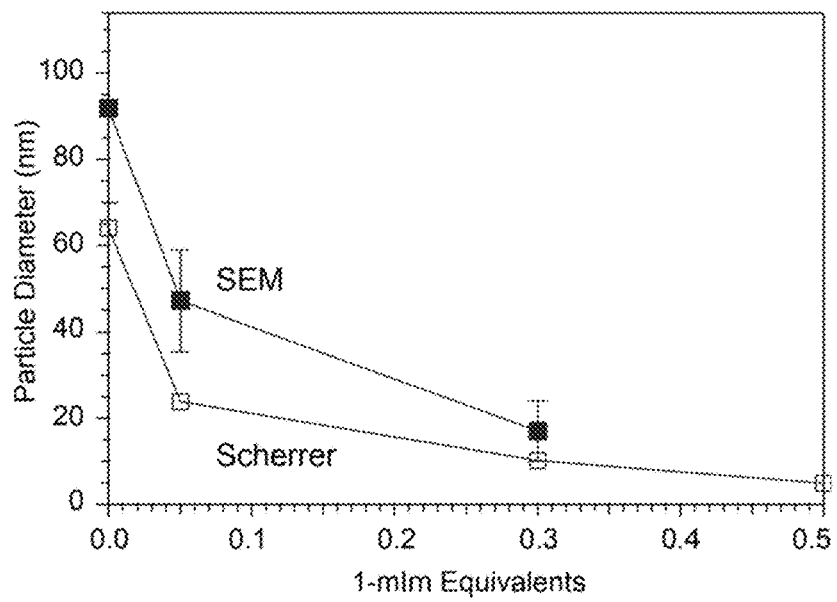
Figure 9D:
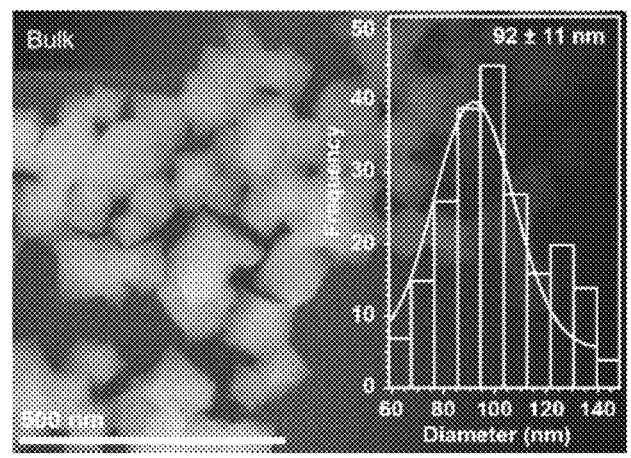
Figure 9E:
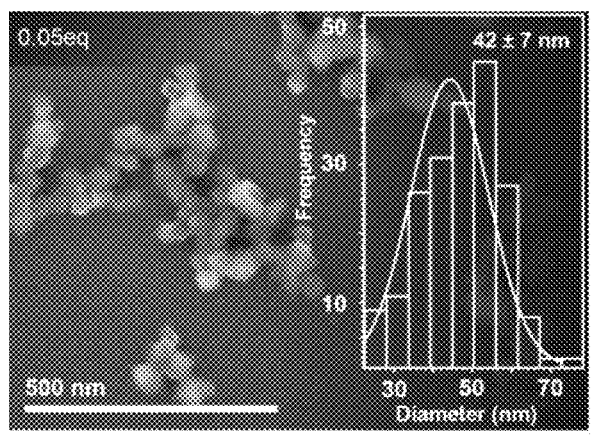
Figure 9F:
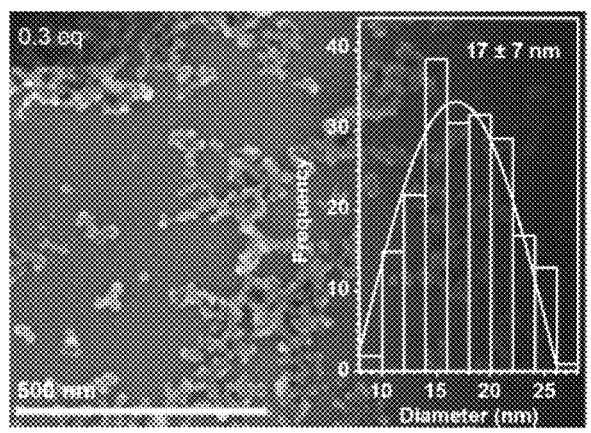
Figure 9G:
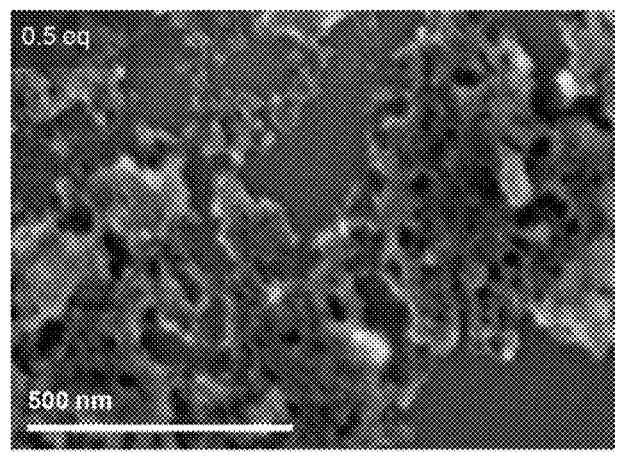

In this example, iron 1,2,3-triazolate and cobalt 1,2,3-triazolate nanoparticles were made according to the following general procedure: In a N$_2$ glovebox, 1-methylimidazole was added to a solution of anhydrous metal (II) chloride in DMF (1.15 mmol, 0.0575 M, 14 mL). The amount of 1-methylimidazole varied from 3.5 μL (0.063 mmol, 0.055 eq) to 700 μL (12.5 mmol, 10.9 eq); all equivalents are with respect to the metal ion. Syntheses performed with 5-bromo-1-methylimidazole and 1-benzyl-2-methylimidazole were also performed with these equivalents. Under stirring, 1,2,3-triazole (3.45 mmol, 140 μL, 3 eq) was added to the solution. Vials were capped and sealed with electrical tape, then placed in an aluminum block pre-heated to 120° C. The solutions stirred for 1.5 hours, after which time they were immediately centrifuged and washed twice with DMF. Particle images and particle size analyses are provided by FIGS. 7A-7E. FIG. 7F shows a graph of particle size obtained using different modulators, wherein filled data points were determined by SEM and open data points on the graph were obtained by Scherrer analysis. PXRD patterns of the iron-triazolate nanoparticles made according to this method using varying equivalents of 1-methylimidazole are provided in FIG. 8. FIG. 9A compares particle sizes for iron-triazolate and cobalt-triazolate particles obtained using 1-methylimidazole as the modulator component, wherein open data points correspond to iron and closed data points correspond to cobalt and FIG. 9B shows an SEM image of the morphology of the cobalt-triazolate particle embodiment of the present example. FIG. 9C depicts a graph of particle sizes as determined using SEM (closed data symbols) and Scherrer analysis (open data symbols). FIG. 9D is an SEM image of cobalt bulk material and FIGS. 9E-9G include SEM images (FIGS. 9D-9G) of cobalt-1,2,3-triazolate MOF nanoparticles synthesized with 1-methylimidazole ("1-mlm") equivalents (with respect to Co used in the reaction) ranging from 0.05 equivalents (FIG. 9E) to 0.5 equivalents (FIG. 9G), wherein the insets show histograms of particle size distributions from >200 particles fitted to weighted gaussian distributions.

Example 2

Figure 10A:
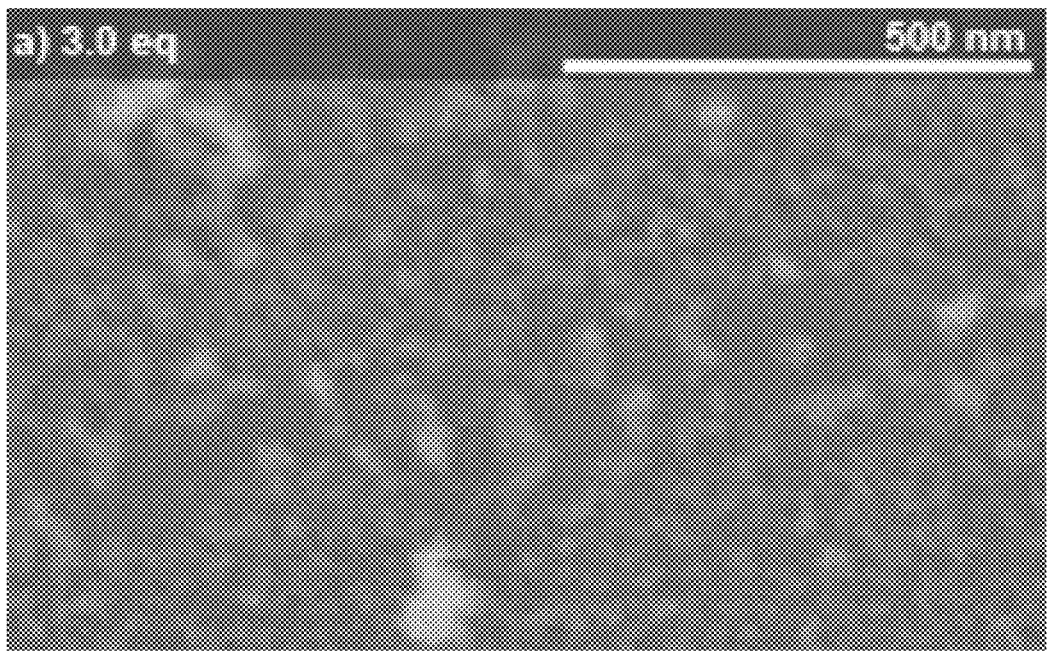
FIGS. 10A and 10B show iron-1,2,3-triazolate crystallize size trends with respect to modulator equivalents using three different modulators ("Bromo"=5-bromo-1-methylimidazole; "Benzyl"=1-benzyl-2-methylimidazole; and "1-mlm"=1-methylimidazole), wherein particle sizes were determined by Scherrer analysis.
Figure 10B:
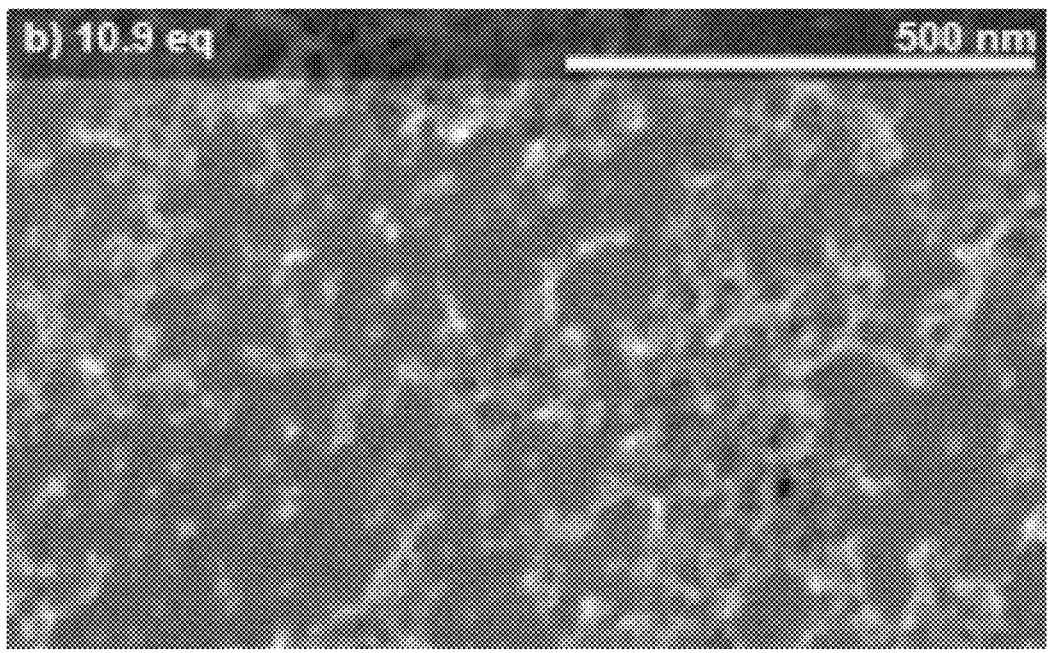

In this example, nanoparticles of iron-triazolate were prepared with tunable sizes by using 1-methylimidazole as the modulator component. The reactions in this example were performed under stirring with dilute conditions and with varying equivalents of the modulator component. After heating the reaction mixture under air-free conditions in DMF at 120° C., the reaction was terminated after 1.5 hours by cooling and immediate centrifugation and washing. At low equivalents of 1-methylimidazole, the particle sizes decreased steeply: from 0.055 equivalents to 0.0709 eq, the particle sizes reduce from 130 nm to 16.3 nm. Beyond 0.709 eq, the particle sizes level off abruptly, decreasing further to 5.5 nm with 10.9 equivalents of modulator (FIGS. 10A and 10B). It currently is believed that the 5.5-nm particles represent the smallest reported MOF nanoparticle sizes synthesized by using a single modulator component. Synthesis of nanoMOFs below 10 nm typically requires multiphase systems, dropwise additions, or multiple modulator ligands. FIG. 1 depicts a simulated structure of 5.5-nm iron-triazolate, confirming that such a small size still includes many pores due to the unusually high density of this MOF. SEM analysis of the 16.3 and 25.2 nm particles reveals unimodal and symmetrical size distributions and essentially spherical morphologies. Microscopy of larger particles of certain embodiments show octahedral faceting. The polydispersity index values (PDI) from these histograms vary between 0.06 and 0.18, values that are lower the typical MOF nanoparticle polydispersity, and rival some of the least polydisperse systems to date. Table 1 summaries the polydispersity index (PDI) values observed for these embodiments and Tables 2 and 3 provides information from embodiments using 5-bromo-1-methylimidazole and 1-benzyl-2-methylimidazole, respectively, as modulator components.

TABLE 1

| 1-methylimidazole equivalents (to $FeCl_2$) | Batch 1 Scherrer Size (nm) | Batch 2 Scherrer Size (nm) | Batch 2 SEM Size (nm) | PDI |
|---|---|---|---|---|
| 0.055 | 57 | 63 | 130 ± 10 | 0.09 |
| 0.109 | 50 | 56 | 84 ± 20 | 0.18 |
| 0.218 | 34 | 35 | 48 ± 3 | 0.06 |
| 0.436 | 16 | 19 | 25 ± 3 | 0.10 |
| 0.709 | 9.1 | 9.1 | 16 ± 2 | 0.11 |
| 3.00 | 6.8 | 6.8 | | |
| 10.9 | 5.4 | 5.5 | | |

TABLE 2

| 5-bromo-1-methylimidazole equivalents (to $FeCl_2$) | Scherrer Size (nm) | SEM Size (nm) | PDI |
|---|---|---|---|
| 0.055 | 64 | | |
| 0.109 | 73 | | |
| 0.218 | 71 | 78 ± 6 | 0.08 |
| 0.436 | 69 | | |
| 0.709 | 45 | | |
| 3.00 | 26 | | |
| 10.9 | 56* | | |

TABLE 3

| 1-benzyl-2-methylimidazole equivalents (to $FeCl_2$) | Scherrer Size (nm) | SEM Size (nm) | PDI |
|---|---|---|---|
| 0.055 | 55 | | |
| 0.109 | 39 | | |
| 0.218 | 21 | 22 ± 3 | 0.14 |
| 0.436 | 7.3 | | |

Figure 11:
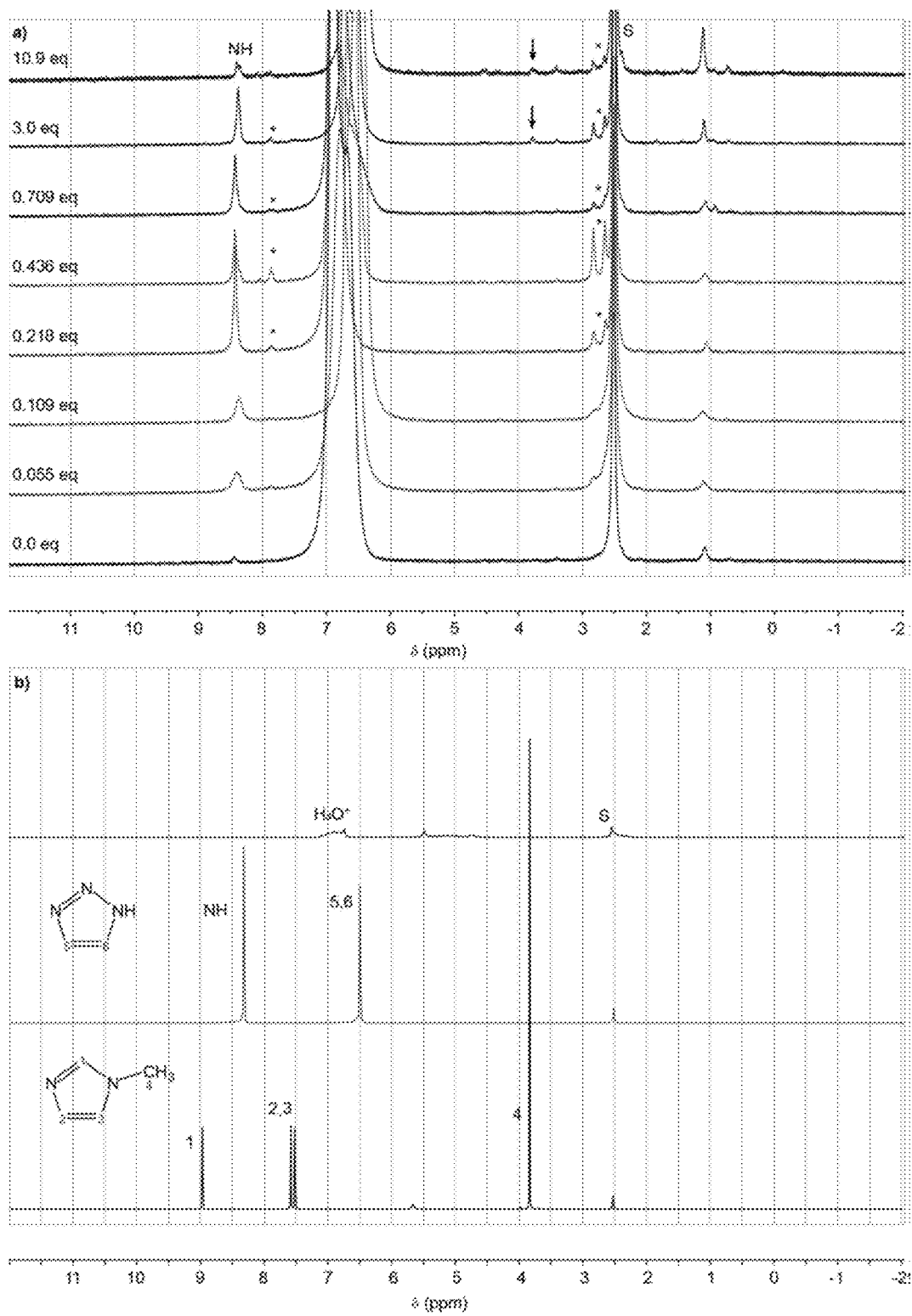
FIG. 11 includes $^1$H NMR spectra showing results from acid digestion (using 1.5:7 DCl:DMSO) of iron-1,2,3-triazolate nanoparticles as compared to constituent ligands and the bulk MOF material.
Figure 12A:
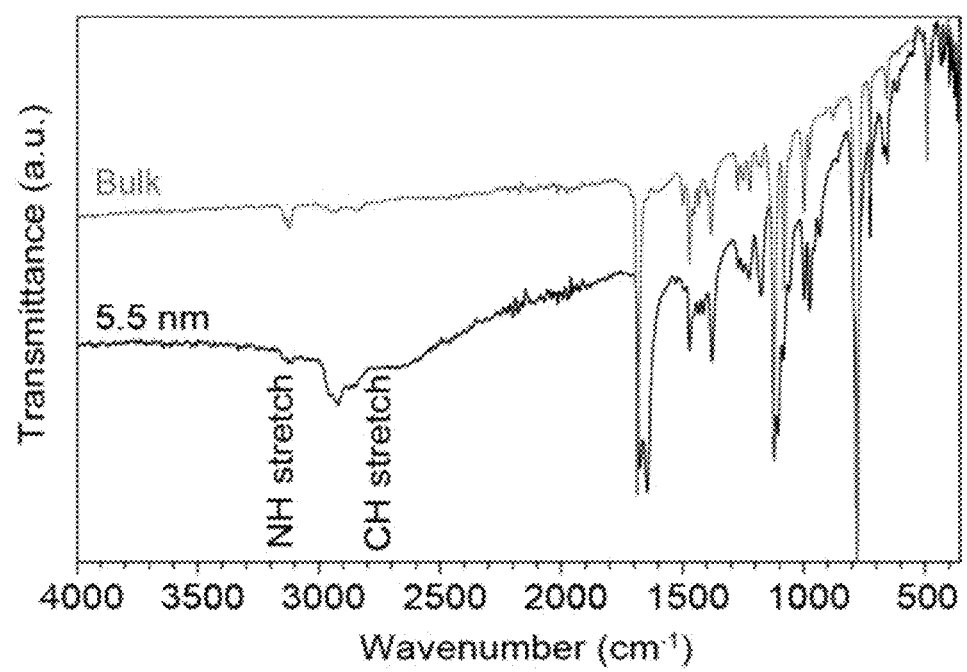
FIGS. 12A and 12B are IR spectra showing stretches for bulk iron-1,2,3-triazolate material (FIG. 12A) and iron-1,2,3-triazolate nanoparticles made according to the present disclosure (FIG. 12B).
Figure 12B:
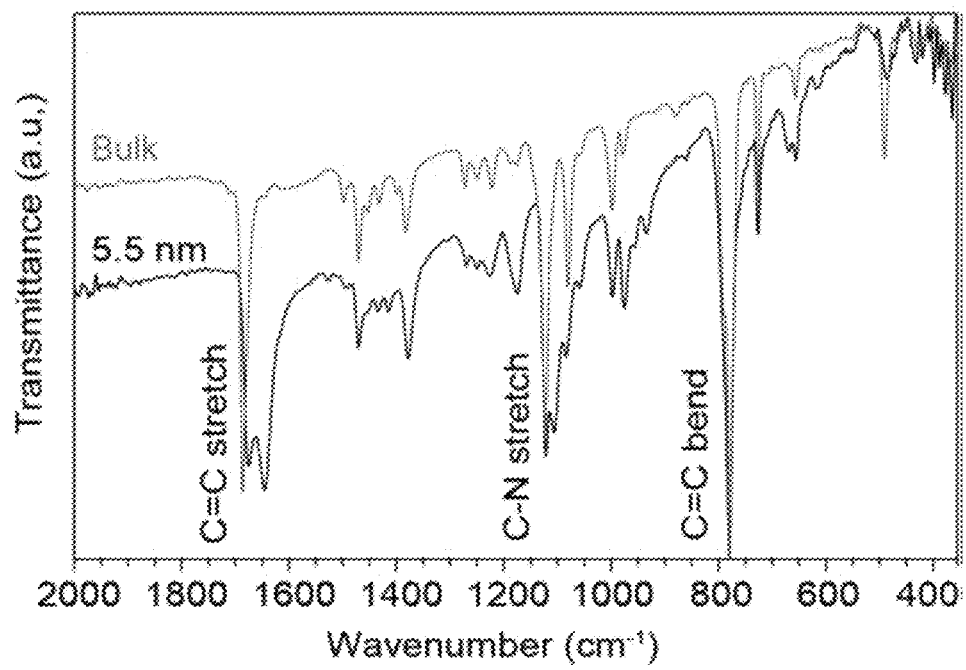
Figure 13A:
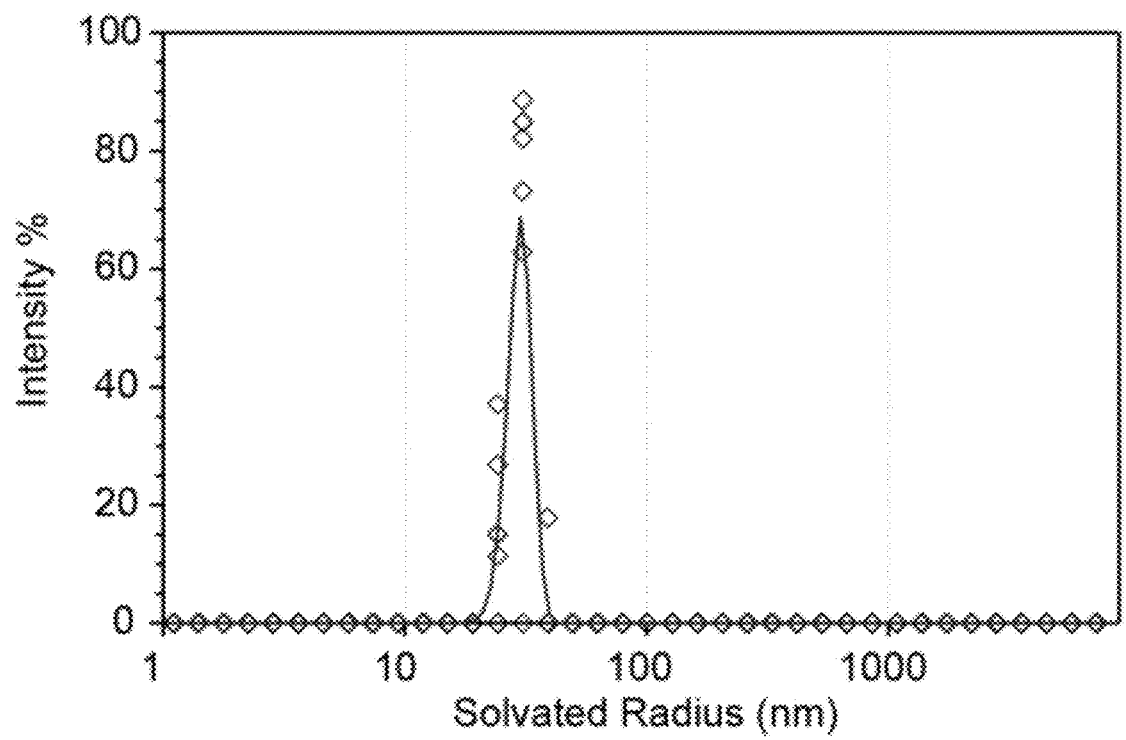
Figure 13B:
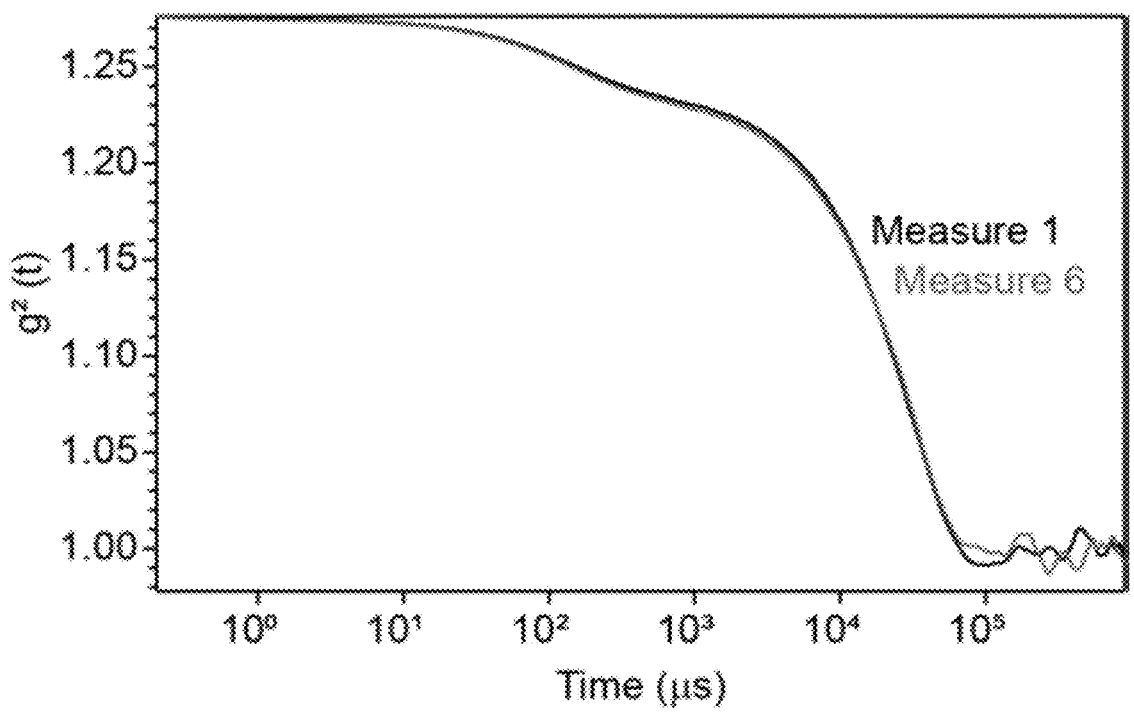

Whereas modulators can incorporate as internal defects or surface ligands in other MOF systems, $^1$H acid digestion NMR indicates that 1-methylimidazole does not incorporate in most cases (FIGS. 11 and 12A-12B). Despite the lack of conventional capping ligands, particles of all sizes exhibit colloidal stability in DMF under anaerobic conditions for at least three months, even at relatively high concentrations of 10-20 mg/mL. Dynamic light scattering measurements of 25.3-nm particles stored for three months gave a solvated diameter of 60.4±9.6 nm, a reasonable increase to the dry SEM size that indicates no aggregation occurred (FIGS. 13A and 13B). Iron-triazolate particles exhibit superior long-term stability compared to previously reported MOF systems, which, with the notable exception of ZIF-8 in methanol, must be coated with polymers or surfactants to achieve any colloidal stability.

Example 3

The solution processability of particular MOF nanoparticles of the present disclosure was explored in this example. The remarkable colloidal stability and small sizes of iron-triazolate nanoparticles yielded suspensions with minimal light scattering, as seen in the inset photo of FIG. 7A. In fact, diluting colloidal suspensions of iron-triazolate results in samples with sufficient transparency for solution-state UV-Vis absorption spectroscopy. While there are a few reports of solution-state spectra of MOFs, such as MOF-525, TMU-34, and Zn-MOF-74, these studies focus on sensing applications in which the MOF concentration is not reported; this omission likely is due in part to the difficulty in determining the concentration of particles that lack long-term colloidal stability. Conventionally, spectroscopic analysis of MOF materials involves analysis of solid-state samples, with UV-Vis analysis demanding diffuse reflectance methods; however, the presently disclosed MOF particles provide the ability for solution-state analysis. FIGS. 14A-14E shows solution-state UV-Vis spectra for all iron-triazolate particle sizes. The spectra exhibit the same two MLCT bands (ca. 27,000 cm$^{-1}$ and 34,000 cm$^{-1}$) as observed in the bulk material (grey, shaded). Due to significant scattering that is observed in the spectra of larger particle sizes, the low-intensity d-d transition expected at 19,000 cm$^{-1}$ for the low-spin-state material from the bulk spectrum is obscured in all spectra. Additionally, the spectra lack an inter-valence-charge-transfer (IVCT) band around 10,000 cm$^{-1}$ that arises from mixed $Fe^{3+/2+}$ valency, suggesting the particles exist in a fully ferrous state.

Close inspection of the solution-state spectra reveal that the peak maxima of the two charge transfer bands decrease in energy with increasing particle sizes, while a shoulder emerges at energies below the lower-energy band. For the higher energy band (CT1), the maximum shifts a total of 1,750 cm$^{-1}$, while the lower band (CT2) maximum shifts 880 cm$^{-1}$. In the bulk material, the $\lambda_{max}$ of CT1 appears at a lower energy of 32,182 cm$^{-1}$, and CT2 appears at 27,968 cm$^{-1}$, within range of the λmax of the nanoparticles. Although the CT2 band is split in the bulk spectrum, the peak-to-peak separation appears more extreme in the nanoparticles, with the lower-energy shoulder appearing at much lower energies. These data represent the first examples of size-dependent shifts to optical properties of MOF materials. To determine whether the modulator plays a role in the size dependence, UV-Vis spectra were collected of particles synthesized with n-butylamine and 1-benzyl-2-methylimidazole. Modulated MOF syntheses often introduce defects, such as modulator incorporation or missing linkers, so we anticipated the modulator identity to influence the extent of defect incorporation in iron-triazolate nanoparticles. Interestingly, the $\lambda_{max}$ values for particles prepared with these alternative modulators are similar to iron-triazolate particles prepared with 1-methylimidazole. Therefore, the size-dependent optical behavior is unlikely due to modulator incorporation and is reproducible (FIGS. 7C and 7E). Without being limited to a single theory, it currently is believed that the shift in the peak maxima suggests that the electronic structure of iron-triazolate changes with particle size.

Figure 14A:
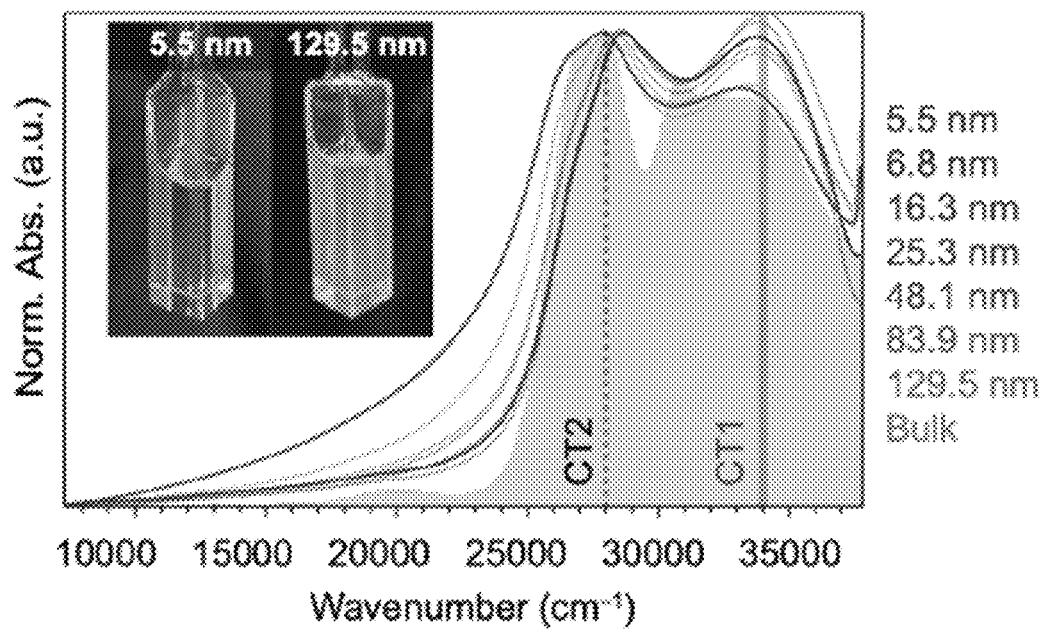
Figure 14B:
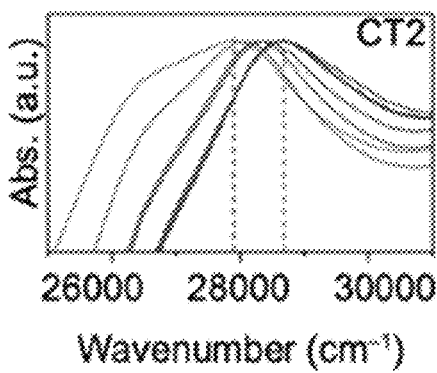
Figure 14C:
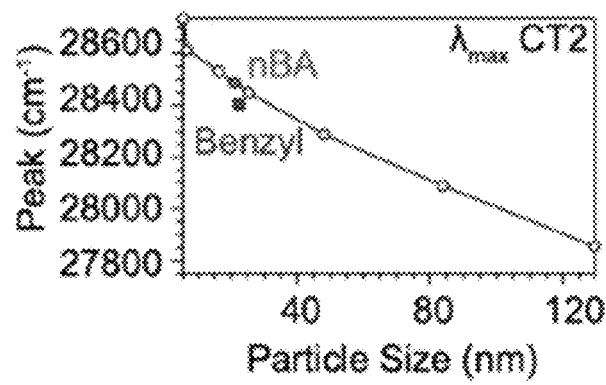
Figure 14D:
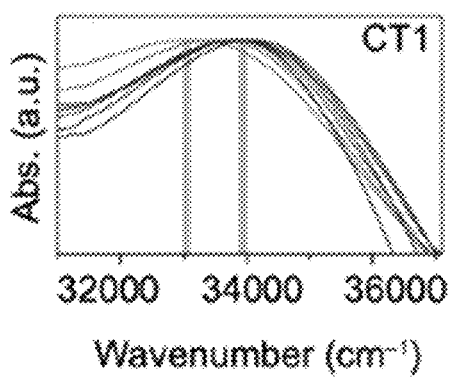
Figure 14E:
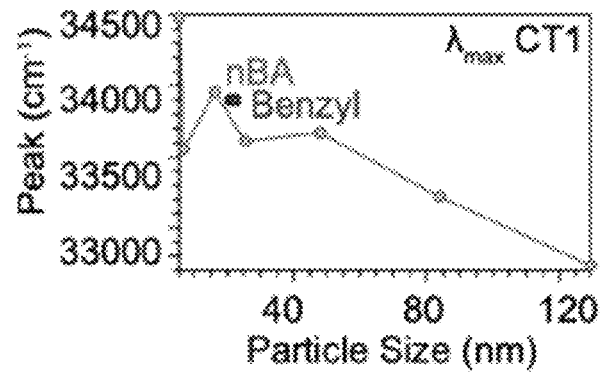

Conventional solid-state spectroscopy of MOF materials lacks the ability to interpret absorption intensities, but the solution state measurements facilitated by the MOF particle embodiments of the present disclosure allowed for the determination of extinction coefficients (□) for all particle sizes. This level of analysis allows spectroscopic features to be attributed to microscopic explanations of structural and electronic symmetry. Quantitative analysis of extinction coefficients has driven the quantum mechanical understanding of semiconductor nanocrystal optical phenomena by relating optical oscillator strengths (f) to physical excitation processes and by providing a practical estimation of particle concentrations from optical spectra. FIG. 14A shows that the extinction coefficients depend strongly on particle sizes, with larger sizes absorbing more intensely than smaller particles, as expected from the increased number of absorber units. FIG. 14B plots the extinction coefficients of peak maxima versus particle diameters, which increase by four orders of magnitude, from 106 (cm$^{-1}$ M$^{-1}$) for 5.5 nm particles to 1010 (cm$^{-1}$ M$^{-1}$) for 129.5 nm particles. To explain this dramatic increase in absorber strength, the extinction coefficient data were fitted to cubic functions of particle diameters, as has been demonstrated for lead chalcogenide semiconductor nanocrystals based on the hypothesis that absorber strength per particle arises from increased particle volumes. A cubic relationship produces an excellent fit for all data except the largest size, likely due to their significant light scattering. While greater extinction coefficients may be expected for larger particles, the absorption strength per formula unit depends on particle diameters as well, ranging from ~3000-7000 cm$^{-1}$ M$^{-1}$, which are typical values observed for molecular charge transfer bands. For a deeper microscopic analysis of absorption intensities, oscillator strengths f can be determined for each of the absorption bands. When calculated per particle, f increases with particle sizes (FIG. 14D), as expected for an increased number of absorbing units. Determined per formula unit, however, the oscillator strengths change with particle sizes (FIG. 14C), with f values reaching a maximum around 30-nm particle diameters and then converging to similar values for the largest sizes. Structural distortions and differences between surface, sub-surface, and internal geometries likely give rise to this effect. Specifically, the surface species likely dictate the oscillator strengths for small sizes, whereas internal bulk-like species determine them for large particles. For intermediate sizes, it currently is believed that structural tension between surface and internal species distort the dipole strengths of orbital wavefunctions, thereby changing the oscillator strengths. In all cases, f per formula unit is on the order of $10^{-1}$, as expected for a charge transfer that is both spin and parity allowed.

Example 4

Figure 15A:
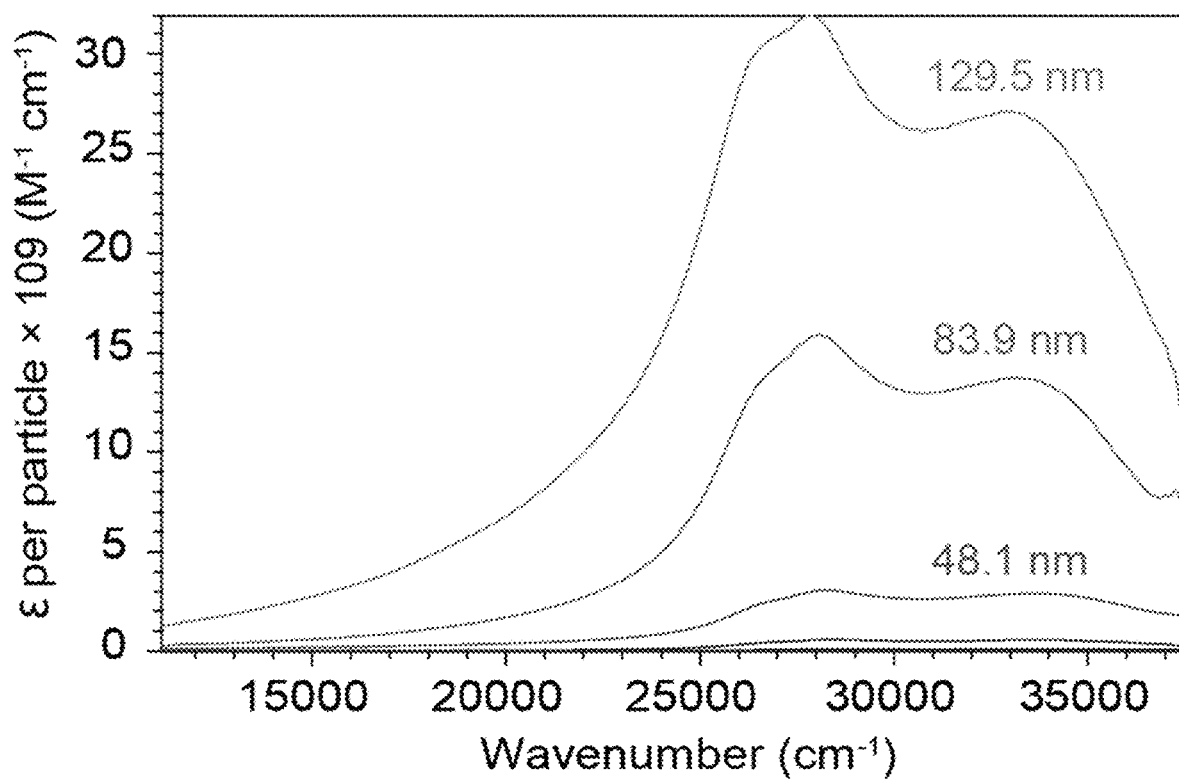
Figure 15B:
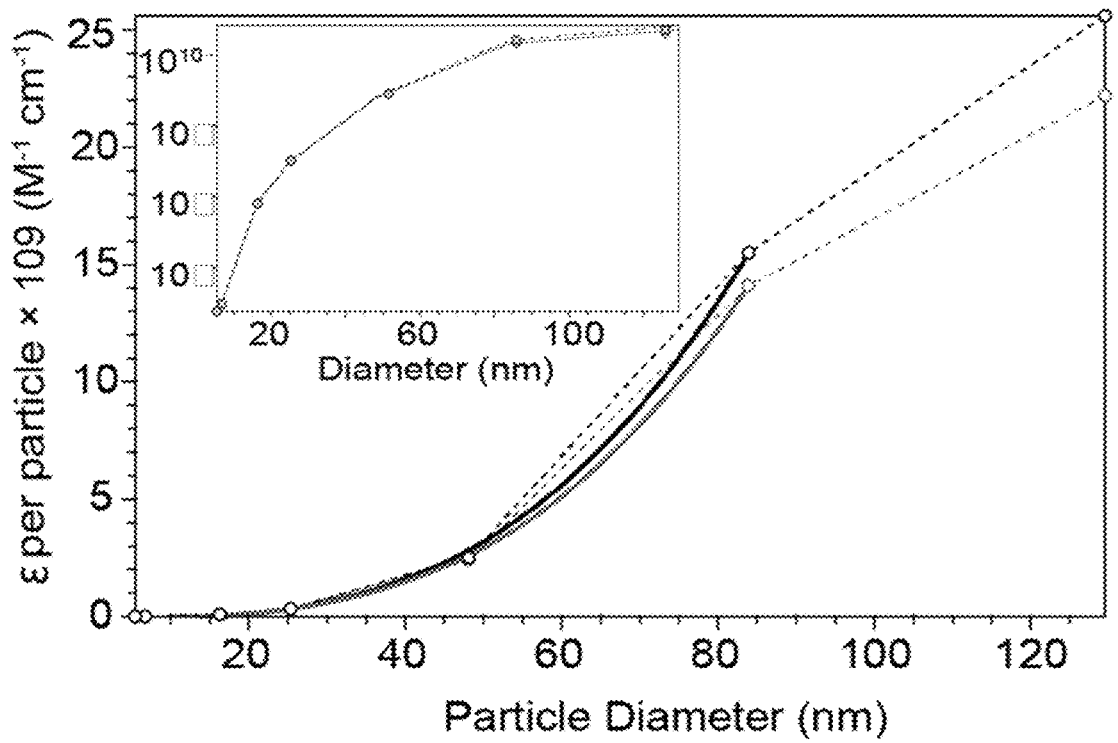
Figure 15C:
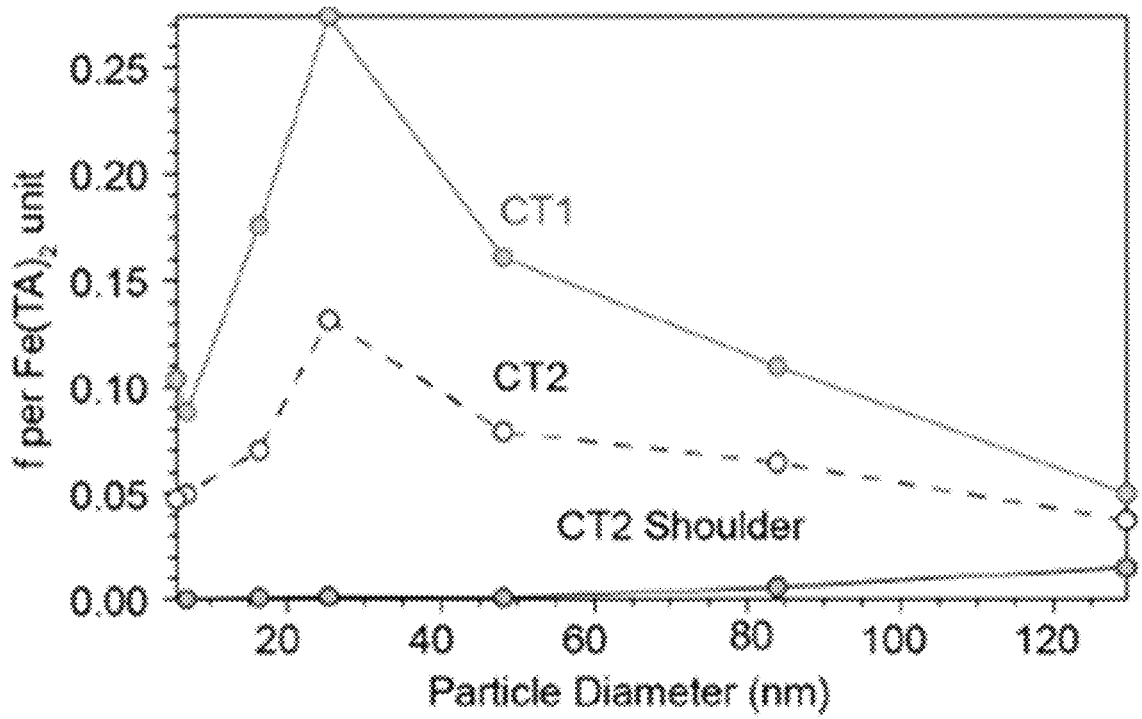
Figure 15D:
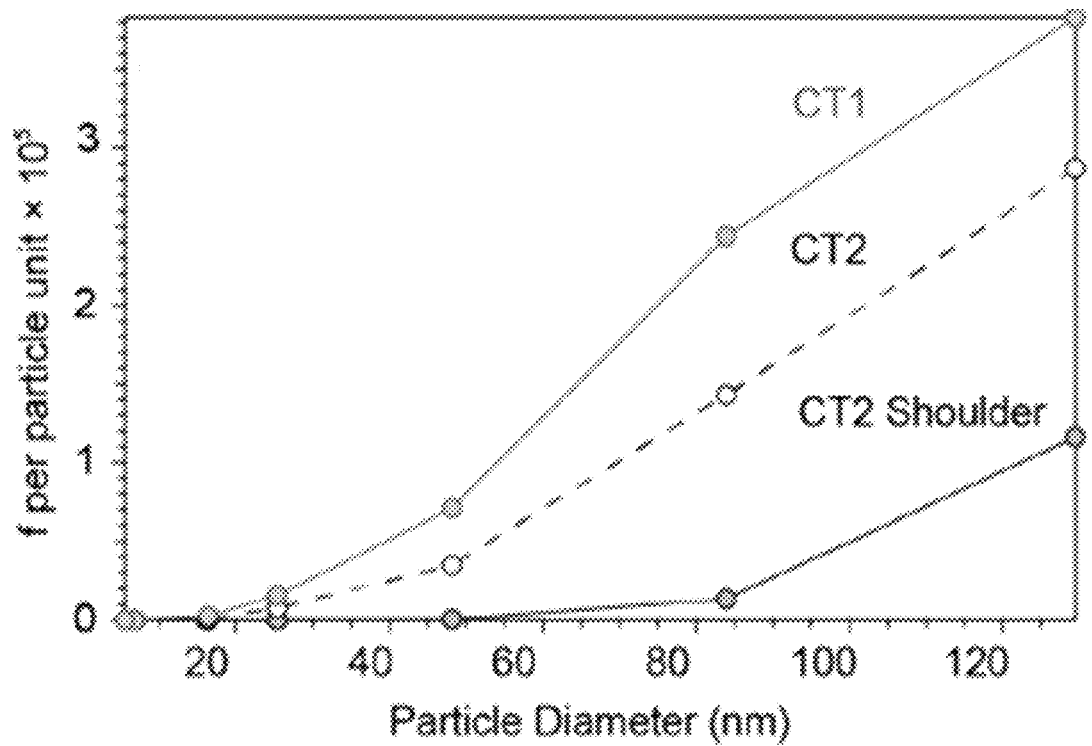
Figure 17A:
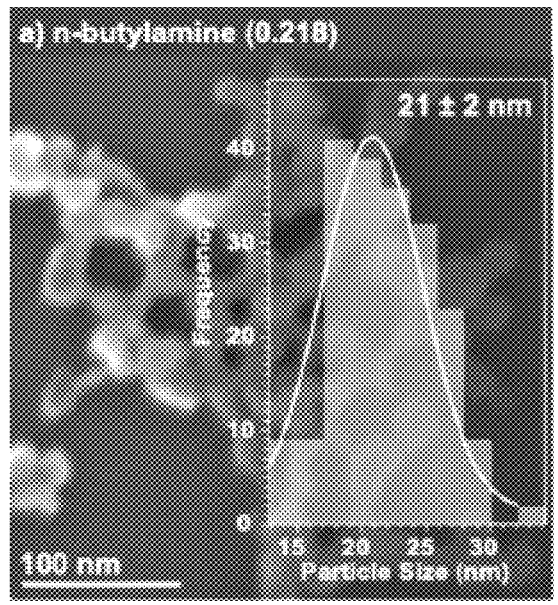
FIGS. 17A-17D show SEM images of iron-1,2,3-triazolate nanoparticles synthesized with different modulators, including 0.218 equivalents of n-butylamine (FIG. 17A), 0.218 equivalents of 1-benzyl-2-methylimdaizole (FIG. 17B), 0.218 equivalents of 5-bromo-1-methylimidazole (FIG. 17C), and 10.9 equivalents 5-bromo-1-methylimidazole (FIG. 17D).
Figure 17B:
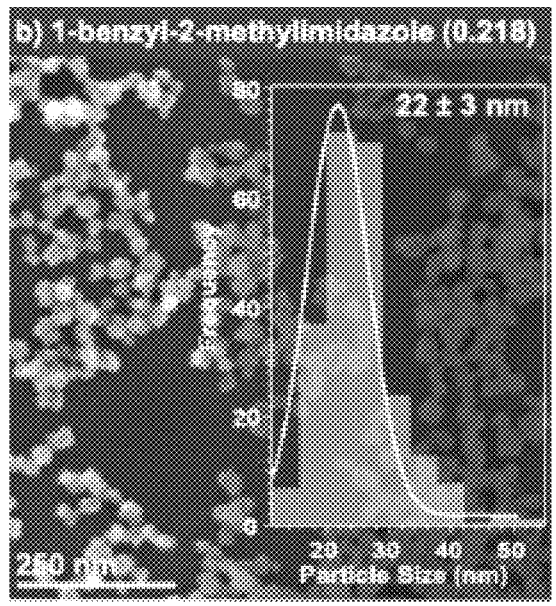
Figure 17C:
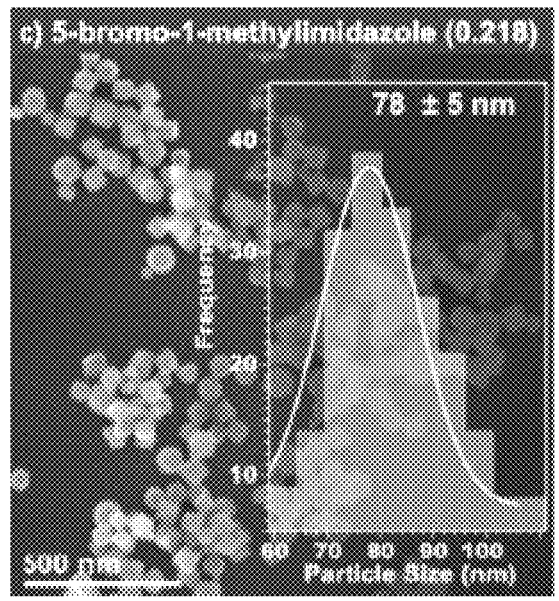
Figure 17D:
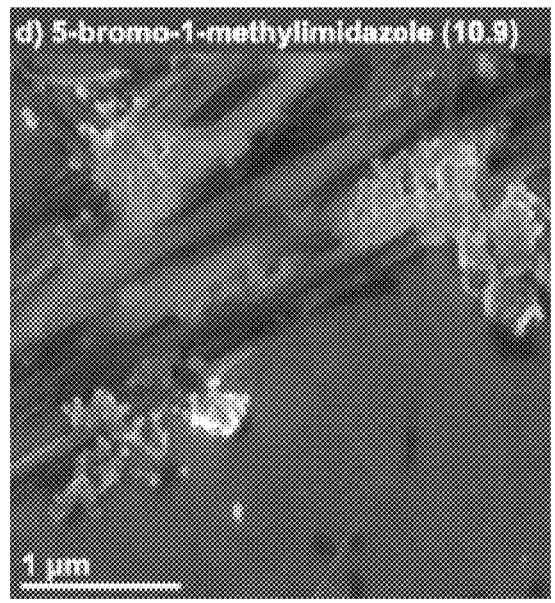

In this example, size-dependent redox chemistry and charge transport of iron-triazolate nanoparticles (as colloids) were evaluated. Although solid-state techniques and additives, such as polymer binders, are required to study redox properties of typical bulk MOFs, the colloidal stability of the iron-triazolate nanoparticle embodiments described herein enabled characterization by solution-state electrochemistry. Cycling colloidal particles of 25.3 nm and below gives a voltametric response. All data were collected on the colloids within a window of several hours. FIG. 15A shows the resulting CV curves from four particles sizes; all particle suspensions showed qualitatively similar features with three faradaic events. In most cases, the oxidation wave exhibited particularly broad waves, for which the peaks are often not resolved as the current continuously increases throughout the voltage window. For the 16.3 nm colloidal suspension, some of the faradaic events are well-resolved (FIG. 15B). The first event, with an E½ of -0.61 V, gives a ΔE of 9.2 mV with a scan rate of 100 mV/s, which increases to 56 mV when the scan rate is 130 mV/s. The second event, at -0.29 V, shows lower reversibility with a separation of 126 mV for 100 mV/s, and 144 mV for 130 mV/s (FIG. 15D). Other oscillator strength results are shown in FIG. 15C. In all cases, the third event, for which the reduction appears at 0.13 V, could not be resolved. It has been shown in the field that, scanning the bulk material in an air-free environment in LiBF$_4$/propylene carbonate produces a single redox feature at high potential, which has been assigned to Fe$^{2+/3+}$. Work in the field has shown that bulk material synthesized in aerobic conditions and scanned in 0.1 M KOH show many redox events, assigned to varying Fe surface species. These observed events are assigned to Fe$^{2+/3+}$, as the triazole ligand scanned in 0.1 M TBAPF$_6$/DMF shows only a single oxidation event at 0.31 V vs Fc$^{0/+}$. The iron-triazolate nanoparticles show three events that are not spaced unevenly, with the first two peaks appearing closer together. And, the size of the iron-triazolate particles only marginally shifted the peak voltages, which is in stark contrast to behavior of inorganic nanoparticles (e.g., gold nanoparticles), which exhibit CVs that are highly size-dependent.

Example 5

In the syntheses of iron-triazolate particles, several variables were used to control particle size and dispersity: reaction time, concentration, and the identity of an added modulator. In some examples, the calculated Scherrer size of the particles decreased upon dilution, and upon the addition of sodium formate, n-butylamine, 1-methylimidazole, 5-bromo-1-methylimidazole, and 1-benzyl-2-methylimidazole. In one example, sodium formate (1 eq) did not have a significant impact on crystallite size, and the PXRD pattern exhibited a phase impurity peak (FIG. 16A). In another example, high equivalents of n-butylamine (>1 eq) formed an amorphous precipitate at room temperature (FIG. 16A), but if heated and stirred, the reaction mixture still produced phase-pure iron-triazolate. In another example, high equivalents of 5-bromo-1-methylimidazole resulted in particle aggregation as well as an unidentified phase impurity (FIG. 16C). With 10.9 equivalents of 5-bromo-1-methylimidazole, the PXRD peaks also appear to shift to slightly lower angles, indicating a small increase in unit cell size. Additionally, particles synthesized with 5-bromo-1-methylimidazole exhibited poor colloidal stability in some examples. The use of 1-benzylimidazole resulted in small sizes, although a possible phase impurity is also observed (FIG. 16B). FIG. 16D shows pattern obtained from nanoparticles made using with varying amounts of 1-methylimidazole. SEM images of particles made using the disclosed method with different modulators (e.g., n-butylamine, 1-benzyl-2-methylimidazole, and 5-bromo-1-methylimidazole (with 0.218 and 10.9 equivalents) are provided by FIGS. 17A-17D. In particular examples, 1-methylimidazole was used as the modulator as the products were consistently phase-pure and small particles were obtained at reasonably low equivalents. More dilute conditions compared to the bulk synthesis were used. To ensure that the results observed were due to the modulator and short reaction time, the bulk synthesis was performed under the same concentration (0.0575 M $FeCl_2$).

Figure 18A:
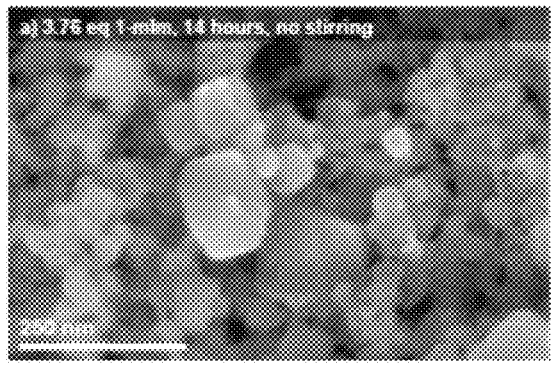
FIGS. 18A-18D show SEM images of iron-1,2,3-triazolate nanoparticles synthesized with different reaction times and conditions.
Figure 18B:
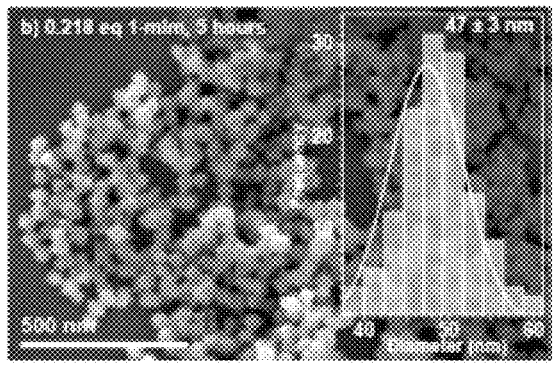
Figure 18C:
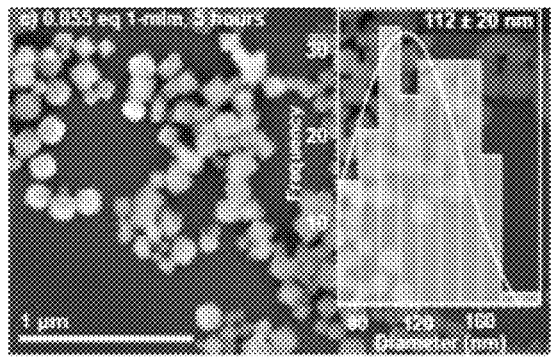
Figure 18D:

It was also found that isolating particle populations with low polydispersity could be facilitated by rapidly stirring the solution. Initially, reactions were initially performed without stirring and with a 18-21-hour reaction time, which resulted in high polydispersity (FIG. 18A). The reactions were halted at 1.5 h by removing the product from heat and collecting the product by centrifugation. It was found that, at 0.055 equivalents of 1-methylimidazole, the particles would grow into bulk-like structures if allowed to react overnight, while a 5-hour reaction time did not significantly change the particle size, but did increase the polydispersity (130±10 nm vs 112±20 nm with a 5 hour reaction). A five-hour reaction time for 0.218 equivalents 1-methylimidazole gave the same size and polydispersity as the 1.5-hour reaction (FIGS. 18B and 7C). Other results using different equivalents and reaction times are provided by FIGS. 18C and 18D. In particular examples, the particles were synthesized with a 1.5-hour reaction time. Exploratory syntheses were performed on a 2 mL scale; when suitable conditions were found, the reactions were scaled up to 14 mL, and no changes in the crystallite sizes or SEM sizes were observed; results from a duplication experiment showing minimal to no changes in SEM size are summarized in Table 4. SEM images of (i) the bulk material and (ii) additional exemplary embodiments of iron-triazolate particles according to the present disclosure are provided by FIGS. 19A-19F.

TABLE 4

| 1-methylimidazole Equivalents | Scherrer Size (nm) |
|---|---|
| 0.709 | 9.1 |
| 0.709 | 9.0 |
| 0.709 | 8.8 |
| 0.709 | 10 |
| 0.709 | 8.1 |
| 0.709 | 8.1 |
| 0.709 | 8.3 |

Example 6

In this example, thin films were formed using iron-triazolate MOF nanoparticles and the redox properties were measured. The preparation of thin films was performed in aerobic ambient conditions. Substrates, either glass or Si wafers, were rinsed copiously with isopropyl alcohol and dried with pressurized nitrogen. Substrates were taped to glass slides with electrical tape (U-Line Listed E50292 590J) such that the edges of the tape created a barrier on either side, with a total exposed area of 1 inch square. A 200 µL aliquot of a dispersion of particles was added to one side of the blade, and a razor blade was used to slowly wipe the particles across the glass. For the largest three sizes (130 nm, 84 nm, and 48 nm), dispersions were 20 mg/mL. With such a high concentration, the smallest particles created films that easily flaked off the glass. These particles (25 nm, 16 nm, 6.8 nm, and 5.5 nm) were diluted to 10 mg/mL to create homogenous films. The bulk sample film was created by dispersing the bulk powder in DMF at a concentration of 20 mg/mL and sonicating for 10 min; the film was created directly after the sonication step. Samples were left to dry in ambient conditions.

The thin films were obtained by drop-casting iron-triazolate MOF nanoparticles having various crystallite sizes onto the surface of glassy carbon electrodes using a suspension of the MOF nanoparticles in 0.1 M $TBAPF_6$/MeCN. General results are provided by FIG. 20A and FIGS. 21A-21D;

FIG. 21E shows results for a control, which was a triazolate ligand. Results for particles having a crystallite size of 16.3 nm were evaluated further. The response of the particles in 0.1 M $TBAPF_6$/MeCN was observed to be similar to the suspended particles in DMF, although the events are shifted to significantly higher potential due to the stark change in electrochemical environment (see FIGS. 22A and 22B). The change in solvent system was to discourage particle delamination, as the particles could re-suspend in DMF but not in MeCN. Indeed, electron microscopy images of the electrodes before and after electrochemical analysis reveal no significant changes to particle packing in the film. Due to the small pore size of the MOF nanoparticles, it was considered that the broad redox waves observed with $TBAPF_6$ reflect the hindered ability of the bulk $PF_6^-$ anion to diffuse through the particles. FIGS. 22A, 22B, 24A, and 24B plot CV traces in both $TBAPF_6$ and $TBABF_4$ to show the influence of anion size. In $TBABF_4$, more faradaic events were observed, most notably a sharp reversible feature at 1.2 V. Additionally, substantially more charge was passed when $TBABF_4$ is employed: moles of electrons passed was obtained by integrating the CV curves in FIGS. 24A and 24B. Moles of electrons upon oxidation in $TBAPF_6$ was $8.26 \times 10^{-9}$, and reduction gave $7.20 \times 10^{-9}$. In $TBABF_4$, the oxidation half-cycle gave $2.25 \times 10^{-8}$ moles of electrons, while reduction gave $1.86 \times 10^{-8}$ moles (see Table 6). Lower values on the reduction half-cycle indicate chemical irreversibility for some of these processes. Two well-defined events in each electrolyte were selected for further analysis, indicated by open circles and shaded triangles throughout FIGS. 20B-20E, FIGS. 22A and 22B. The peak separation of the first redox event is much lower than the following event at higher potential in all cases (FIG. 20C). This increase in peak separation supports that the events are due to $Fe^{2+/3+}$ in different areas in the MOF nanoparticles, with the surface species having the lowest potentials as well as the fastest kinetics. Additionally, the second event (green circles) in $TBAPF_6$ shows the highest ΔE compared to all conditions, even the colloidal suspension in $TBAPF_6$/DMF (blue circles). This indicates that the same redox event, in a particle film, suffers from sluggish kinetics compared to the free particles in solution. The peak current for the events all exhibited a linear dependence with respect to scan rate; therefore, even if the particles are employed as colloids, the redox events are adsorption-controlled and thus particles, at least temporarily, adsorb to the electrode surface. These data show that nanosizing redox-active MOFs can improve reversibility and decrease the energy needed for ion pairing; redox-active MOF nanoparticle films can thus be efficient materials in applications, such as potentiometric sensing and charge storage. Further voltammetry results are provided by FIGS. 22A-22C, which show CV scans of iron-triazolate particles and a comparative scan of the bulk material (FIG. 22C).

Thin film fabrication and solid-state measurements were enabled by the impressive colloidal stability and solution-processability of iron-triazolate nanoparticles. Doctor blading high-concentration suspensions onto glass slides afforded uniform films with smooth surfaces, as shown in the optical microscope image of FIG. 3A and the cross-sectional FIB-SEM image in FIG. 3C. Additional SEM images of particle films can be seen in FIGS. 5C-5E and FIGS. 5A,5B, and 3D show cross sectional images of the bulk material film. Optical images show a dark brown color, which occurs due to oxidation of $Fe^{2+}$ in air, whereas the particle suspensions are tan. FIG. 3B shows I-V curves of thin films for the two largest particle sizes, 130 nm and 84 nm, giving DC conductivities of 48 µS/cm and 150 µS/cm, respectively. For comparison, the conductivity of bulk iron-triazolate thin films were determined to be 11 µS/cm. Raw data for the conductivity measurements of this example are provided by Table 5.

TABLE 5

| Particle Size | Additives | Film Thickness µm | Resistance Ω |
|---|---|---|---|
| Bulk material | None | 4.14 | $4.95 \times 10^7$ |
| 130 ± 20 nm | None | 5.54 | $8.22 \times 10^6$ |
| 84 ± 30 nm | None | 6.55 | $2.21 \times 10^6$ |
| 84 ± 30 nm | 5% carbon, 5% PVDF | 4.14 | $7.19 \times 10^5$ |

To precisely quantify the role of ions in the redox chemistry of iron-triazolate nanoparticles, quartz crystal microbalance (QCM) electrodes were used. Spin-coating 16-nm particles onto the QCMs yielded uniform multi-layer nanoparticle films (FIGS. 23A-23D), which allowed for measuring their voltammetric responses and simultaneous mass changes in either $TBAPF_6$ or $TBABF_4$ environments. The frequency of the quartz crystal oscillation is sensitive to mass changes at the crystal surface, allowing monitoring of film loading and ion flux while the potential is scanned. FIGS. 24A and 24B show both the CV traces and the number of moles of anion adsorbed to the particles based on the mass change of the QCM electrode, using the Sauerbrey equation and assuming that all mass change is due to unsolvated $PF_6^-$ and $BF_4^-$ anions. Once again, the redox waves of the sample analyzed with $TBAPF_6$ exhibits broad features in comparison to the same size nanoparticles in $TBABF_4$ (FIGS. 25A and 25B). Additionally, substantially more current passes to the particles in the presence of $TBABF_4$. Charge integration shows nearly seven-fold enhancement, with stoichiometric oxidation of nearly all Fe sites, i.e., $e^-$:Fe=~0.9 when using $TBABF_4$, whereas $TBAPF_6$ yields only $e^-$:Fe=~0.3. This comparison suggests that more Fe sites are electrochemically accessible in the $TBABF_4$ experiment, which is mainly attributed to the smaller anions' ability to diffuse through the porous MOF nanoparticles. A further contribution may be due to differences in thin thickness and morphology, although films were homogenous for both cases (FIGS. 23A-23D, Table 6). The mass of the particle films increases in both experiments with oxidizing potentials, as expected for incorporation of charge-balancing anions, but far more anions incorporate when using the smaller $BF_4^-$ ions. Approximately four times as many moles of $BF_4^-$ adsorb compared to $PF_6^-$, yielding $PF_6$:Fe=0.1 and $BF_4$:Fe=0.4 (Table 6). We expect that surface ions provide additional charge-balancing anions needed for stoichiometric oxidation of all Fe sites. Comparing mass changes to redox waves at a given potential provides deeper insight into the nature of the redox chemistry. Most notably, the coincidence of a sharp increase in mass and current at ~1.2 V strongly suggest this redox event corresponds to ion-coupled charge transport to interior Fe sites enabled by the smaller size of the $BF_4^-$ anion in comparison to the gradual mass changes and broad redox waves of the $TBAPF_6$ experiments. Although ion intercalation and ion pairing are frequently invoked to understand MOF redox chemistry, charge storage and sensing, these data represent some of the only direct measurements of ion intercalation processes by employing quartz crystal microbalance electrodes. They also show that nano-sizing MOFs can improve the availability of redox-active sites, thus lowering redox potentials through improved ion pairing, a key insight into designing electronic MOF devices.

TABLE 6

|  | $TBAPF_6$ | $TBABF_4$ |
|---|---|---|
| Mass iron-1,2,3-triazolate deposited/$cm^2$ | 5.50 µg | 4.41 µg |
| Moles iron-1,2,3-triazolate/$cm^2$ | $2.86\ 10^{-8}$ | $2.30\ 10^{-8}$ |
| Frequency change | 22 Hz | 46.8 Hz |
| Mass change/$cm^2$ | $3.89\ 10^{-7}$ µg | $8.27\ 10^{-7}$ µg |
| Moles anions/$cm^2$ | $2.68\ 10^{-9}$ | $9.52\ 10^{-9}$ |
| Anions per Fe | 0.09 | 0.4 |
| Moles $e^-$ (oxidation) | $8.26\ 10^{-9}$ | $2.25\ 10^{-8}$ |
| Moles $e^-$ (reduction) | $7.20\ 10^{-9}$ | $1.86\ 10^{-8}$ |
| Moles $e^-$ (average) | $7.73\ 10^{-9}$ | $2.05\ 10^{-8}$ |

Example 7

In this example, composite films were prepared by adding 5% w/w of each carbon black and polyvinylidene fluoride (PVDF) as a binder to a solution of the iron-triazolate MOF and the total volume was diluted to create an overall concentration of 20 mg/mL, yielding smooth and homogenous materials (see the cross-sectional SEM images in FIG. 5G and FIG. 5H) with improved conductivities of 630 µS/cm.

Example 8

In this example, manganese-1,2,3-triazolate MOF nanoparticles (see FIGS. 26A-26D) were prepared by dissolving manganese nitrate hydrate (58.8 mg, 0.3 mmol) in 3 mL of DMF in a 4 mL vial. To this solution was added 1-methylimidazole (varied, 2 to 8 eq) and 1, 2, 3-triazole (52.2 µL, 0.9 mmol, 3 eq). The reactions were capped and sealed with electrical, then placed in a pre-heated aluminum block set to 120° C. The reactions were allowed to stir in these conditions for 46 hours, during which time they became opaque white. The products were isolated by centrifugation and washed twice with DMF.

Example 9

In this example, cadmium-1,2,3-triazolate MOF nanoparticles (see FIGS. 27A-27D) were prepared by dissolving cadmium(II) nitrate tetrahydrate (0.1851 g, 0.6 mmol) was dissolved in DMF (10 mL). Triazole was added (1.7 mmol, 98.8 µL), followed by 1-methylimidazole (0.4 mmol, 38.8 µL). The reaction was placed in a pre-heated vial block at 120° C. and left to stir for 1 h 45 min. The particles were cooled and washed twice with DMF. Material obtained phase pure by PXRD from 1 to 4 eq of 1-methylimadozle. The Scherrer crystallite sizes decrease from 79 nm to 26 nm upon increasing the 1-mlm from 1 to 3 equivalents. FIG. 27E shows the DR-UV-VIS (diffuse reflectance ultraviolet-visible spectroscopy) size dependence and energy (eV) of cadmium-1,2,3-triazolate MOF nanoparticles synthesized with 1-methylimidazole ("1-mlm") equivalents (with respect to Cd used in the reaction) ranging from 0.5 equivalents (FIG. 27A) to 1.75 equivalents (FIG. 27D).

Example 10

In this example, chromium-1, 2, 3-trazolate MOF nanoparticles were synthesized (FIG. 28C). Under nitrogen, chromium(II) triflate (0.35 g, 1 mmol) was dissolve in 2 mL DMF in a 4 mL vial with PTFE-lined cap. To this solution was added 1, 2, 3-triazole (175 μL, 5 mmol) and a varying amount of 1-methylimidazole. Vials were capped and taped with electrical tape, then placed in an aluminum heating block set to 120° C. overnight, during which time the turquoise solution turned a deep purple. The material was isolated by centrifugation and washing (2×2 mL) DMF.

Example 11

Zinc oxide (0.734 mmol, 0.0597 g) or zinc nitrate hexahydrate (0.734 mmol, 0.2183 g) was added to a 20 mL vial along with DMF (6 mL). Then, 1,2,3-triazole (125 uL) was added. The vial was sealed and the reaction was left heating with stirring for 24 hours. The reaction was cooled and the product collected by centrifugation and washed twice with DMF.

In view of the many possible embodiments to which the principles of the present disclosure may be applied, it should be recognized that the illustrated embodiments are only preferred examples and should not be taken as limiting the scope of the present disclosure. Rather, the scope is defined by the following claims. We therefore claim as our invention all that comes within the scope and spirit of these claims.

We claim:

1. A composition, comprising a plurality of metal-organic framework (MOF) nanoparticles comprising at least one coordination complex formed between a metal component and a 1,2,3-triazolate ligand, wherein the plurality of metal-organic framework nanoparticles has a polydispersity index value ranging from a value greater than 0 to a value less than 0.4.

2. The composition of claim 1, wherein the plurality of metal-organic framework nanoparticles has a polydispersity index value ranging from 0.05 to 0.3.

3. The composition of claim 1, wherein the plurality of metal-organic framework nanoparticles has a polydispersity index value ranging from 0.05 to less than 0.25.

4. The composition of claim 1, wherein the metal component is an ion of iron, cobalt, nickel, magnesium, zinc, vanadium, chromium, manganese, cadmium, or copper.

5. The composition of claim 1, further comprising a binder, a conductive material, or a combination thereof.

6. The composition of claim 5, wherein the composition comprises both the binder and the conductive material and wherein the binder is polyvinylidene fluoride and the conductive material is carbon black.

7. The composition of claim 1, further comprising a modulator component that is a nitrogen-containing heteroaryl compound or an aliphatic amine compound.

8. The composition of claim 7, wherein the modulator component is a nitrogen-containing heteroaryl compound selected from 1-methylimidazole, 5-bromo-1-methylimidazole, 1-benzyl-2-methylimidazole, or a combination thereof.

9. The composition of claim 1, wherein the plurality of metal-organic framework nanoparticles have an average particle size ranging from 4 nm to 150 nm.

10. The composition of claim 1, wherein the plurality of metal-organic framework nanoparticles have an average particles size ranging from 4 nm to 50 nm or from greater than 50 nm to 150 nm.

11. The composition of claim 1, wherein the MOF nanoparticles are cadmium-1,2,3-triazolate nanoparticles, magnesium-1,2,3-triazolate nanoparticles, iron-1,2,3-triazolate nanoparticles, cobalt-1,2,3-triazolate nanoparticles, manganese-1,2,3-triazolate nanoparticles, chromium-1,2,3-triazolate nanoparticles, zinc-1,2,3-triazolate nanoparticles, or a mixture thereof.

12. The composition of claim 1, wherein the plurality of metal organic framework (MOF) nanoparticles are not in the form of a bulk powder.

* * * * *